US007802365B2

(12) United States Patent
McGlinchy

(10) Patent No.: US 7,802,365 B2
(45) Date of Patent: Sep. 28, 2010

(54) WINDOW COMPONENT SCRAP REDUCTION

(75) Inventor: Timothy B. McGlinchy, Twinsburg, OH (US)

(73) Assignee: GED Integrated Solutions, Inc., Twinsburg, OH (US)

( * ) Notice: Subject to any disclaimer, the term of this patent is extended or adjusted under 35 U.S.C. 154(b) by 1464 days.

(21) Appl. No.: 11/085,704

(22) Filed: Mar. 21, 2005

(65) Prior Publication Data

US 2006/0075720 A1 Apr. 13, 2006

Related U.S. Application Data

(60) Provisional application No. 60/614,307, filed on Sep. 29, 2004.

(51) Int. Cl.
*B21D 28/00* (2006.01)
*B21D 31/00* (2006.01)
*B21D 31/02* (2006.01)
*B21D 47/00* (2006.01)
*B23P 17/00* (2006.01)
*B23P 19/04* (2006.01)

(52) U.S. Cl. ..................... 29/897.31; 29/403.3; 29/412; 29/417; 29/423; 72/331; 72/338; 72/379.2

(58) Field of Classification Search ................. 29/34 R, 29/DIG. 18, 403.3, 412–414, 417, 897.3, 29/897, 897.312, 897.34, 897.33, 403.1, 29/423; 52/786.1; 72/41, 47, 326, 331, 338, 72/379.2
See application file for complete search history.

(56) References Cited

U.S. PATENT DOCUMENTS 3,144,709 A * 8/1964 Hansson et al. ............... 29/413
3,691,601 A * 9/1972 Hough ........................ 29/897
4,024,622 A * 5/1977 Feinberg et al. ............... 29/417
4,333,221 A * 6/1982 Hayashi ....................... 29/413
4,530,195 A 7/1985 Leopold
4,546,723 A 10/1985 Leopold et al.
4,628,582 A 12/1986 Leopold
5,105,591 A 4/1992 Leopold
5,295,292 A 3/1994 Leopold
5,313,761 A 5/1994 Leopold
5,361,476 A * 11/1994 Leopold ...................... 29/417
5,603,153 A * 2/1997 Zmyslowski ................ 29/509
5,678,377 A 10/1997 Leopold (Continued)

*Primary Examiner*—David P Bryant
*Assistant Examiner*—Alexander P Taousakis
(74) *Attorney, Agent, or Firm*—Tarolli, Sundheim, Covell & Tummino LLP

(57) ABSTRACT

A method of making elongated spacer frame members prevents a first spacer frame member in a series of spacer frame members from being scrapped. A supply of thin relatively narrow sheet metal stock is provided. The stock is fed endwise to a stamping station. The stock is passed through the stamping station that stamps the stock to define a scrap length of stock followed by a connected first spacer frame defining length of stock. The scrap length of stock and the connected first spacer frame defining length of stock are fed to a roll forming station. The scrap length of stock and the connected first spacer frame defining length of stock are formed into a rigid linearly extending scrap element having opposite side walls and a base wall and a connected rigid linearly extending first spacer frame element having opposite side walls and a base wall. A connection between the scrap element and the first spacer frame element is then severed.

5 Claims, 40 Drawing Sheets

U.S. PATENT DOCUMENTS

| | | | | |
|---|---|---|---|---|
| 5,822,840 | A * | 10/1998 | Mossner et al. | 29/11 |
| 6,173,484 | B1 | 1/2001 | McGlinchy et al. | |
| 6,244,012 | B1 | 6/2001 | McGlinchy et al. | |
| 6,397,453 | B1 | 6/2002 | McGlinchy et al. | |
| 6,438,819 | B1 | 8/2002 | McGlinchy et al. | |
| 6,618,926 | B2 | 9/2003 | McGlinchy et al. | |
| 6,630,028 | B2 | 10/2003 | Briese et al. | |
| 6,651,304 | B2 | 11/2003 | McGlinchy et al. | |
| 6,678,938 | B2 | 1/2004 | McGlinchy et al. | |
| 6,687,982 | B2 | 2/2004 | McGlinchy | |
| 6,708,384 | B2 | 3/2004 | McGlinchy | |
| 6,742,285 | B2 | 6/2004 | Shepherd | |
| 6,745,460 | B2 | 6/2004 | McGlinchy | |
| 6,868,884 | B2 | 3/2005 | Briese | |
| 6,883,278 | B2 | 4/2005 | McGlinchy et al. | |
| 6,889,416 | B2 | 5/2005 | McGlinchy | |

* cited by examiner

WINDOW COMPONENT SCRAP REDUCTION

CROSS REFERENCE TO RELATED APPLICATIONS

The present application claims priority from U.S. provisional application Ser. No. 60/614307 entitled "Window component Scrap Reduction" filed Sep. 29, 2004 which is incorporated herein.

FIELD OF THE INVENTION

The present invention relates to insulating glass units and more particularly to a method and apparatus for reducing elongated window component scrap in an elongated window component production line.

BACKGROUND OF THE INVENTION

Insulating glass units (IGUs) are used in windows to reduce heat loss from building interiors during cold weather. IGUs are typically formed by a spacer assembly sandwiched between glass lites. A spacer assembly usually comprises a frame structure extending peripherally about the unit, a sealant material adhered both to the glass lites and the frame structure, and a desiccant for absorbing atmospheric moisture within the unit. The margins or the glass lites are flush with or extend slightly outwardly from the spacer assembly. The sealant extends continuously about the frame structure periphery and its opposite sides so that the space within the IGUs is hermetic.

There have been numerous proposals for constructing IGUs. One type of IGU was constructed from an elongated corrugated sheet metal strip-like frame embedded in a body of hot melt sealant material. Desiccant was also embedded in the sealant. The resulting composite spacer was packaged for transport and storage by coiling it into drum-like containers. When fabricating an IGU the composite spacer was partially uncoiled and cut to length. The spacer was then bent into a rectangular shape and sandwiched between conforming glass lites.

Perhaps the most successful IGU construction has employed tubular, roll formed aluminum or steel frame elements connected at their ends to form a square or rectangular spacer frame. The frame sides and corners were covered with sealant (e.g., a hot melt material) for securing the frame to the glass lites. The sealant provided a barrier between atmospheric air and the IGU interior which blocked entry of atmospheric water vapor. Particulate desiccant deposited inside the tubular frame elements communicated with air trapped in the IGU interior to remove the entrapped airborne water vapor and thus preclude its condensation within the unit. Thus after the water vapor entrapped in the IGU was removed internal condensation only occurred when the unit failed.

In some cases the sheet metal was roll formed into a continuous tube, with desiccant inserted, and fed to cutting stations where "V" shaped notches were cut in the tube at corner locations. The tube was then cut to length and bent into an appropriate frame shape. The continuous spacer frame, with an appropriate sealant in place, was then assembled in an IGU.

Alternatively, individual roll formed spacer frame tubes were cut to length and "corner keys" were inserted between adjacent frame element ends to form the corners. In some constructions the corner keys were foldable so that the sealant could be extruded onto the frame sides as the frame moved linearly past a sealant extrusion station. The frame was then folded to a rectangular configuration with the sealant in place on the opposite sides. The spacer assembly thus formed was placed between glass lites and the IGU assembly completed.

IGUs have failed because atmospheric water vapor infiltrated the sealant barrier. Infiltration tended to occur at the frame corners because the opposite frame sides were at least partly discontinuous there. For example, frames where the corners were formed by cutting "V" shaped notches at corner locations in a single long tube. The notches enabled bending the tube to form mitered corner joints; but afterwards potential infiltration paths extended along the corner parting lines substantially across the opposite frame faces at each corner.

Likewise in IGUs employing corner keys, potential infiltration paths were formed by the junctures of the keys and frame elements. Furthermore, when such frames were folded into their final forms with sealant applied, the amount of sealant at the frame corners tended to be less than the amount deposited along the frame sides. Reduced sealant at the frame corners tended to cause vapor leakage paths.

In all these proposals the frame elements had to be cut to length in one way or another and, in the case of frames connected together by corner keys, the keys were installed before applying the sealant. These were all manual operations which limited production rates. Accordingly, fabricating IGUs from these frames entailed generating appreciable amounts of scrap and performing inefficient manual operations.

In spacer frame constructions where the roll forming occurred immediately before the spacer assembly was completed, sawing, desiccant filling and frame element end plugging operations had to be performed by hand which greatly slowed production of units.

U.S. Pat. No. 5,361,476 to Leopold discloses a method and apparatus for making IGUs wherein a thin flat strip of sheet material is continuously formed into a channel shaped spacer frame having corner structures and end structures, the spacer thus formed is cut off, sealant and desiccant are applied and the assemblage is bent to form a spacer assembly.

SUMMARY

The present application concerns a method and apparatus for reducing elongated window component scrap in an elongated window component production line. In a method of making elongated spacer frame members that prevents a first spacer frame member in a series of spacer frame members from being scrapped, a supply of thin relatively narrow sheet metal stock is provided. The stock is fed endwise to a stamping station. The stock is passed through the stamping station that stamps the stock to define a scrap length of stock followed by a connected first spacer frame defining length of stock. The scrap length of stock and the connected first spacer frame defining length of stock are fed to a roll forming station. The scrap length of stock and the connected first spacer frame defining length of stock are formed into a rigid linearly extending scrap element having opposite side walls and a base wall and a connected rigid linearly extending first spacer frame element having opposite side walls and a base wall. A connection between the scrap element and the first spacer frame element is then severed.

An apparatus for making elongated spacer frame members that prevents a first spacer frame member in a series of spacer frame members from being scrapped includes a supply station, a stamping station, a roll forming station, and a severing station. The supply station is loaded with a supply of thin relatively narrow sheet metal stock. The stamping station receives the sheet metal stock from the supply station and stamps the sheet metal stock to define a scrap length of stock followed by a connected first spacer frame defining length of stock. The roll forming station receives the scrap length of stock and the connected first spacer frame defining length of stock and forms the scrap length of stock and the connected first spacer frame defining length of stock into a rigid linearly extending scrap element and a connected rigid linearly extended first spacer frame element. The severing station severs a connection between the scrap element and the first spacer frame element.

The disclosed system has significant advantages over the the system disclosed in U.S. Pat. No. 5,361,476 to Leopold. In that system an entire first spacer frame unit was scrapped each time a new roll was threaded into the system. That first frame was only scrapped, however, after dessicant and adhesive were applied to the frame resulting in waste in both time and materials. The disclosed system avoids excess waste by use of a short piece of scrap frame material that is removed from the system conveyor prior to the dessicant application station.

The '476 patent has a single supply of strip mounted at the beginning of the frame fabrication system. The present system utilizes an automated strip changeover system. Whereas the prior system might take up to 15 minutes to switch in a new roll of strip material once a preceding strip has been exhausted, the present system achieves changeover in less than one minute. Additionally the reliance on operators for changeover increased the possibility in operator error in set up that is avoided by the disclosed system.

The rapid changeover from one roll of strip material to a next roll and the ability to rapidly switch to different width strip material has resulted in efficiencies not achievable in the prior art. In the prior art, the fact that a whole roll of spacer material was used before a change meant that window construction was dependent on receipt of a large batch of frames of a given width. This placed constraints on subsequent manufacturing processes that could be performed and these constraints were not necessarily convenient or compatible with a desire to most efficiently fill customer orders. Use of the presently disclosed system allows rapid changeover from one width strip to a next so that repair units for example can be built as needed to replace damaged window units as they occur. The system produces less work in process and real time response to customer orders in a way that increases total manufacturing throughput.

Further features and advantages will become apparent from the following detailed description with reference to the accompanying drawings.

DETAILED DESCRIPTION

Figure 1:
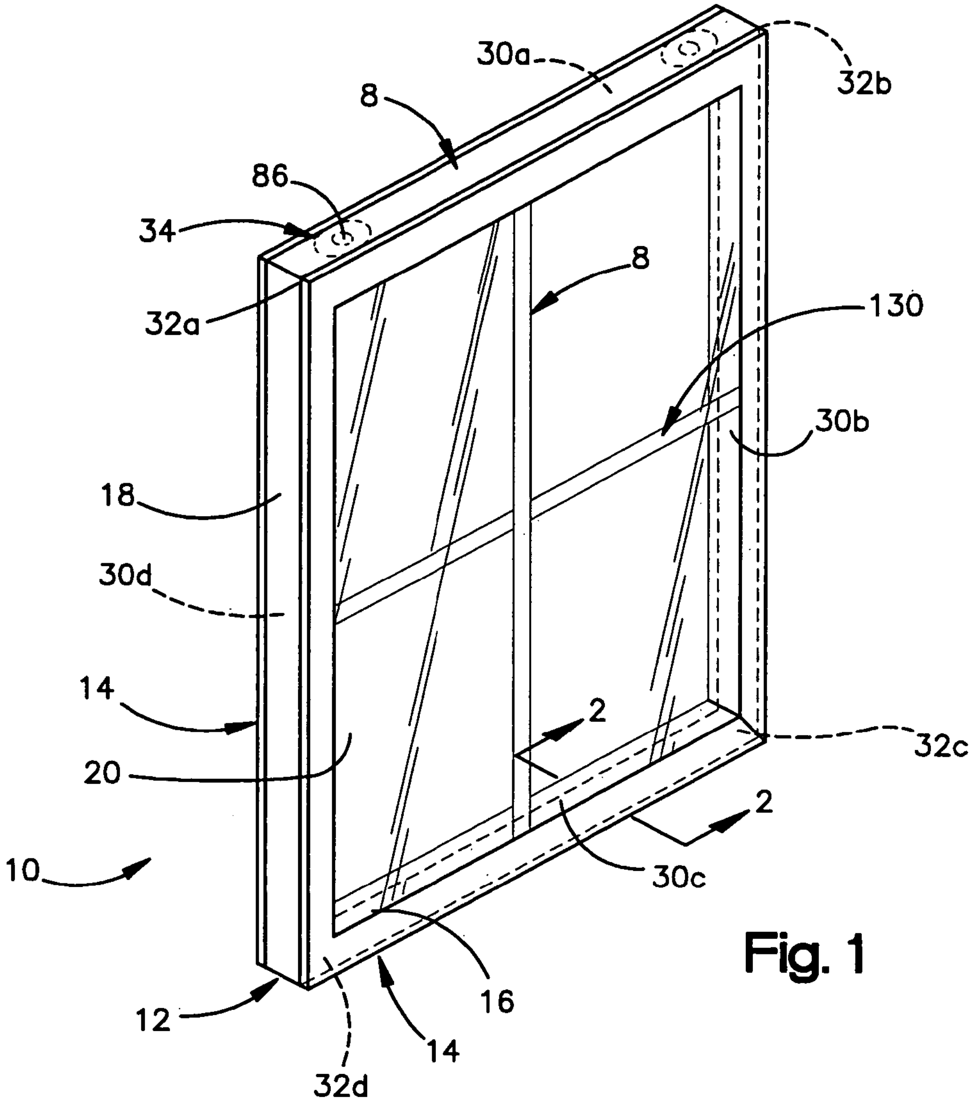
FIG. 1 is perspective view of an insulating glass unit.

The drawing Figures and following specification disclose a method and apparatus for producing elongated window components 8 used in insulating glass units. Examples of elongated window components include spacer assemblies 12 and muntin bars 130 that form parts of insulating glass units. The new method and apparatus are embodied in a production line which forms sheet metal ribbon-like stock material into muntin bars and/or spacers carrying sealant and desiccant for completing the construction of insulating glass units. While the elongated window components illustrated as being produced by the disclosed method and apparatus are spacers, the claimed method and apparatus may be used to produce any type of elongated window component, including muntin bars.

The Insulating Glass Unit

An insulating glass unit 10 constructed using the method and apparatus of the present invention is illustrated by FIGS. 1-6 as comprising a spacer assembly 12 sandwiched between glass sheets, or lites, 14. The assembly 12 comprises a frame structure 16, sealant material 18 for hermetically joining the frame to the lites to form a closed space 20 within the unit 10 and a body 22 of desiccant in the space 20. See Figure The unit 10 is illustrated in FIG. 1 as in condition for final assembly into a window or door frame, not illustrated, for ultimate installation in a building. The unit 10 illustrated in FIG. 1 includes muntin bars 130 that provide the appearance of individual window panes.

The assembly 12 maintains the lites 14 spaced apart from each other to produce the hermetic insulating "insulating air space" 20 between them. The frame 16 and the sealant body 18 co-act to provide a structure which maintains the lites 14 properly assembled with the space 20 sealed from atmospheric moisture over long time periods during which the unit 10 is subjected to frequent significant thermal stresses. The desiccant body 22 removes water vapor from air, or other volatiles, entrapped in the space 20 during construction of the unit 10.

The sealant body 18 both structurally adheres the lites 14 to the spacer assembly 12 and hermetically closes the space 20 against infiltration of airborne water vapor from the atmosphere surrounding the unit 10. The illustrated body 18 is formed from a "hot melt" material which is attached to the frame sides and outer periphery to form a U-shaped cross section.

The structural elements of the frame 16 are produced by the method and apparatus of the present invention. The frame 16 extends about the unit periphery to provide a structurally strong, stable spacer for maintaining the lites aligned and spaced while minimizing heat conduction between the lites via the frame. The preferred frame 16 comprises a plurality of spacer frame segments, or members, 30*a-d* connected to form a planar, polygonal frame shape, element juncture forming frame corner structures 32*a-d*, and connecting structure 34 for joining opposite frame element ends to complete the closed frame shape.

Each frame member 30 is elongated and has a channel shaped cross section defining a peripheral wall 40 and first and second lateral walls 42, 44. See FIG. 2. The peripheral wall 40 extends continuously about the unit 10 except where the connecting structure 34 joins the frame member ends. The lateral walls 42, 44 are integral with respective opposite peripheral wall edges. The lateral walls extend inwardly from the peripheral wall 40 in a direction parallel to the planes of the lites and the frame. The illustrated frame 16 has stiffening flanges 46 formed along the inwardly projecting lateral wall edges. The lateral walls 42, 44 add rigidity the frame member 30 so it resists flexure and bending in a direction transverse to its longitudinal extent. The flanges 46 stiffen the walls 42, 44 so they resist bending and flexure transverse to their longitudinal extents.

Figure 3:
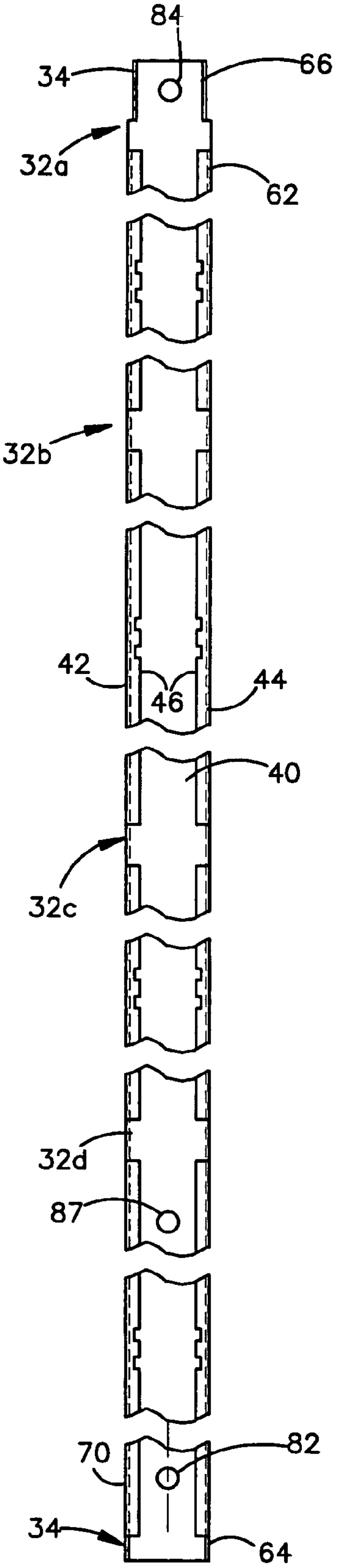
FIG. 3 is a fragmentary plan view of a spacer frame element before the element has had sealant applied and in an unfolded condition.
Figure 4:
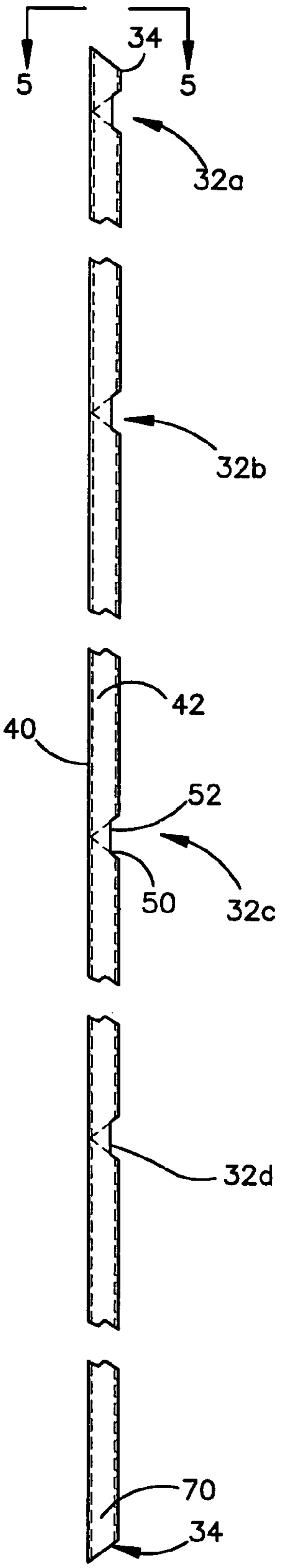
FIG. 4 is a fragmentary elevational view of the element of FIG. 3.
Figure 5:
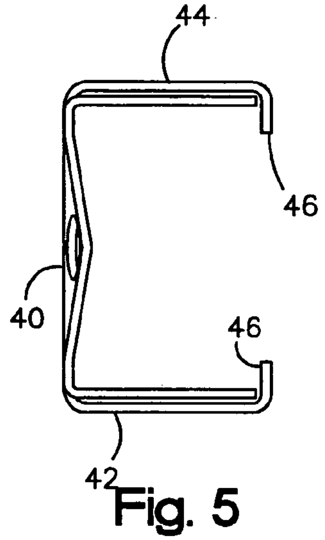
FIG. 5 is an enlarged elevational view seen approximately from the plane indicated by the line 5-5 of FIG. 4.
Figure 6:
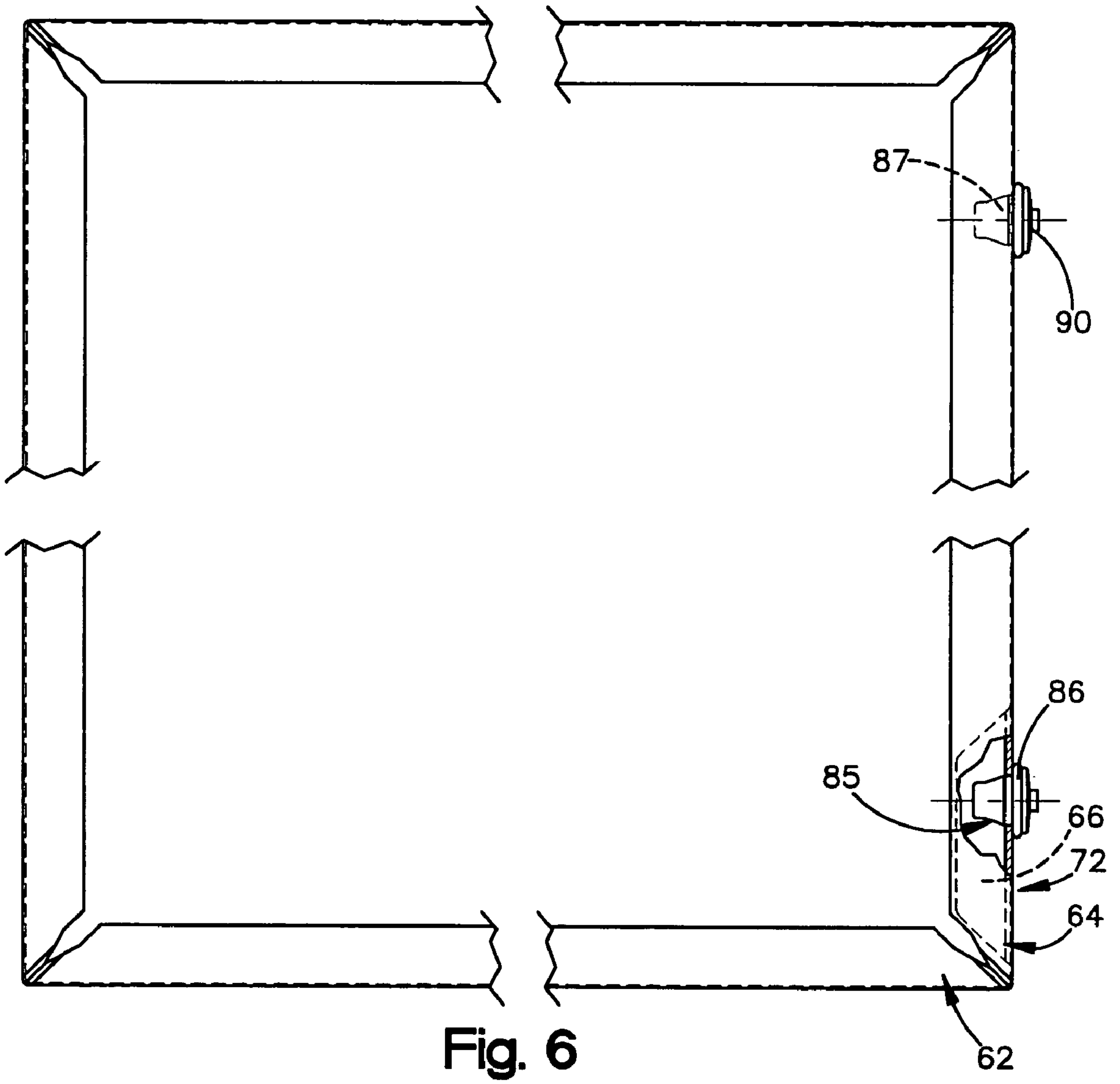
FIG. 6 is a fragmentary elevational view of a spacer frame forming part of the unit of FIG. 1 which is illustrated in a partially constructed condition.

The frame is initially formed as a continuous straight channel constructed from a thin ribbon of stainless steel material (e.g., 304 stainless steel having a thickness of 0.006-0.010 inches). Other materials, such as galvanized, tin plated steel, or aluminum, may also be used to construct the channel. The corner structures 32 are made to facilitate bending the frame channel to the final, polygonal frame configuration in the unit 10 while assuring an effective vapor seal at the frame corners as seen in FIGS. 3-5. The sealant body 18 is applied and adhered to the channel before the corners are bent. The corner structures 32 initially comprise notches 50 and weakened zones 52 formed in the walls 42, 44 at frame corner locations. See FIGS. 3-6. The notches 50 extend into the walls 42, 44 from the respective lateral wall edges. The lateral walls 42, 44 extend continuously along the frame 16 from one end to the other. The walls 42, 44 are weakened at the corner locations because the notches reduce the amount of lateral wall material and eliminate the stiffening flanges 46 and because the walls are stamped to weaken them at the corners.

The connecting structure 34 secures the opposite frame ends 62, 64 together when the frame has been bent to its final configuration. The illustrated connecting structure comprises a connecting tongue structure 66 continuous with and projecting from the frame structure end 62 and a tongue receiving structure 70 at the other frame end 64. The preferred tongue and tongue receiving structures 66, 70 are constructed and sized relative to each other to form a telescopic joint 72. See FIG. 6. When assembled, the telescopic joint 72 maintains the frame in its final polygonal configuration prior to assembly of the unit 10.

In the illustrated embodiment the connector structure 34 further comprises a fastener arrangement 85 for both connecting the opposite frame ends together and providing a temporary vent for the space 20 while the unit 10 is being fabricated. The illustrated fastener arrangement (see FIGS. 3 and 6) is formed by connector holes 84, 82 located, respectively, in the tongue 66 and the frame end 64, and a rivet 86 extending through the connector holes 82, 84 for clinching the tongue 66 and frame end 64 together. The connector holes are aligned when the frame ends are properly telescoped together and provide a gas passage before the rivet is installed.

In some circumstances it may be desirable to provide two gas passages in the unit 10 so the inert gas flooding the space 20 can flow into the space 20 through one passage displacing residual air from the space through the second passage. The drawings show such a unit. See FIGS. 3 and 6. The second passage 87 is formed by a punched hole in the frame wall 40 spaced along the common frame member from the connector hole 84. The sealant body 18 and the desiccant body 22 each defines an opening surrounding the hole 84 so that air venting from the space 20 is not impeded. The second passage 87 is closed by a blind rivet 90 identical to the rivet 86. The rivets 86, 90 are installed at the same time and each is covered with sealant material so that the seal provided by each rivet is augmented by the sealant material.

The Elongated Window Component Production Line

Figure 7:
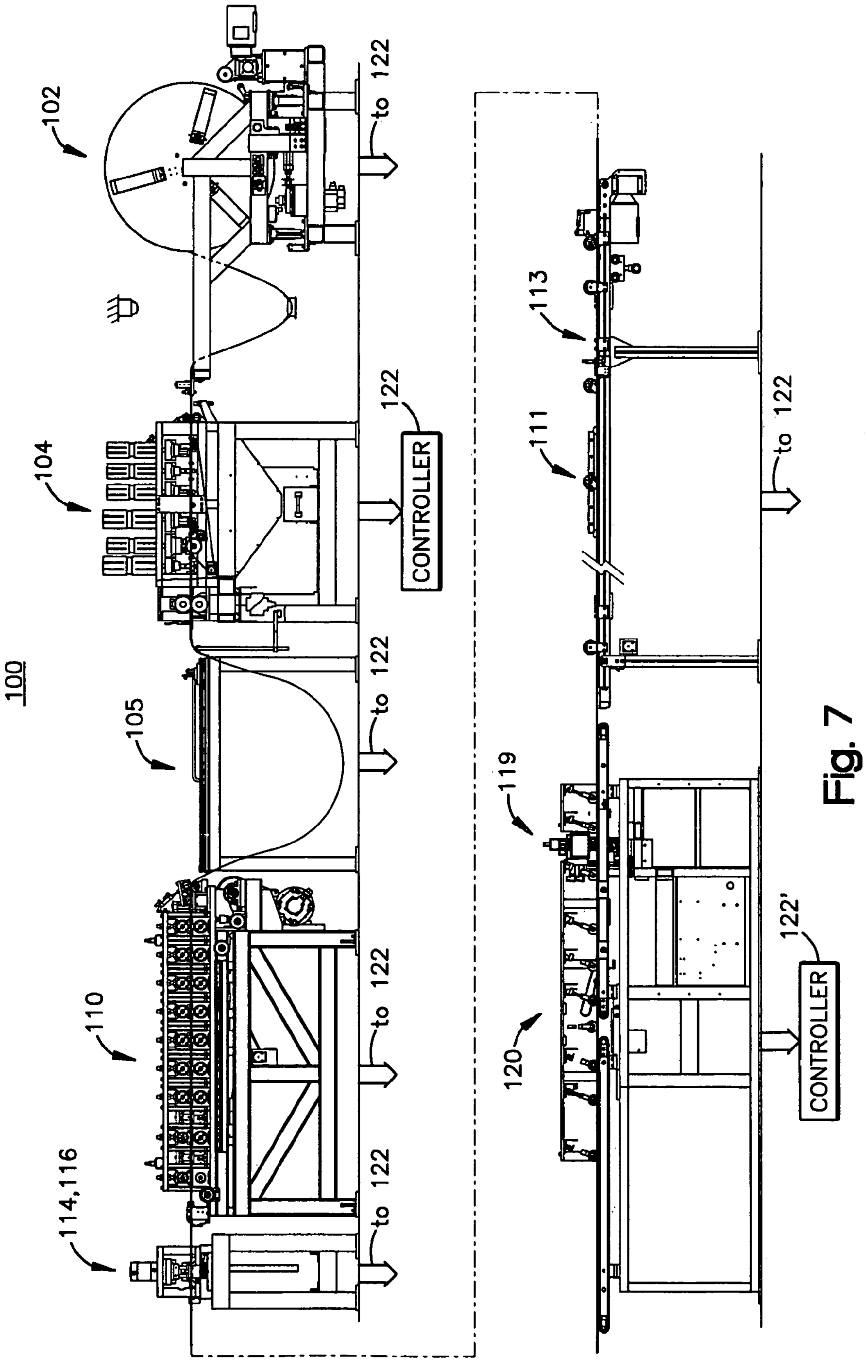
FIG. 7 is an elevational view of a spacer assembly production line constructed according to the invention.
Figure 8:
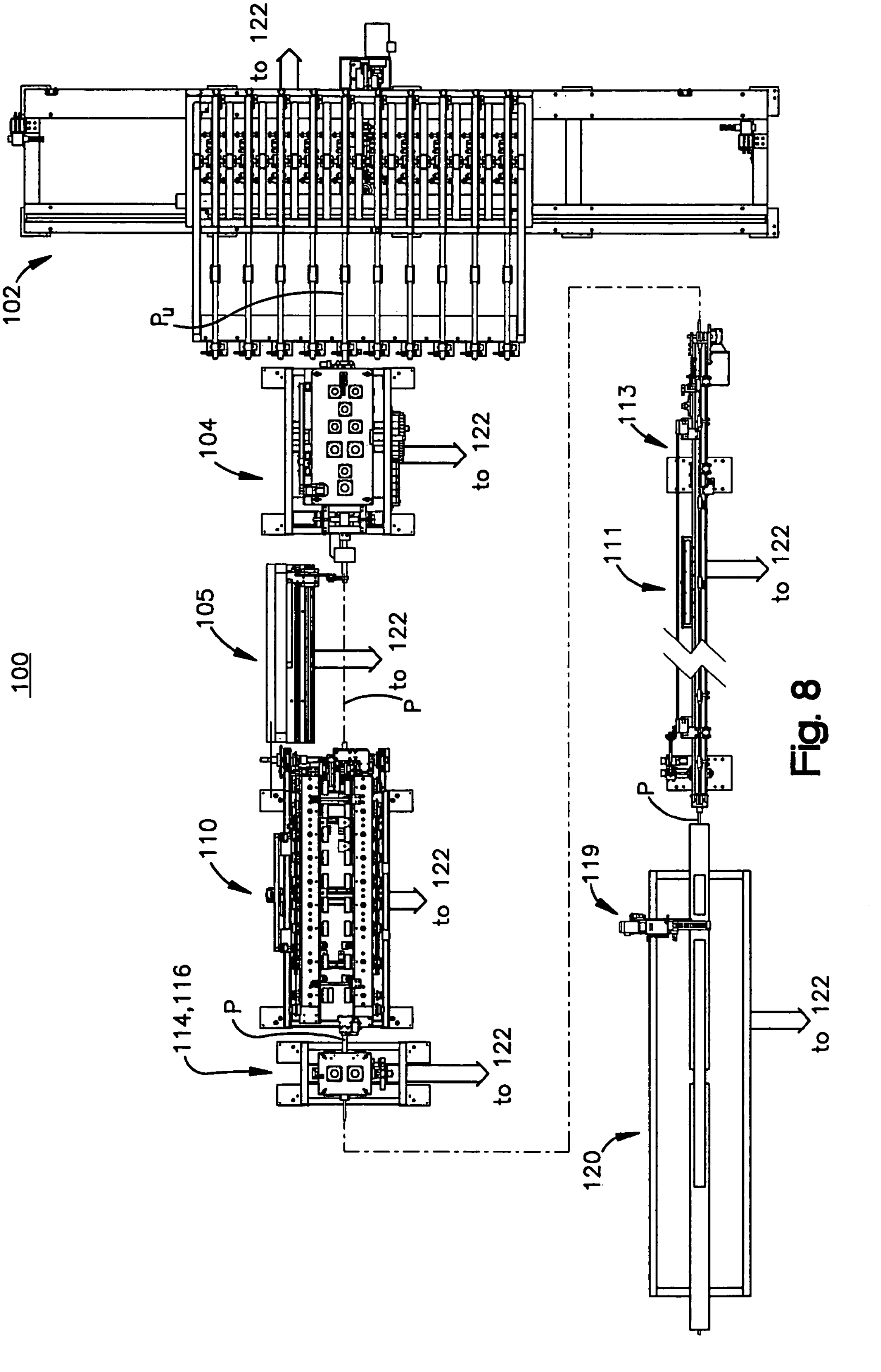
FIG. 8 is a plan view of the production line of FIG. 7.
Figure 9:
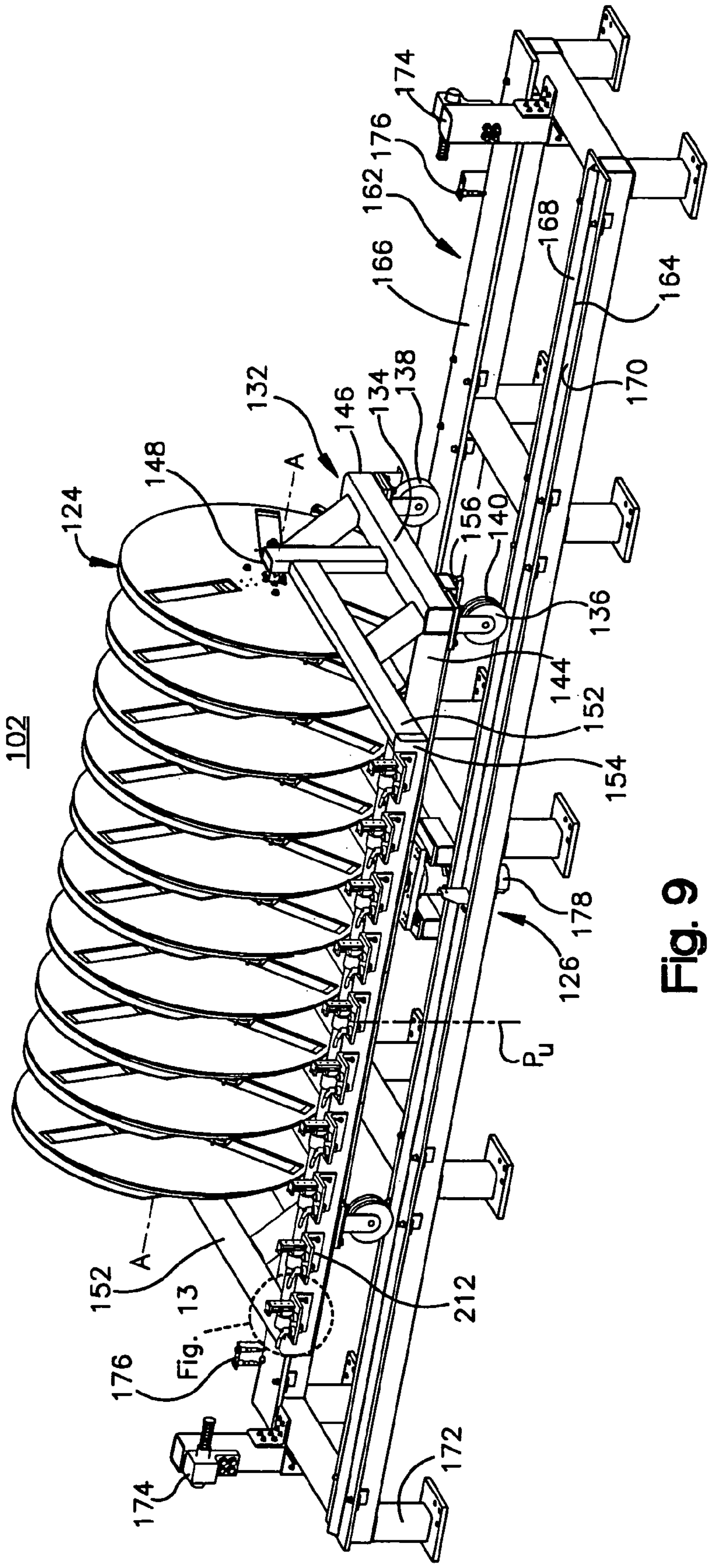
FIG. 9 is a perspective view of a stock supply station.

As indicated previously the spacer assemblies 12 and muntin bars 130 are elongated window components 8 that may be fabricated by using the method and apparatus of the present invention. Elongated window components are formed at high rates of production. The operation by which elongated window components are fashioned is schematically illustrated by FIGS. 7 and 8 as a production line 100 through which a thin, relatively narrow ribbon of sheet metal stock is fed endwise from a coil into one end of the assembly line and substantially completed elongated window components 8 emerge from the other end of the line 100.

The line 100 comprises a stock supply station 102, a first forming station 104, a transfer mechanism 105, a second forming station 110, a conveyor 113, a scrap removal apparatus 111, third and fourth forming stations 114, 116, respectively, where partially formed spacer members are separated from the leading end of the stock and frame corner locations are deformed preparatory to being folded into their final configurations, a desiccant application station 119 where desiccant is applied to an interior region of the spacer frame member, and an extrusion station 120 where sealant is applied to the yet to be folded frame member. A scheduler/motion controller unit 122 (FIG. 8) interacts with the stations and loop feed sensors to govern the spacer stock size, spacer assembly size, the stock feeding speeds in the line, and other parameters involved in production. A preferred controller unit 122 is commercially available from Delta Tau, 21314 Lassen St, Chatsworth, Calif. 91311 as part number UMAC.

The Supply Station 102

Figure 10:
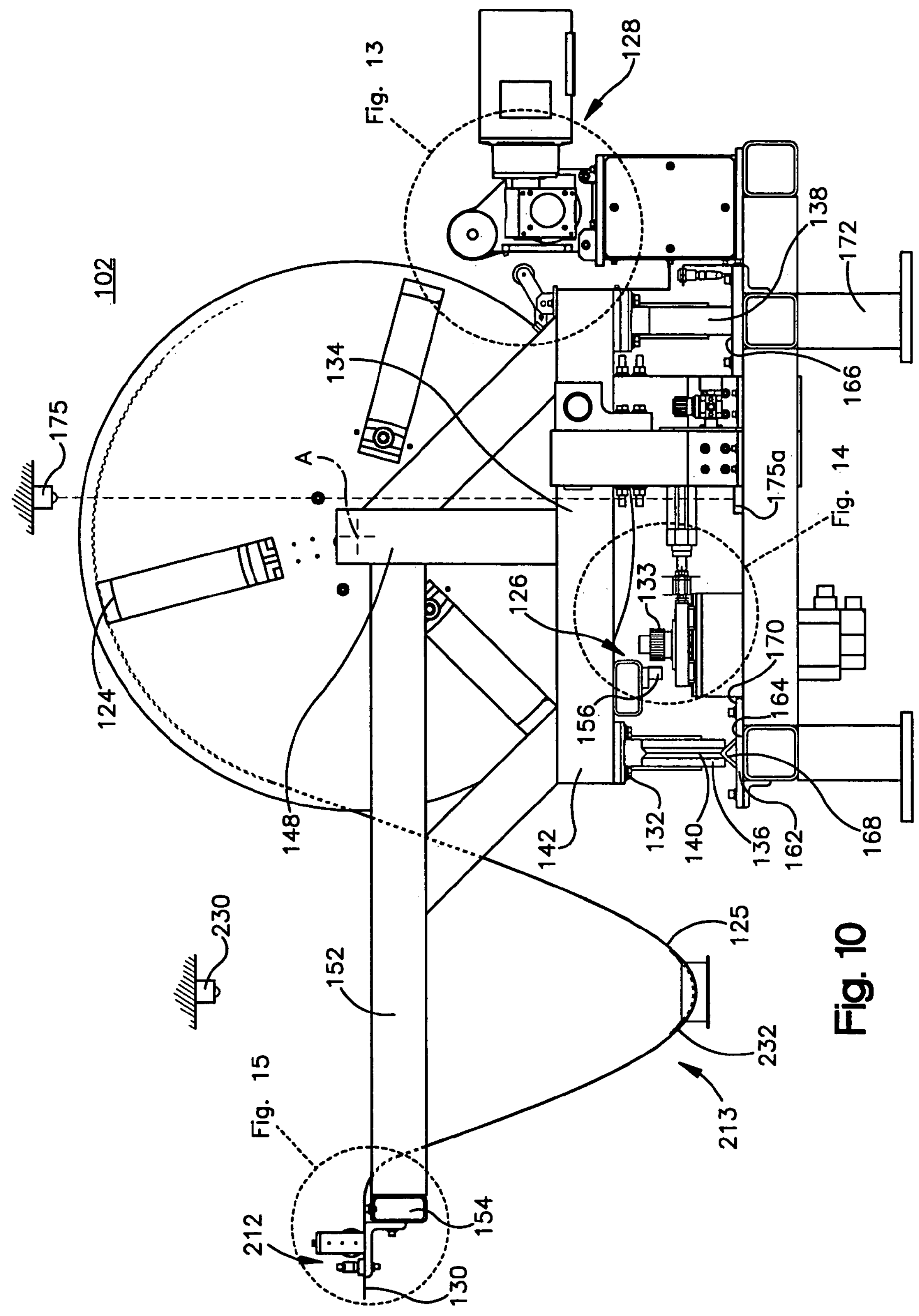
FIG. 10 is a side elevational view of a stock supply station.

The stock supply station 102 is illustrated by FIGS. 9-17. The station 102 comprises a plurality of rotatable sheet stock coils 124, an indexing mechanism 126, and an uncoiling mechanism 128 (FIG. 10). The indexing mechanism 126 is coupled to the sheet stock coils 124 for indexing a selected one of the sheet stock coils to an uncoiling position $P_U$. When a sheet stock coil 124 is located at the uncoiling position $P_U$, a sheet stock end 130 is positioned to be drawn into the first forming station 104 as will be described in detail below. The uncoiling mechanism 128 selectively uncoils sheet stock 125 from a sheet stock coil 124 indexed to the uncoiling position $P_U$ to thereby provide sheet stock to the downstream processing stations.

In the illustrated embodiment, the indexing mechanism 126 includes a carriage 132 and a drive mechanism 133 (FIG. 10). The carriage 132 supports the sheet stock coils, such that the sheet stock coils are individually rotatable about a common axis A. The illustrated carriage 132 includes a frame 134 supported by a pair of front wheels 136 and a pair of rear wheels 138. The wheels 136, 138 are secured to the frame 134 such that the carriage is moveable in the direction of axis A. The illustrated front wheels 136 each include an annular groove 140. The illustrated annular groove are substantially "v" shaped, but it should be readily apparent that any groove configuration could be employed. An elongated gear rack 156 is mounted to the frame 134. In the illustrated embodiment, the gear rack 156 extends across the length of the carriage 132.

Figure 12:
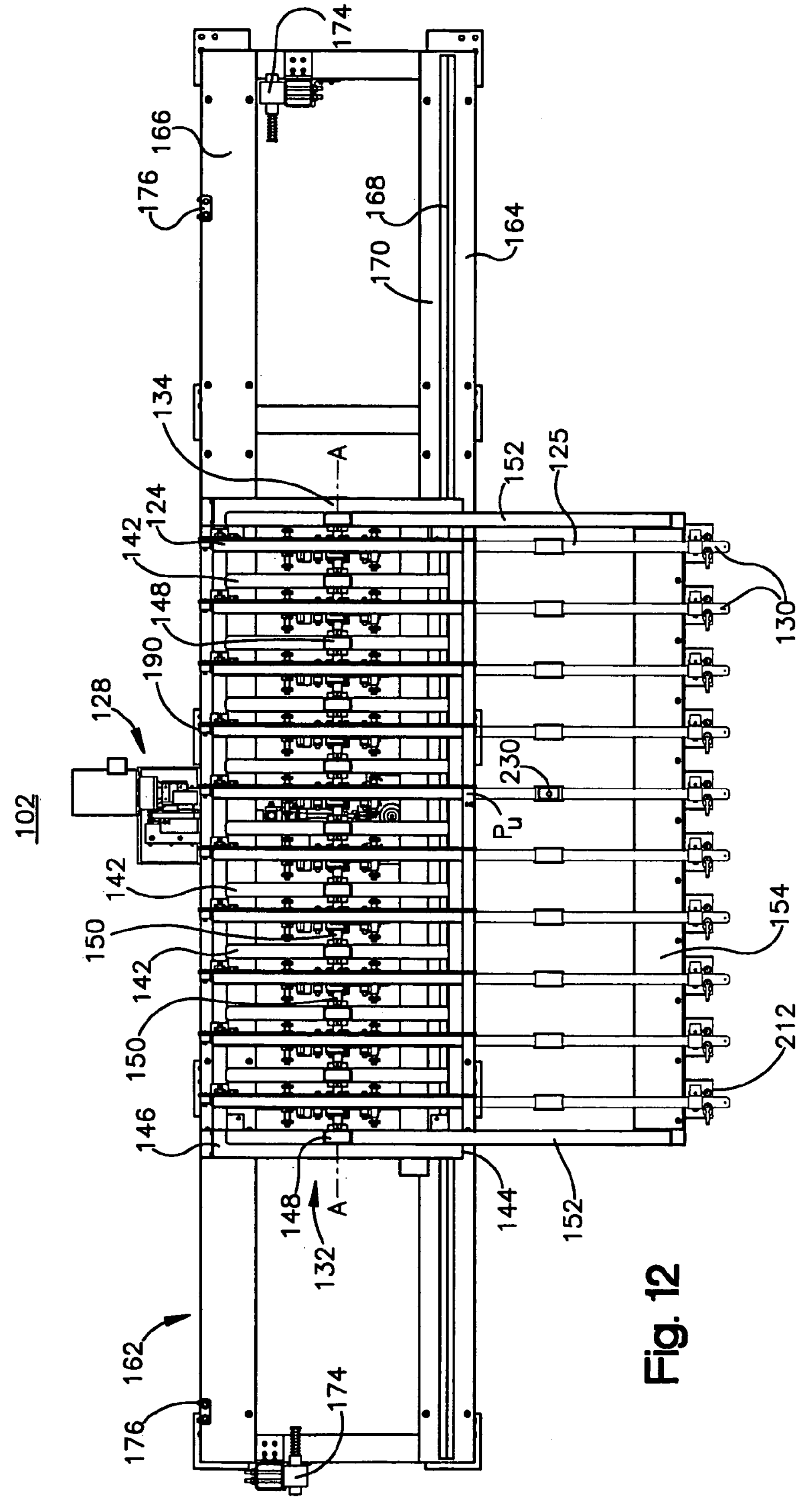
FIG. 12 is a top plan view of a stock supply station.

Referring to FIG. 12, the frame 134 includes a plurality of spaced members 142 that extend from a front 144 of the frame 134 to a rear 146 of the frame. A coil support post 148 extends upward from each member 142. Individual coil support shafts 150 are removably supported between each pair of adjacent coil support posts 148. The individually removable shafts 150 allow individual sheet stock coils 124 to be installed on the carriage and removed from the carriage. A pair of loop defining supports 152 extend from the outer coil support posts. A coil end support member 154 extends between the pair of loop defining supports 152.

In the illustrated embodiment, the carriage 132 rides on a track 162. The track 162 includes a front rail 164 and a rear rail 166. An elongated angular member 168 is secured to an upper surface 170 of the front rail 164. The angular member 168 is sized and shaped to co-act with the grooves 140 in the front wheels 136. The angular member 168 and the front wheels 136 form a guide that limits movement of the carriage to be in the direction of axis A. It should be readily apparent that many other types of guides could be employed without departing from the spirit and scope of the claimed invention.

The illustrated track 162 is supported by legs 172. A stop 174 is included at each end of the track. The stops 174 prevent the carriage 132 from moving off the end of the track 162. A sensor 176 is included near each end of the track. The sensors 176 are coupled to the controller 122. The sensors are used to detect when the carriage is approaching a stop 174 and to detect the position of the carriage on the frame to allow the controller to establish a "home" position when the stock supply station 102 is initialized.

Figure 14:
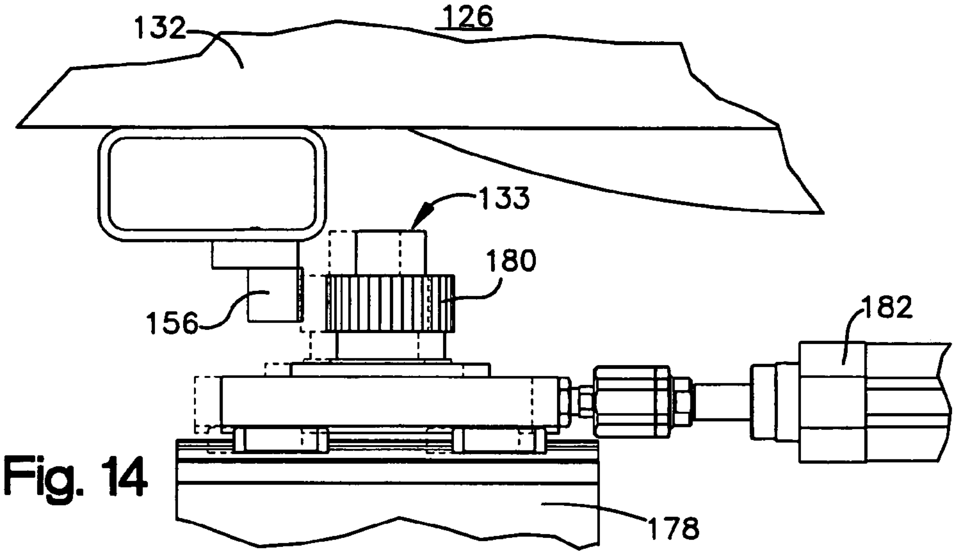
FIG. 14 is an enlarged view as indicated by reference FIG. 14 in FIG. 10.
Figure 15:
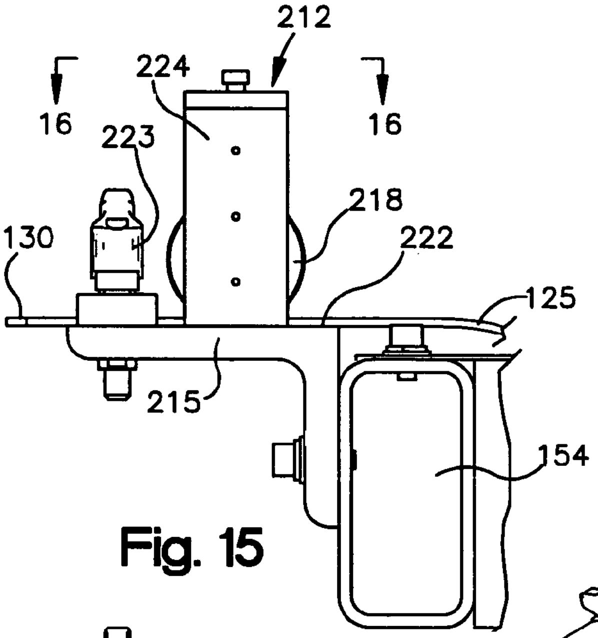
FIG. 15 is an enlarged view as indicated by reference FIG. 15 in FIG. 10.
Figure 16:
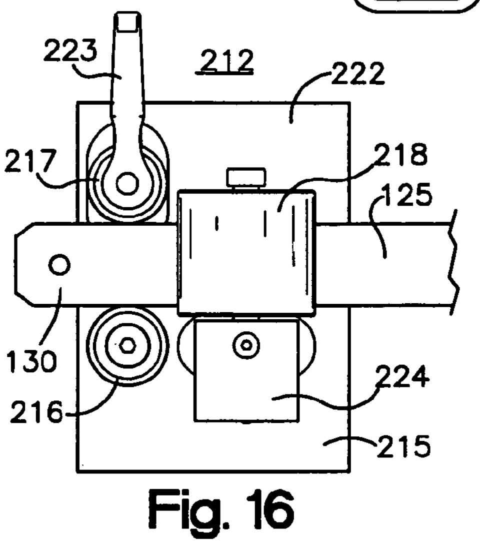
FIG. 16 is a view taken along lines 16-16 in FIG. 15.
Figure 17:
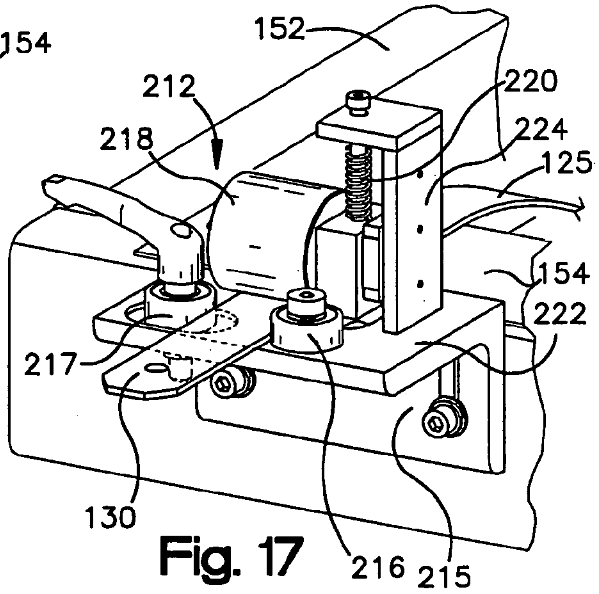
FIG. 17 is a perspective view of the clamping mechanism shown in FIG. 16.

Referring to FIG. 14, the illustrated drive mechanism 133 is controlled by the controller 122 and coupled to the carriage 132. The controller 122 controls the drive mechanism 133 to move the carriage 132 to position a selected one of the coils 124 at the uncoiling position $P_U$. The illustrated drive mechanism 133 includes the gear rack 156 attached to the carriage, a motor 178, a drive gear 180, and an engagement actuator 182. The drive gear 180 is coupled to the motor 178 and is positioned by the engagement actuator 182. The controller 122 controls the engagement actuator to selectively move the drive gear 180 between an engaged position (shown in phantom in FIG. 14) and a disengaged position (shown as solid in FIG. 14). In the engaged position, teeth of the drive gear 180 mesh with the teeth of the gear rack 156. The motor 178 is controlled by the controller 122 to position the carriage. The motor 178 is a servo drive motor that can be precisely controlled by the controller 122 to position an appropriate one of the plurality of sheet stock coils 124 at the uncoiling position $P_U$. Controlled energization of the motor 178 positions the carriage 132 is position for threading a corresponding sheet into the forming station 104 In the disengaged position, an operator is able to manually move the carriage 132 on the track 162. In an alternate embodiment, the engagement actuator is omitted and the drive gear 180 is positioned in the in the engaged position. In this embodiment, an operator is not able to manually move the carriage 132 on the track without manually removing the drive gear 180 from engagement with the gear rack 156.

Figure 11:
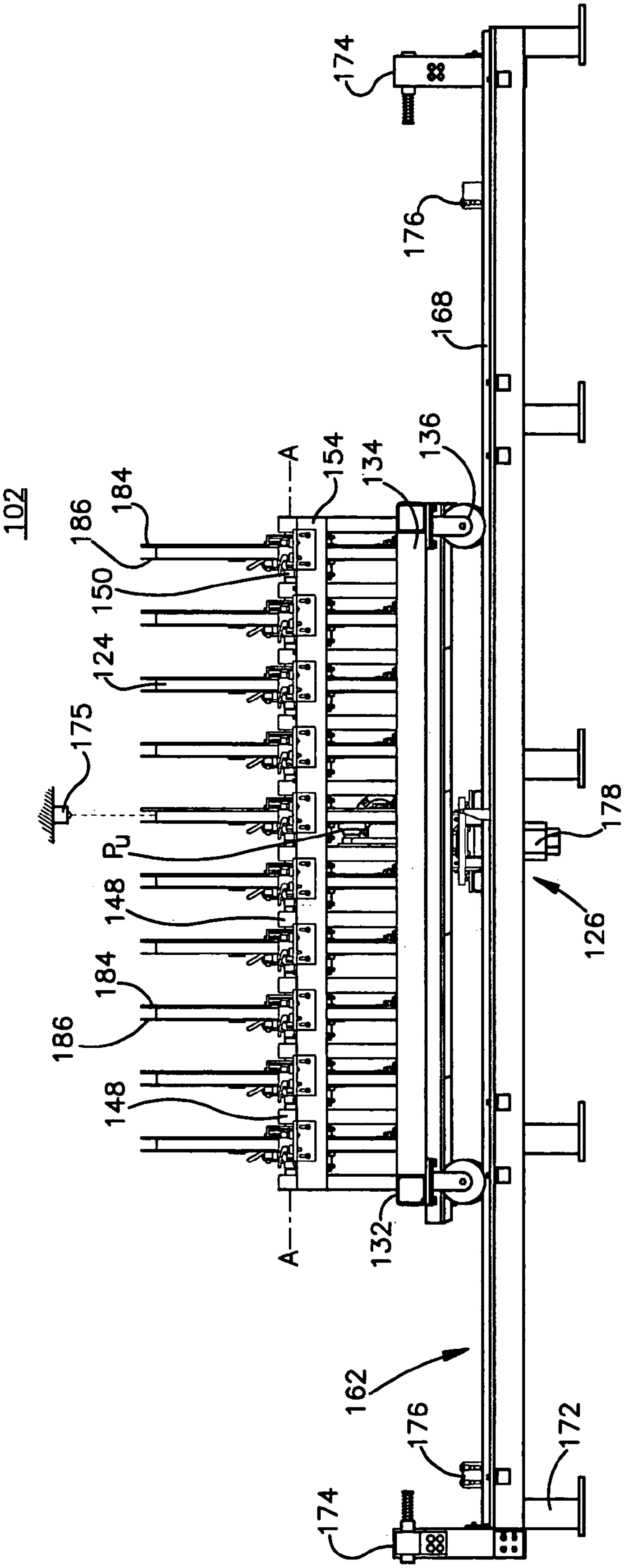
FIG. 11 is a front elevational view of a stock supply station.

Referring to FIGS. 11 and 12, each sheet stock coil 124 is mounted to a rotatable disk 184. In the illustrated embodiment, each sheet stock coil 124 is secured between the rotatable disk 184 and a plate 186. The coil support shaft 150 extends through and supports the sheet stock coil 124, the rotatable disk 184, and the plate 186, such that the sheet stock coil 124, the rotatable disk 184, and the plate 186 are rotatable about axis A. Rotation of the disk 184 as indicated by arrow 188 FIG. 13B causes sheet stock 125 to be unwound off of the coil 124.

Figure 13A:
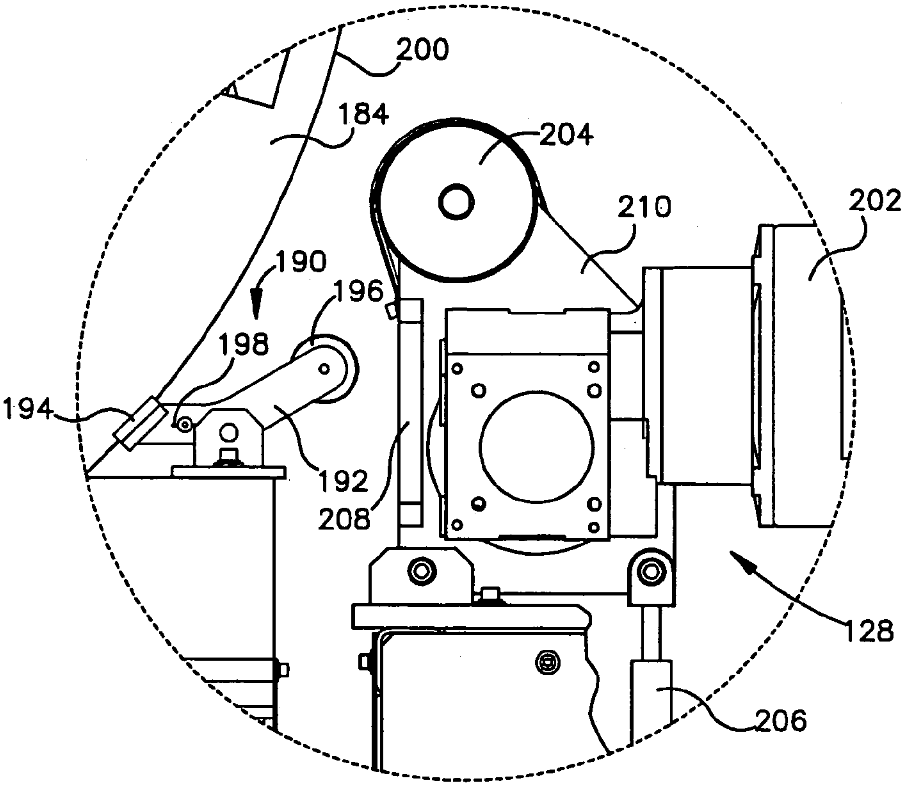
FIG. 13A is an enlarged view as indicated by reference FIG. 13 in FIG. 10.
Figure 13B:
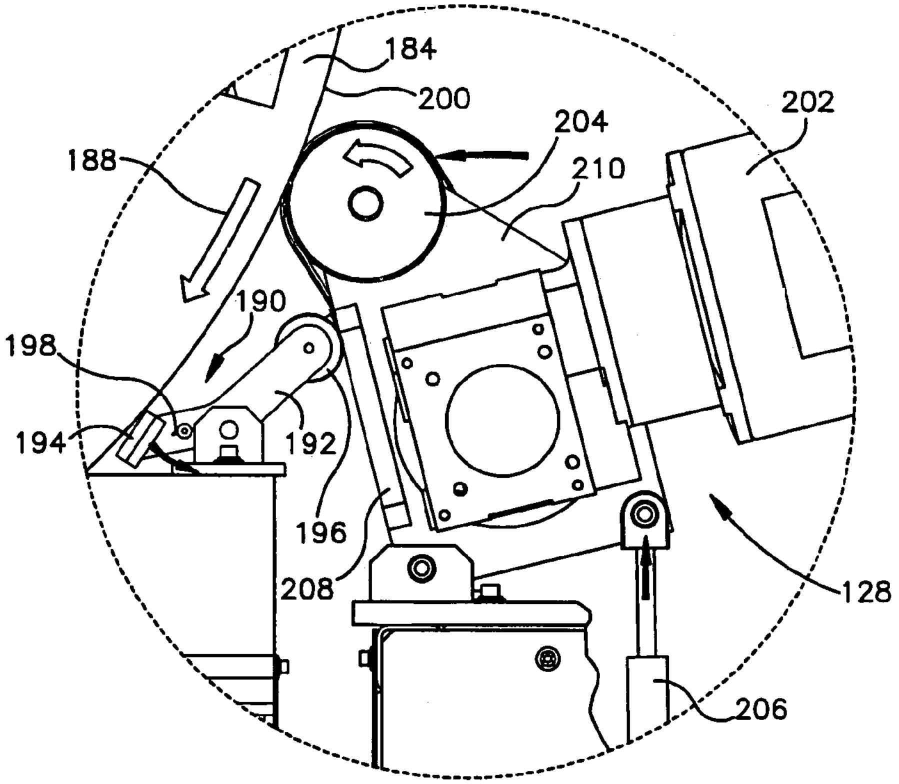
FIG. 13B is an enlarged view as indicated by reference FIG. 13 in FIG. 10.

Referring to FIGS. 13A and 13B, a brake assembly 190 is connected to the carriage 132 at each rotatable disk location. The brake assembly 190 prevents the sheet stock from inadvertently unwinding from the coil 124. The brake assembly includes a pivotable arm 192, a brake pad 194 mounted at one end of the pivotable arm, an engagement wheel 196 mounted at another end of the pivotable arm, and a biasing member 198, such as a spring, that biases the pivotable arm to a braking position (FIG. 13A). The pivotable arm 192 is pivotably mounted to the carriage 132. In the braking position, the brake pad 194 engages the rotatable disk and prevents the coil 124 from inadvertently unwinding. In a disengaged position (FIG. 13B), the brake pad is not in engagement with the disk 184 and the coil 124 may be unwound.

A wide variety of sheet stock widths can be loaded on the stock supply station. For example, a window manufacturer that makes one size of elongated window component could load all of the disks with one size of sheet stock. This may allow the line to run for an entire shift or more, without the need for an operator to load a new coil onto the stock supply station. A window manufacturer that makes a variety of different widths of elongated window components would load the stock supply station with sheet stock coils have a variety of different widths and have multiple coils for commonly used sizes.

Referring to FIGS. 12, 13A and 13B, the uncoiling mechanism 128 is positioned to individually drive each of the rotatable sheet stock coils 124 when positioned at the uncoiling position $P_U$ to individually uncoil the sheet stock 123 from each of the coils. In the illustrated embodiment, the position of the uncoiling mechanism 128 is fixed with respect to the track 162. The uncoiling mechanism 128 is controlled by the controller 122 to selectively engage and drive a radially outer surface 200 of the rotatable disk indexed to the uncoiling position $P_U$ to provide sheet stock to the processing station. In the illustrated embodiment, the uncoiling mechanism 128 includes a motor 202, a drive wheel 204, an engagement actuator 206, and a brake plate 208. The motor 202, brake plate 208, and the drive wheel 204 are mounted to a frame 210. The motor 202 is controlled by the controller 122 and is coupled to the drive wheel 204. The frame 210 is pivotably connected to the rear of the track 162. The engagement actuator 206 is controlled by the controller 122 and is coupled to the frame 210 and the track 162. The actuator 206 selectively pivots the frame 210 between a disengaged position (FIG. 13A) and an engaged position (FIG. 13B) as dictated by the controller 122. In the disengaged position, the sheet stock coil 124 at the uncoiling position $P_U$ is prevented from uncoiling by the brake assembly 190. In the engaged position, the brake plate 208 is in engagement with the wheel 196 and the drive wheel 204 is in engagement with the disk 184. The engagement of the brake plate 208 with the wheel 196 disengages the brake pad 194 from the disk 184. Rotation of the drive wheel 204 rotates the disk 184 to uncoil the sheet stock 125.

In the illustrated embodiment, a plurality of clamping mechanisms 212 position the end portion 130 of each of the sheet stock coils 124 such that the end portion of a coil indexed to the uncoiling position $U_P$ is located at an entrance of the first forming station 104. In the illustrated embodiment, the clamping mechanisms 212 are connected to the coil end support member 154. In the exemplary embodiment, the motor 202 is controlled to define a loop 213 (See FIG. 10) or droop between each sheet stock coil 124 and its associated clamping mechanism 212. The illustrated clamping mechanisms 212 each include a support 215, a pair of guide rollers 216, 217, a clamping roller 218, and a biasing member 220, such as a spring. The guide rollers 216, 217 limit lateral movement of the sheet stock and thereby guide the sheet stock 125 into the first forming station 104. The guide rollers 216, 217 are rotatably mounted to the support 215, such that an axis of rotation of each guide roller 216, 217 is perpendicular to an upper surface 222 of the support. In the illustrated embodiment, the position of the guide roller 216 is fixed and the position of the guide roller 217 is adjustable to accommodate different sizes of sheet stock 125. The adjustable guide roller 217 includes a release handle 223 that allows the roller to be selectively moved toward or away from the fixed guide roller 216. The clamping roller 218 is positioned such that its axis of rotation is parallel to the upper surface 222 of the support 215. The biasing member 220 is coupled to the clamping roller 218 and the support 215 by a bracket 224 such that the clamping roller 218 is biased toward the upper surface 222. The clamping roller presses the sheet stock 125 against the upper surface 222 to thereby guide the sheet stock 125 into the first forming station 104.

The width and depth of the frames 16 being produced may be changed from time to time as desired by passing wider or narrower sheet stock through the production line. In addition, sheet stock coils eventually run out of stock and need to be replaced. When it is necessary to change coils, the controller 122 simply indexes the next selected sheet stock coil 124 to the uncoiling position PU, to position the sheet stock end 130 at the entrance to the first forming station 104.

In the illustrated embodiment, a loop feed sensor 230 is included at the supply station. The loop feed sensor 230 (FIGS. 10 and 12) co-acts with the controller unit 122 to control the motor 202 for preventing paying out excessive stock while assuring a sufficiently high feeding rate through the production line. The loop feed sensor 230 is schematically illustrated as positioned above the sheet stock 125 at the uncoiling position $P_U$ that extends from the sheet stock coil 124 to its associated clamping mechanism 212. Stock fed to the clamping mechanism 212 from the supply station 102 droops in a catenary loop 232 (FIG. 10). The depth of the loop 232 is maintained between predetermined levels by the controller 122. The illustrated loop feed sensor 230 is an ultrasonic loop detector which directs a beam of ultrasound against the lowermost segment of the stock loop. The loop feed sensor 230 detects the loop location from reflected ultrasonic waves and signals the controller unit 122. A signal is output from the loop feed sensor 230 to the controller unit 122. The controller 122 controls the motor 202 to control the feed rate of stock to the production line.

A sensor 175 senses the amount of sheet material left on a given stock coil 124. The preferred sensor includes a IR source positioned above the uncoil position $P_U$. When the coil 124 is full or only partially dispensed the radiation from the source 175 bounces off the sheet material and the sensor does not receive a return signal. When the strip nears an end of its payout, the radiation traverses a path to a reflector 175*a* and bounces back to a photodetector included in the sensor 175. This signals the controller 122 that the coil at the uncoil position $P_u$ has been dispensed and another coil should be moved into position for unwinding.

Figure 12A:
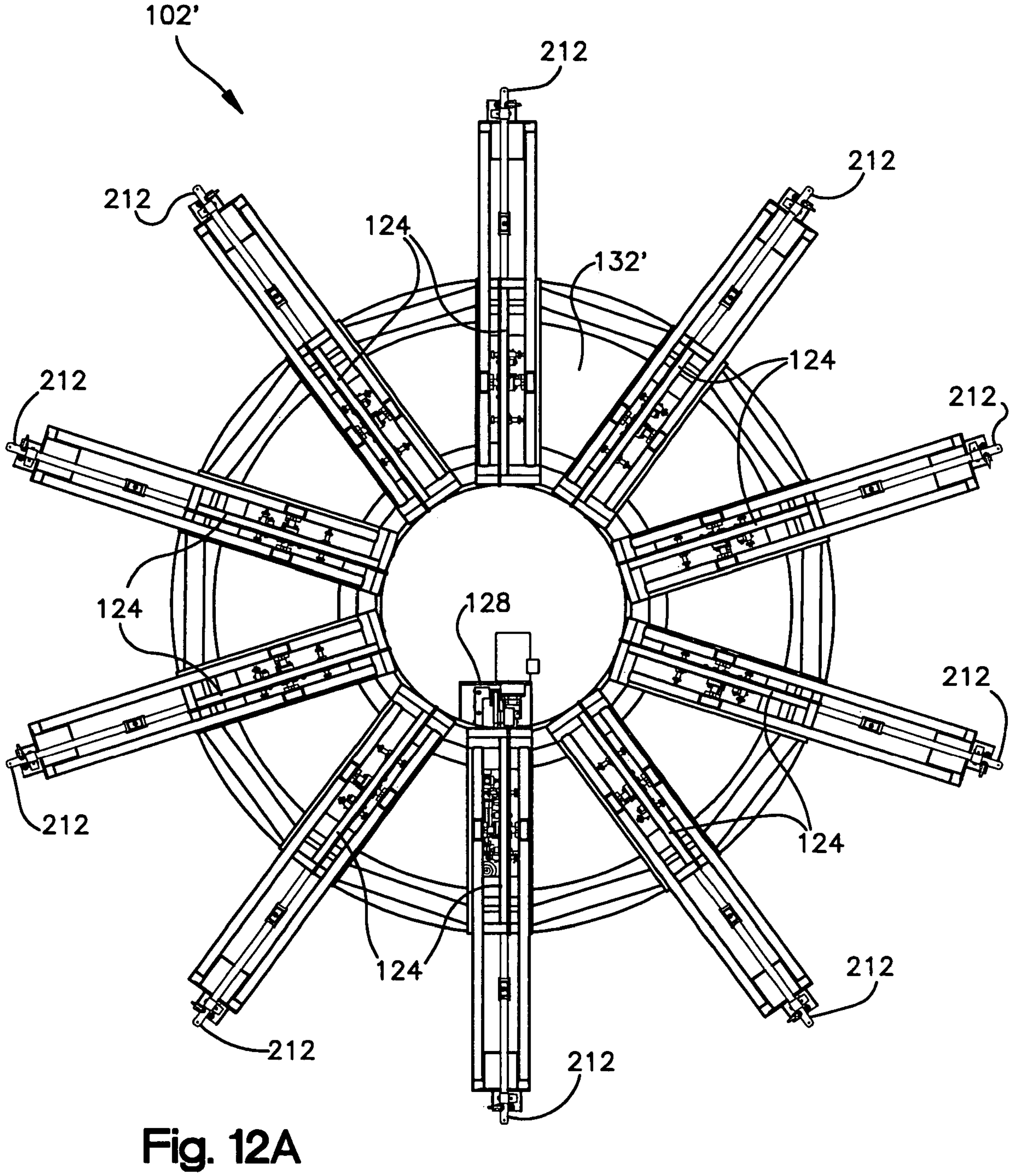
FIG. 12A is a top plan view of an alternate stock supply station.

FIG. 12A depicts an alternate supply station 102' that includes a plurality of rotatable sheet stock coils 124 that are mounted to a carriage 132'. The carriage is similar to a turntable that is drive by an indexing system having a servo motor (not shown) that precisely rotates one of the coils 124 to a uncoil position $P_u$. The supply station 102' includes a single stationary uncoiling mechanism 128 similar to the mechanism described above. The carriage 132' also supports a plurality of brake mechanisms (not shown) and clamping mechanisms 212. Under control of the controller 122, the servo motor rotates a particular one of the coils 124 to the uncoil position Pu (or orientation) such that an associated clamping mechanism is juxtaposed in relation to the forming station 104 for feeding stock material 125 from the coil into the forming station for subsequent processing described below.

The Forming Station 104

The forming station 104 (FIGS. 18-22) withdraws the stock from the clamping mechanism 212 positioned at the uncoiling position $P_U$ and performs a series of stamping operations on the stock passing through it. The station 104 comprises a supporting framework 238 fixed to the factory floor adjacent the loop sensor, a stock feed mechanism 240 that feeds the sheet stock end 130 (FIG. 10) into the forming station, a stock driving system 242 which moves the stock through the station, and stamping units 244, 246, 248, 250, 252, 254 where individual stamping operations are carried out on the stock.

Figure 20:
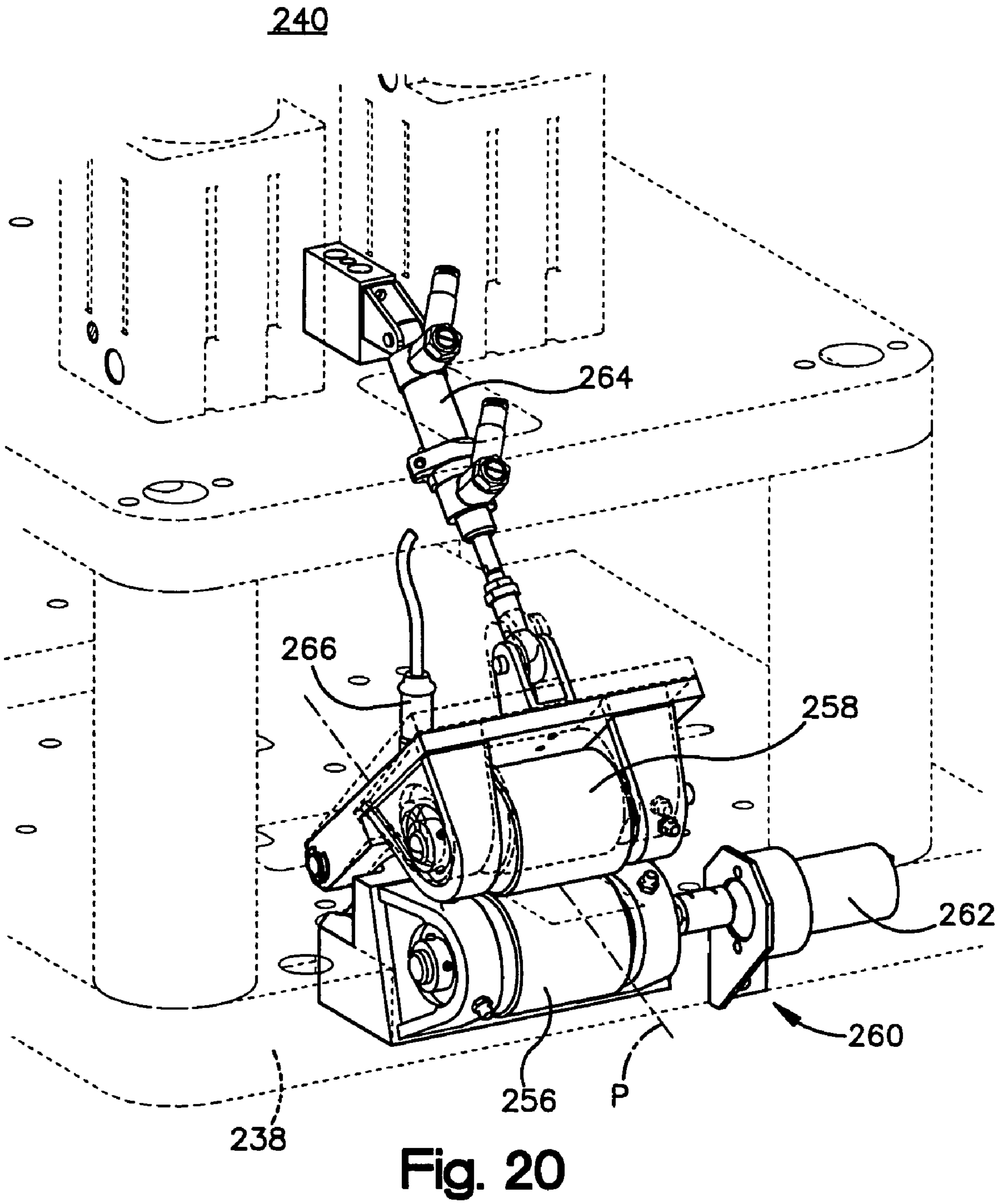
FIG. 20 is a perspective view of a stamping station entrance.

Referring to FIG. 20, the illustrated stock feed mechanism 240 comprises a pair of drive rollers 256, 258 secured to the framework 238 along a stock path of travel P at a processing station entrance 260. The pair of drive rollers 256, 258 are selectively moveable between a disengaged position (shown in phantom in FIG. 20) where the drive rollers are spaced apart and an engaged position (shown in solid in FIG. 20) where the drive rollers engage a coil end portion positioned at the entrance of the processing station by a clamping mechanism 212 that is located at the uncoiling position $P_U$. The drive rollers 256, 258 selectively feed the sheet stock positioned at the entrance of the processing station 260 into the processing station 102. In the illustrated embodiment, drive roller 256 is selectively driven by a motor 262 that is controlled by the controller 122. The drive roller 258 is pivotally connected to the framework 238. In the illustrated embodiment, the roller 258 is an idler roller that presses the sheet stock 125 against the roller 256 when the drive rollers are in the engaged position. An actuator 264 is connected to the framework 238 and the drive roller 258. The actuator 264 is selectively controlled by the controller 122 to engage sheet stock 125 positioned at the entrance of the stamping station 104. The motor 262 is controlled to feed the sheet stock 125 through the station 104 to the stock driving station 242. In the illustrated embodiment, a sensor 266 is positioned along the path of travel P, near the stock feed mechanism. The sensor 266 is used to verify that stock 125 is being fed by the stock feed mechanism 240 and to determine when the stock feed mechanism can be disengaged, because the stock 125 has reached the stock driving system. The controller 122 is in communication with the supply station 102 and the stock feed mechanism. The controller moves the pair of drive rollers to the disengaged, spaced apart position and indexes the selected sheet stock coil to the uncoiling position. At the uncoiling position, the corresponding clamping mechanism 212 positions the sheet stock end portion 130 between the pair of drive rollers 256, 258. The controller 122 moves the pair of drive rollers to the engagement position to engage the coil end portion, and rotates the drive rollers to feed the sheet stock into the processing station and to the stock driving mechanism 242.

In one embodiment, the stock feed mechanism 240 is also used to withdraw stock from the stamping station 104 when sizes are changed as will be described in further detail below. The sensor 266 is used by the controller to determine the when the feeding mechanism 240 stops withdrawing stock from the stamping station.

Figure 18:
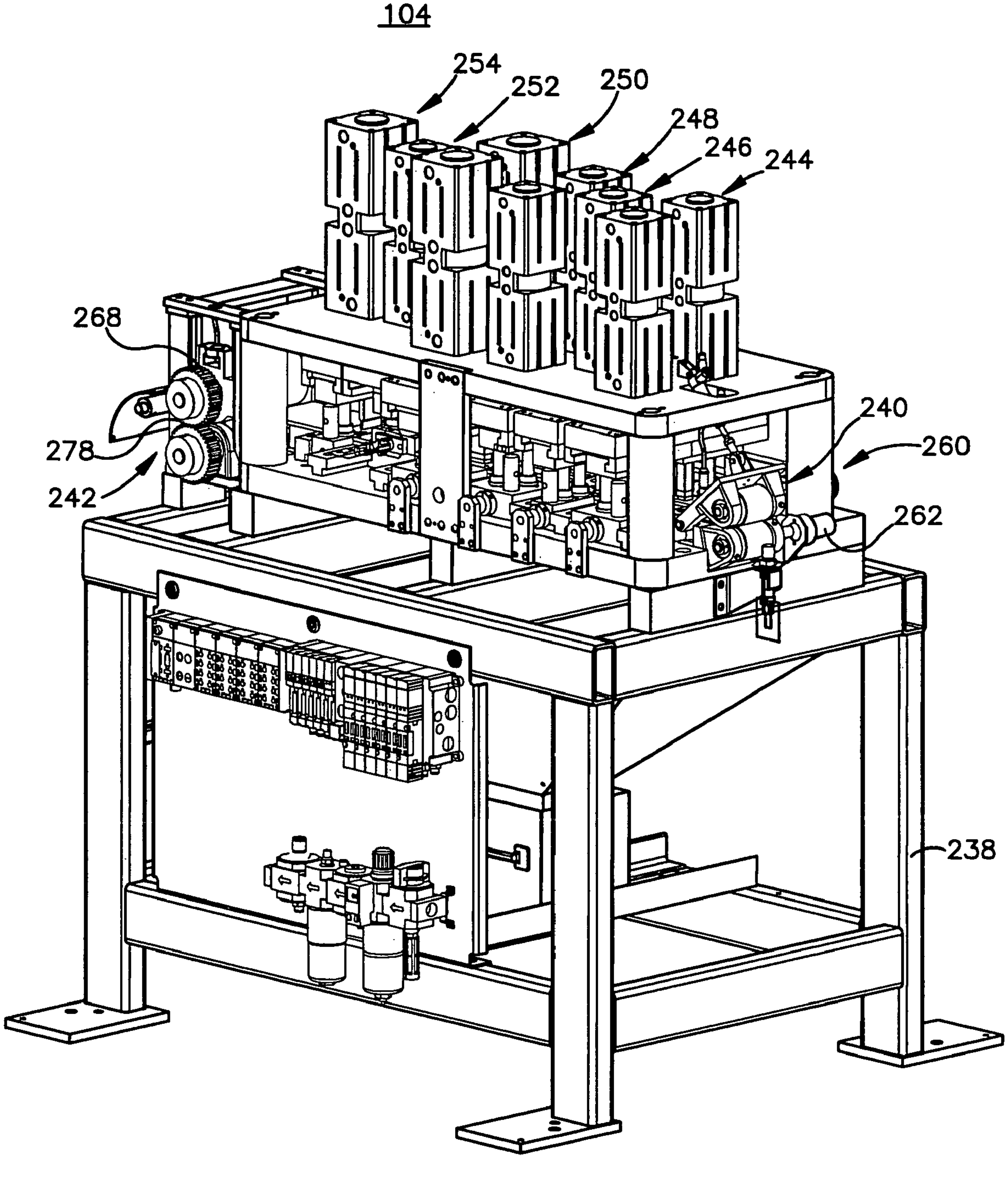
FIG. 18 is a perspective view of a stamping station.
Figure 19:
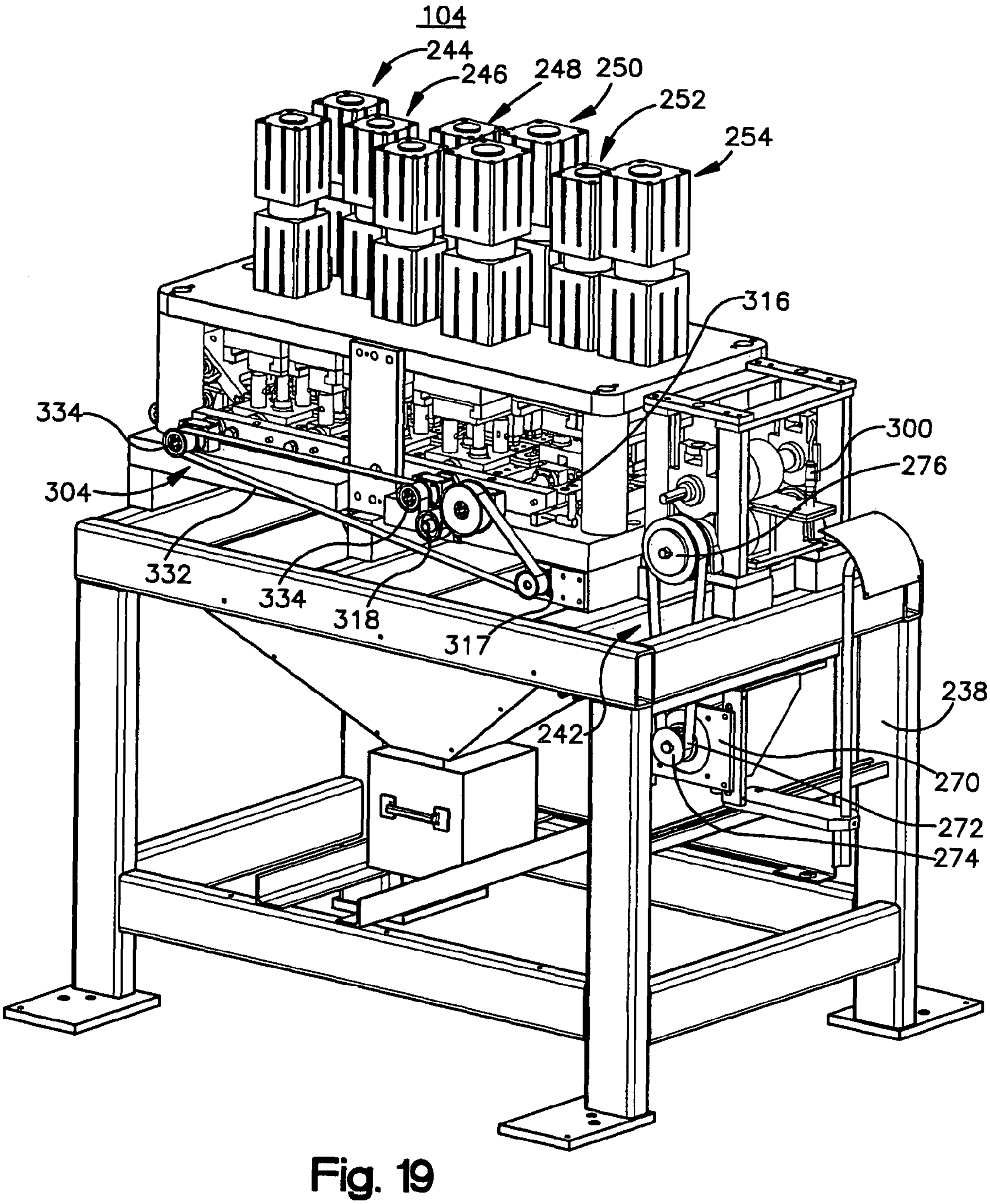
FIG. 19 is a perspective view of a stamping station.

Referring to FIGS. 18 and 19, the stock driving system 242 engages the stock provided by the stock feeding mechanism 240. The stock feeding mechanism 240 then disengages. The stock driving system 242 comprises a stock driving roll set 268 secured to the framework 238 along the stock path of travel P at the exit end of the station 104, a motor 270 (FIG. 19) is operated by the controller unit 122 for precisely driving the roll set 268, and a positive drive transmission 272 couples the motor 270 and the roll set 268.

The preferred roll set comprises a pair of drive rolls rigidly supported by bearings secured to the framework 268. The rolls define a nip for securely gripping the stock and pulling it through the station 104 past the stamping units 244, 246, 248, 250, 252, 254. In the illustrated embodiment, the rolls grip the stock so tightly that there is no stock slippage relative to either roll as the stock advances.

The illustrated motor 270 is an electric servomotor of the type constructed and arranged to start and stop with precision. Accordingly, stock passes through the station 104 at precisely controlled speeds and stops precisely at predetermined locations, all depending on signals from the controller unit 122 to the motor 270. While a servo motor is disclosed in the production line 100, it may be possible to use other kinds of motors or different stock feeding mechanisms.

The drive transmission 272 is illustrated as a timing belt reeved around sheaves 274, 276 respectively secured to the motor shaft and a shaft of the lower roll. The upper roll being coupled to the lower roll by gears 278 (FIG. 18). The timing belt has tooth-like lugs which positively engage each sheave so that the motor and roll shafts are all driven together without any slippage. Consequently, the motor shaft movement is faithfully transmitted to the roll set 268 by the timing belt so stock motion is controlled as desired in the station 104. As an alternative, the roll set 268 may be driven by gears connected to the motor shaft.

Figure 21:
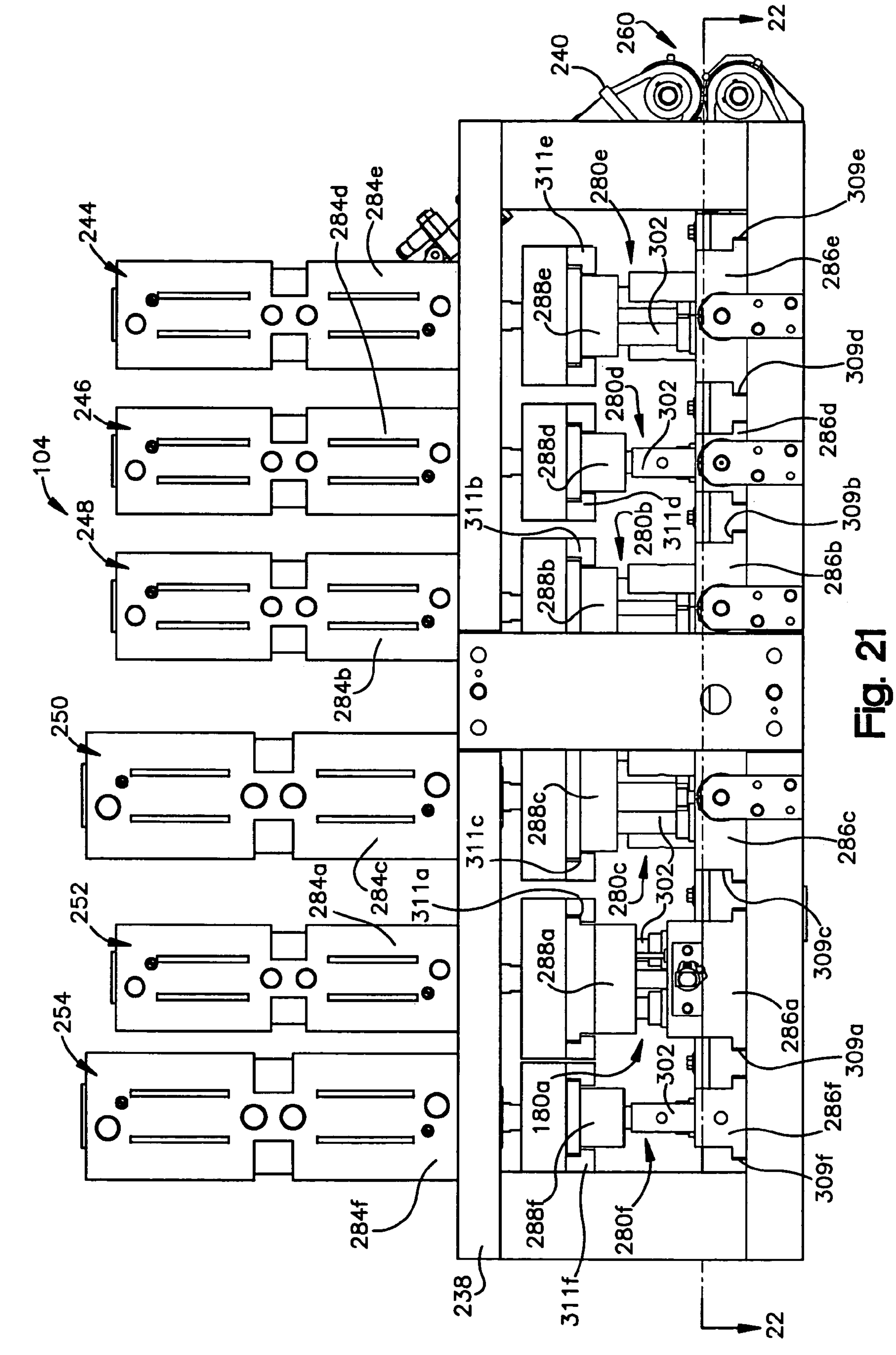
FIG. 21 is a side elevational view of a portion of a stamping station.

Referring to FIG. 21, each stamping unit 244, 246, 248, 250, 252, 254 comprises a die assembly 280 and a die actuator assembly, or ram assembly, 284. Each die assembly comprises a die set having a lower die, or anvil, 286 beneath the stock travel path and an upper die, or hammer, 288 above the travel path. The stock passes between the dies as it moves through the station 104. Each hammer 288 is coupled to its respective ram assembly 284. Each ram assembly forces its associated dies together with the stock between them to perform a particular stamping operation on the stock. For convenience, the die assemblies and ram assemblies of successive stamping units are identified by common reference numerals having different respective suffix letters.

Each ram assembly 284 is securely mounted atop the framework 238 and connected to a source (not shown) of high pressure operating air via suitable conduits (not shown). Each ram assembly 284 is operated from the controller 122 which outputs a control signal to a suitable or conventional ram controlling valve arrangement (not shown) when the stock has been positioned appropriately for stamping.

Figure 22:
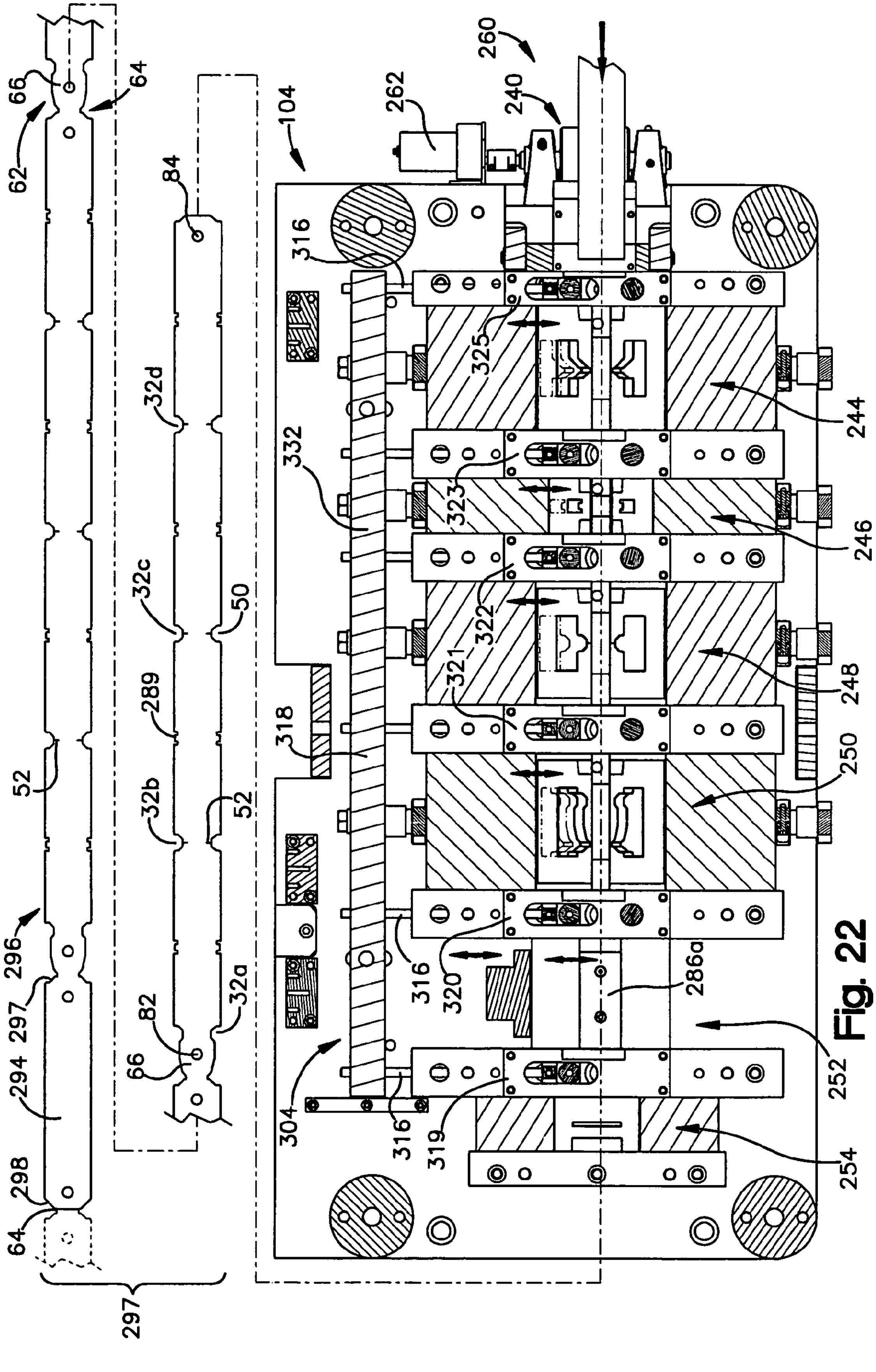
FIG. 22 is a view taken along the plane indicated by lines 22-22 in FIG. 21.

Referring to FIG. 22, the stamping unit 252 punches the connector holes 82, 84 in the stock at the leading and trailing end locations of each frame member. When included, the passage 87 is also punched in the stock by the unit 252. In the illustrated embodiment, the die set anvil 286*a* defines a pair of cylindrical openings disposed on the stock centerline a precise distance apart along the stock path of travel P. The hammer 288*a* is formed in part by corresponding cylindrical punches each aligned with a respective anvil opening and dimensioned to just fit within the aligned opening. The ram 284*a* is actuated to drive the punches downwardly through the stock and into their respective receiving openings.

The stock is fed into the stamping unit 252 by the driving system 242 and stopped with predetermined stock locations precisely aligned in the stamping station 252. The punches are actuated by the ram 286*a* so that the connector holes 82,

84 are punched on the stock midline, or longitudinal axis. When the punches are withdrawn, the stock feed resumes.

Referring to FIG. 22, the stamping unit 248 forms the frame corner structures 32*b-d* but not the corner structure 32*a* adjacent the frame tongue 66. Referring to FIGS. 21 and 22, the unit 248 comprises a die assembly 280*b* operated by a ram assembly 284*b*. The die assembly 280*b* punches material from respective stock edges to form the corner notches 50. The die assembly 280*b* also stamps the stock at the corner locations to define the weakened zones 52 which facilitate folding the spacer frame member at the corner locations. The ram assembly 284*b* preferably comprises a pair of rams connected to the upper die 288*b*.

Each weakened zone 52 is illustrated as formed by a score line (more than one score line may be included) radiating from a corner bend line location on the stock toward the adjacent stock edge formed by the corner notch 50. The score line is formed by a sharp edged ridge on the anvil 286*b*. In the illustrated embodiment, the frame members produced by the production line 100 have common side wall depths even though the frame width varies. Therefore, the score line on the anvil 286*b* are effective to form the corner structures for all the frame members made by the line 100.

Referring to FIGS. 21 and 22, the stamping unit 250 configures the leading and trailing ends 62, 64 of each spacer frame member. The unit 250 comprises a die assembly 280*c* operated by a ram assembly 284*c*. The die assembly is configured to punch out the profile of the frame member leading end 62 as well as the profile of the adjoining frame member trailing end 64 with a single stroke. The leading frame end 62 is formed by the tongue 66 and the associated corner structure 32*a*. A trailing frame end 64 associated with the preceding frame member is immediately adjacent the tongue 66 and remains connected to the tongue 66 when the stock passes from the unit 250. The ram assembly 284*c* comprises a pair of rams each connected to the hammer 288*c*.

The corner structure 32*a* is generally similar to the corner structures 32*b-d* except the notches 50 associated with the corner 32*a* differ due to their juncture with the tongue 66. The die assembly therefore comprises a score line forming a ridge like the die set forming the remaining frame corners 32*b-d*.

In the illustrated embodiment the stamping unit 246 forms muntin bar clip mounting notches in the stock. The muntin bar mounting structures include small rectangular notches. The unit 246 comprises a ram assembly 284d coupled to the notching die assembly 280*d*. The anvil 286*d* and hammer 288*d* of the notching die assembly are configured to punch a pair of small square corner notches 289 on each edge of the stock. Accordingly the ram assembly 284*d* comprises a single ram which is sufficient to power this stamping operation. A single stroke of the ram actuates the die set to form the opposed notches simultaneously and in alignment with each other along the opposite stock edges.

Referring to FIG. 22, the stamping station 104 defines a scrap piece 294 followed by a connected first spacer frame defining length 296 of stock in a given series 297 of spacer frames. In one embodiment, the scrap piece 294 is defined by the stamping station 104 whenever a different coil is indexed to the uncoiling station and fed into the forming station 104. This prevents the first spacer frame member in a series of spacer frame members made from the indexed coil from being scrapped. Instead, only the scrap piece 294 is scrapped. A first spacer frame member in a series of spacer frame members may otherwise need to be scrapped for a variety of reasons. For example, the leading end 130 of the material initially fed into the station may not be cut to define the leading edge of a spacer frame, the leading edge may be bent, and/or the first spacer frame member may not be properly formed by the second forming station 110. In the illustrated embodiment, the scrap defining length 296 is substantially shorter (½ as long or shorter for a typical frame) than the length of stock needed to form a typical elongated window component. The resulting scrap sheet stock 125 is thereby reduced.

Referring to FIGS. 21 and 22, the stamping unit 244 configures the leading edge 298 of the scrap piece 294 and trailing end 64 of the last spacer frame member in a series of spacer frame members formed from the indexed coil 124. The trailing edge 297 of the scrap unit is formed by the stamping unit 250 when the leading edge of the first spacer in the next series of spacers formed from this particular sheet stock coil is stamped. The unit 244 comprises a die assembly 280*e* operated by a ram assembly 284*e*. The die assembly is configured to punch out the profile of the scrap piece leading end 298 as well as the profile of the end 64 of the last frame member in the series of spacer frame members with a single stroke. The ram assembly 284*e* comprises a pair of rams each connected to the hammer 288*e*.

Referring to FIG. 22, at the end of a series of spacer frame members, the stamping unit 244 forms the trailing end of the last spacer frame member in the series and the leading end 298 of the scrap piece. The stock is then indexed to stamping unit 254 where the connection between the end of the last spacer frame member and the leading end 298 of the scrap piece 294 is severed. The unit 254 comprises a die assembly 280*f* operated by a ram assembly 284*f*. The die assembly 280*f* punches the material that spans the respective stock edges to sever the stock. The ram assembly 284*f* preferably comprises a ram connected to the upper die 288*f*.

Referring to FIG. 19, a sensor 300 detects the end of the last spacer frame in a series of spacer frame members. Upon detection of the severed end of the last spacer frame, the controller 122 causes the stock feed mechanism 240 to move to the engaged position. The controller then actuates the motor 262 to pull the stock 125 out of the stamping station 104 and position the stock end 130 at the entrance to the stamping station. The stock that forms the last spacer frame member in the series is driven out of the machine by the stock driving mechanism 242. The controller then moves the stock feed mechanism 240 to the disengaged position to release the stock end 130. The stock end remains secured by its clamping mechanism 212. The controller may then index the next selected coil to the uncoiling position $P_U$ and thereby place its end 130 between the rollers 256, 258. The controller 122 then controls the stock feed mechanism 240 to start the next series of spacer frame units.

In order to accommodate wider or narrower stock passing through the station 102 die assemblies 280*b-e* are split. In the illustrated embodiment, one side of each die assemblies is fixed and the opposite side each split die assembly is adjustably movable toward and away from the corresponding fixed die assembly to form different width spacer frames. Thus, each anvil 286*b-e* is split into two parts and each hammer 288*b-e* is likewise split. To maintain die assembly 280*a* in the center of the path of travel P, die assembly 280*a* is also moveable.

Referring to FIG. 21, the moveable opposed hammer and anvil parts are linked by vertically extending guide rods 302. The guide rods 302 are fixed in the hammer parts and slidably extend through bushings in the opposed anvil parts. The guide rods 302 both guide the hammers into engagement with their respective anvils and link the hammers and respective anvils so that all the hammers and anvils are adjusted laterally together.

Referring to FIGS. 19 and 22, the moveable hammer and anvil parts of each die assembly are movable laterally towards and away from the fixed hammer and anvil parts by an actuating system 304 to desired adjusted positions for working on stock of different widths. The system 304 firmly fixes the die assembly parts at their laterally adjusted locations for further frame production. Referring to FIG. 21, the anvil parts of each die assembly 280*a-e* are respectively supported in ways 309 attached to the stamping unit frame 238. The hammer parts of each die assembly are each supported in ways 311 fixed its respective die actuator, or ram 284*a-e*. The ways 309, 311 extend transversely of the travel path P and the actuating system 304 shifts the hammer parts and the anvil parts simultaneously along the respective ways between adjusted positions.

The illustrated actuating system is controlled by the controller 122 to automatically adjust the station 104 for the stock width provided at the entrance of the station. The width of the stock provided to the station 104 may be detected and the controller automatically adjusts the station 104 to accommodate the detected width. Referring to FIGS. 19 and 22, the illustrated actuating system 304 provides positive and accurate moveable die assembly section placement relative to the stock path of travel P. The system 304 comprises a plurality of drivescrews 316, a drive transmission 318 coupled to the drivescrews, and die assembly driving members 319, 320, 321, 322, 323, 325 driven by the drivescrews 326 and rigidly linking the drivescrews to the anvil parts.

The drivescrews 316 are disposed on parallel axes 324 and mounted in bearing assemblies connected to lateral side frame members 330. Each drivescrew is threaded into its respective die assembly driving member 319, 320, 321, 322, 323, 325. Thus when the drivescrews rotate in one direction the driving members 319, 320, 321, 322, 323, 325 force their associated die sections to shift laterally away from the fixed die sections. Drivescrew rotation in the other direction shifts the die sections toward the fixed die sections. The threads on the drivescrews are precisely cut so that the extent of lateral die section movement is precisely related to the angular displacement of the drivescrews creating the movement.

The hammer sections of the die assemblies are adjustably moved by the anvil sections. The guide rods 302 extending between confronting anvil and hammer die sections are structurally strong and stiff and serve to shift the hammer sections of the die assemblies laterally with the anvil sections. The hammer sections are relatively easily moved along the upper platen ways 311.

In the illustrated embodiment, the drive transmission 318 is driven by a motor 317 that is controlled by controller 122. The illustrated transmission 318 comprises a timing belt 332 and conforming pulleys 334 on the drivescrews and motor 317 around which the belt is reeved. In the illustrated embodiment, the pulley 334 that drives the die assembly 252 is larger, since the movement of the die assembly 252 is half that of the movement of the other die assemblies. This keeps the gas holes centered on the path of travel of P. The angular position of the screws is measured and provided to the controller 122. In one embodiment, the station width that corresponds to the measured angular position is displayed on a controller screen 123 where it can be read by the operator. In one embodiment a digital encoder (not illustrated) is associated with one of the jackscrews. The encoder is coupled, via the scheduler/motion controller unit 122. Precise movement of the jackscrews is accomplished using the motor 317 linked to and controlled by motion control unit 122.

The stock moves through the forming station 104 intermittently, stopping completely at each location where it is stamped. The average rate of stock feed can vary widely from one frame member to the next. For instance, if the station 104 forms a spacer frame member for ultimate use in a large "picture" window having no muntin bars, the rate of stock feed is relatively high because the stock is stopped only to stamp the corner structures, the frame ends and to punch holes. The stock moves continuously (and may move rapidly) through the station between corner structure locations.

If the immediately succeeding spacer frame is intended for use in a relatively small window having a number of muntin bars the stock feed must be stopped to stamp all the muntin bar connection locations as well as the remaining stamping operations. The average rate of stock feed in this case is low because of all the stops.

Transfer Mechanism 105

Figure 23:
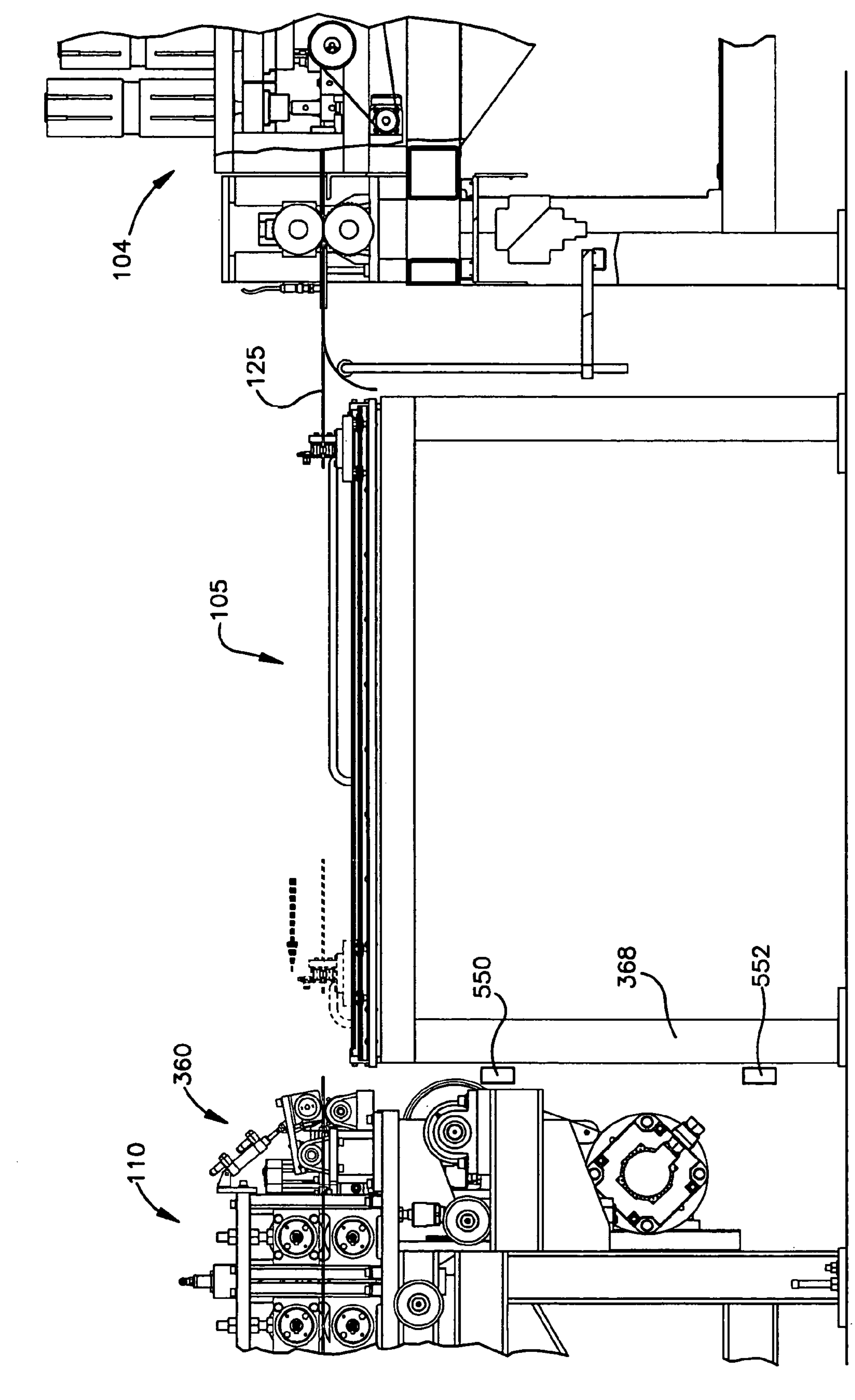
FIG. 23 is a side elevational view of a transfer mechanism that transfers sheet stock from a stamping station to a roll forming station.

Referring to FIG. 23, the transfer mechanism 105 automatically feeds the elongated sheet stock 125 from the stamping station 104 into a down stream station, such as a roll forming station 110 in the window component production line 100. The transfer mechanism is positioned between the stamping station 104 and the roll forming station 110. In the illustrated embodiment, the transfer mechanism 105 provides the stamped sheet stock to a feed mechanism 360 positioned at an entrance to the roll forming station 110. The controller 122 is in communication with the stamping station 104, the transfer mechanism 105, and the feed mechanism 360. The controller 122 causes the transfer mechanism to engage stock material 125 that extends from the stamping station 104 and transfer the stock material paid out by the stamping station to the feed mechanism. The controller 122 then drives the feed mechanism to feed the elongated sheet stock into the roll forming station 110. In the illustrated embodiment, the stamping station 104 and the roll forming station 110 are controlled by the controller 122 to create a catenary loop 362 (FIG. 24) between the stamping station and the roll forming station.

Figure 24:
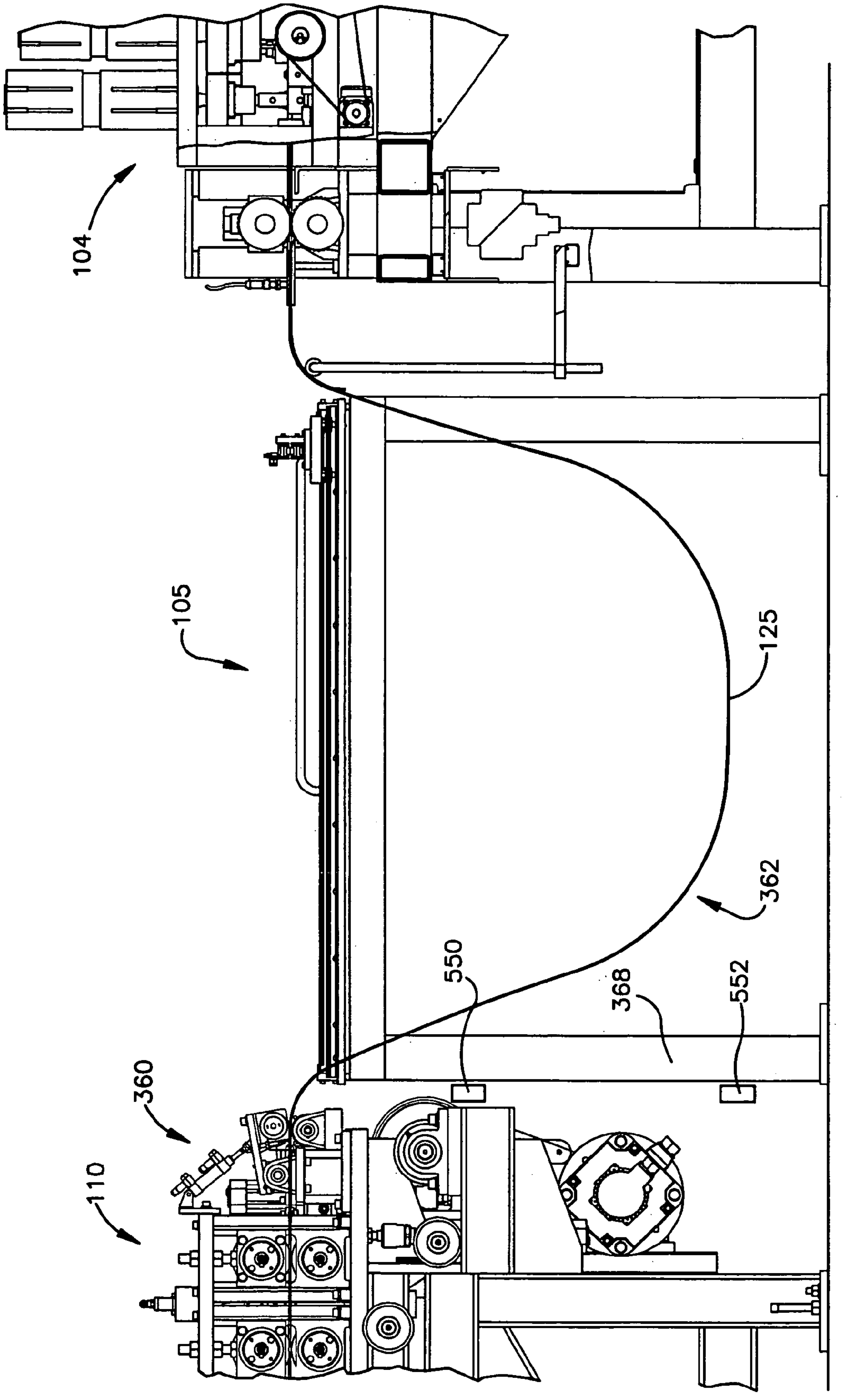
FIG. 24 is a side elevational view of sheet stock extending from a stamping station to a roll forming station.
Figure 25:
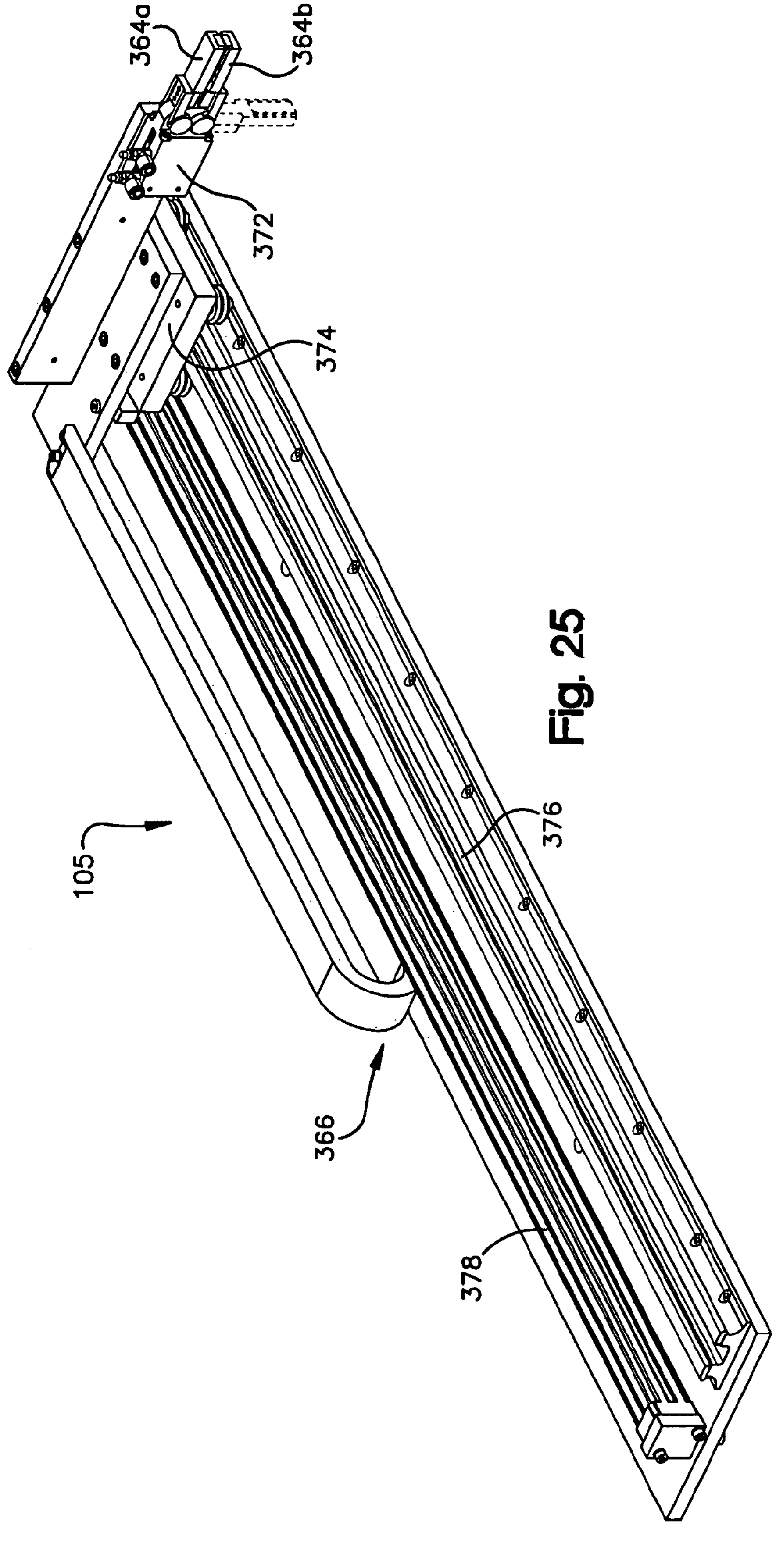
FIG. 25 is a perspective view of a transfer mechanism.
Figure 26:
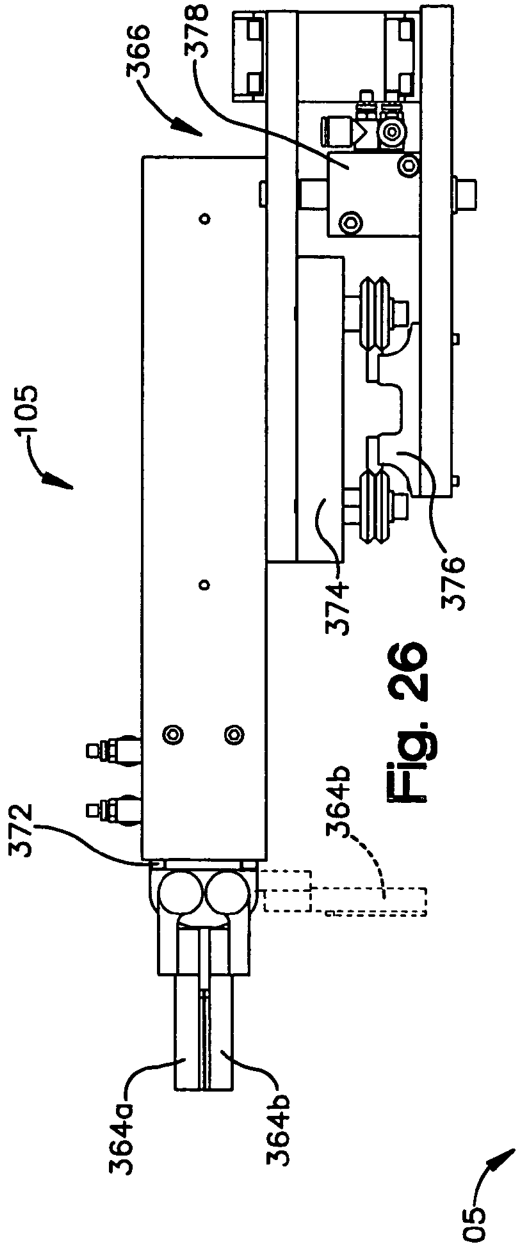
FIG. 26 is a side elevational view of a transfer mechanism.
Figure 27:
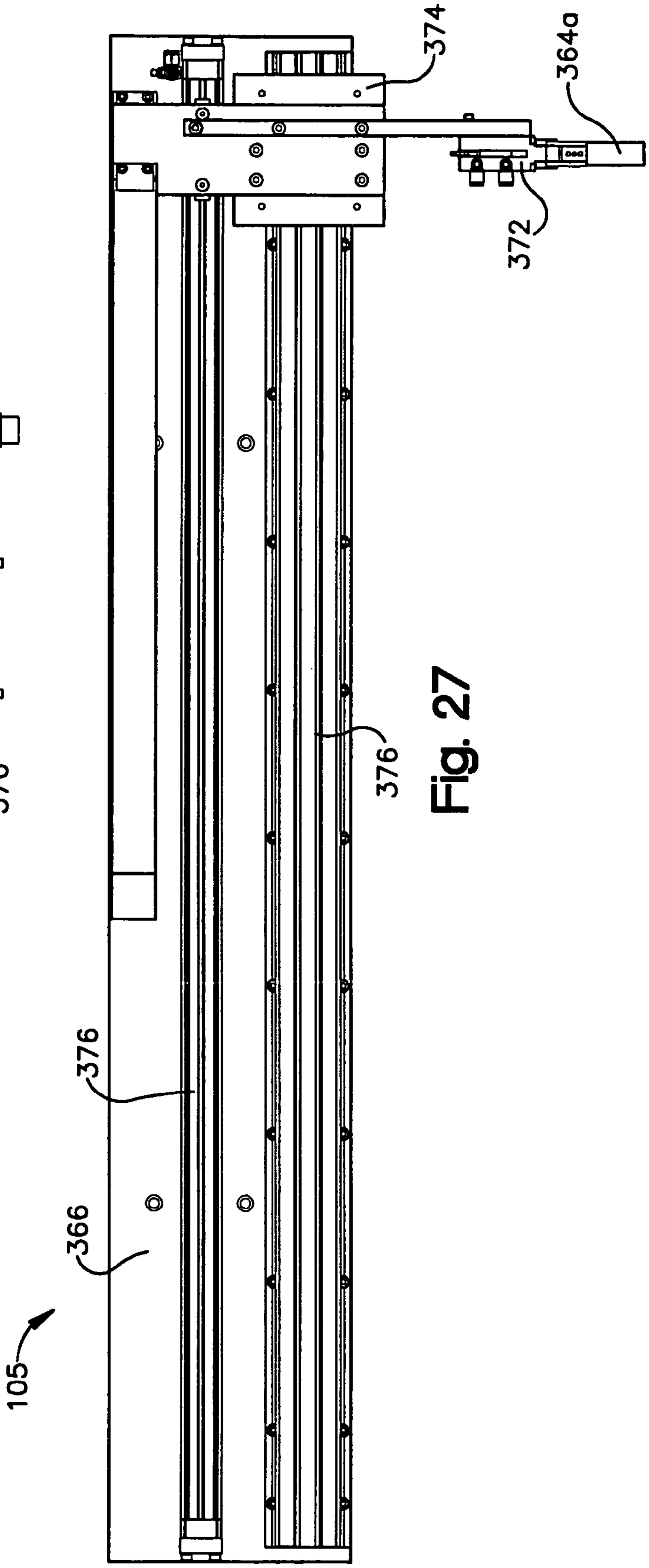
FIG. 27 is a top plan view of a transfer mechanism.
Figure 28:
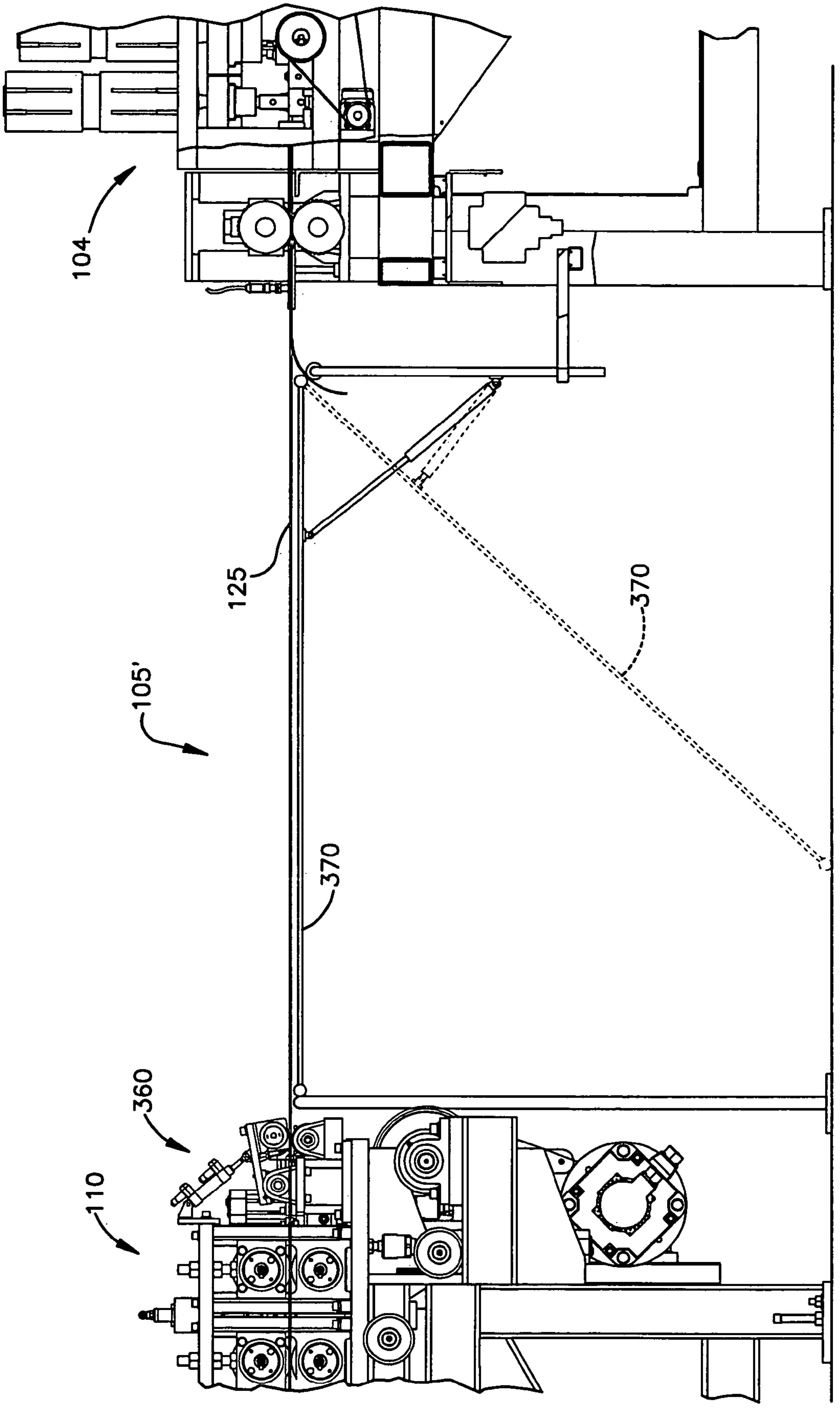
FIG. 28 is an illustration of a transfer mechanism of an alternate embodiment.
Figure 29:
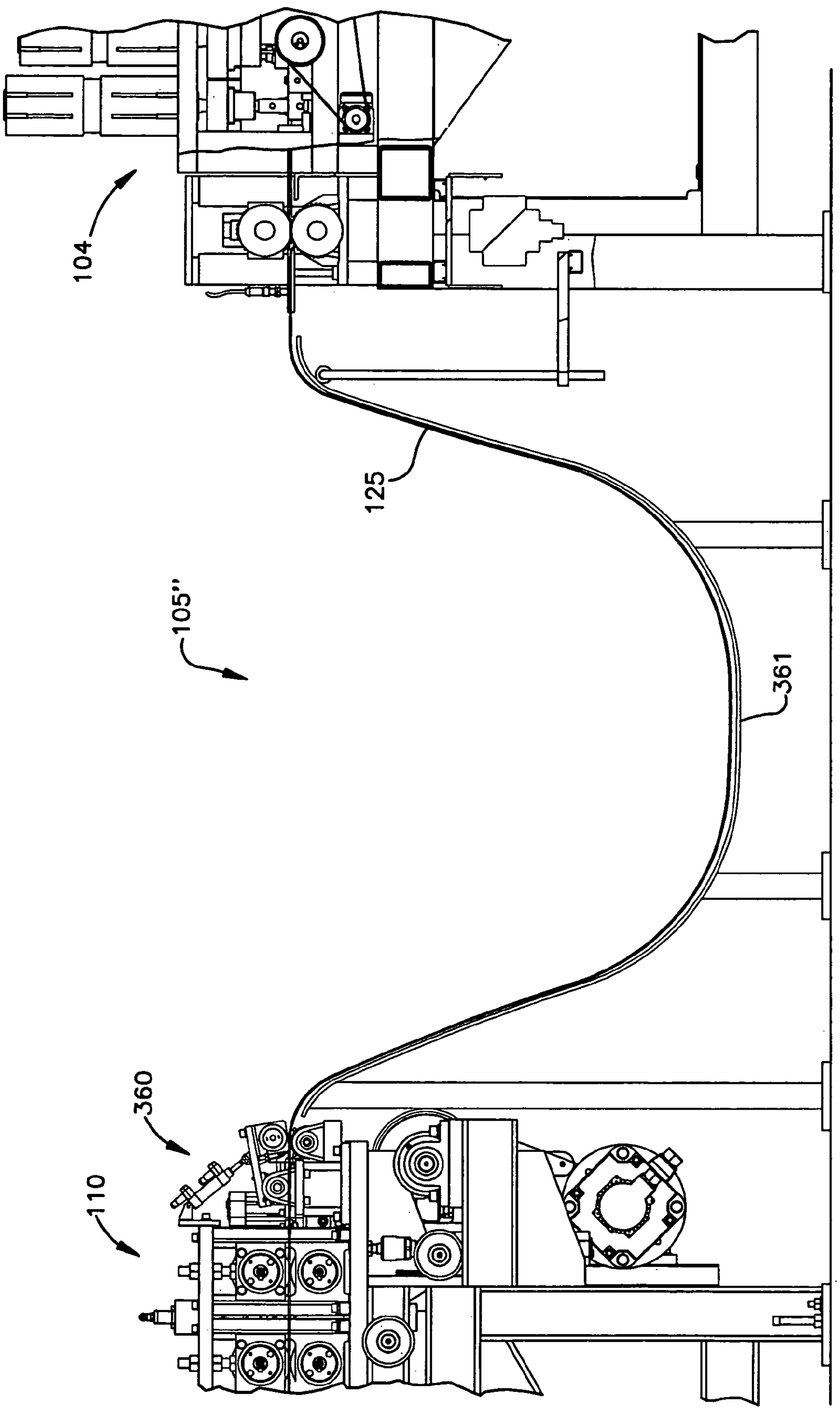
FIG. 29 is an illustration of a transfer mechanism of an alternate embodiment.

Referring to FIGS. 25-27, one acceptable transfer assembly 105 comprises a pair of gripping members 364, a conveyor 366, and a conveyor support frame 368 (FIGS. 23 and 24). The controller selectively causes the conveyor 366 to move the pair of gripping members 364 between the exit of the stamping station 104 to an entrance of the feed mechanism. It should be readily apparent that the transfer could take a variety of other forms without departing from the spirit and scope of the claimed invention. For example, FIG. 28 illustrates an automatic transfer assembly that comprises a bridge 370 that supports the stock material as the stock material is transferred to the feed mechanism 360 and allows the stock to droop once the stock is engaged by the feed mechanism. FIG. 29 illustrates a transfer assembly that defines a path of travel 361 between the stamping station and the roll forming station that includes a droop.

In the illustrated embodiment, the gripping members 364*a*, 364*b* are positioned next to the conveyor 366. A moveable gripping member 364*b* is coupled to a pneumatic actuator 372. A pressurized air source, coupled to the pneumatic actuator 372, is controlled by the controller 122 to selectively move the gripping member 364*b* between an engaged position (shown in solid in FIGS. 25 and 26) and a disengaged position (shown in phantom in FIGS. 25 and 26). The illustrated conveyor 366 includes a carriage 374, a rail 376, and an actuator 378 that moves the carriage along the rail under the control of the controller 122. The pneumatic actuator 372 is mounted to a carriage 374. The controller 122 controls the actuator 378 to move the gripping members between the stamping station 104 and the roll forming station 110.

Feed Mechanism 360

Figure 30:
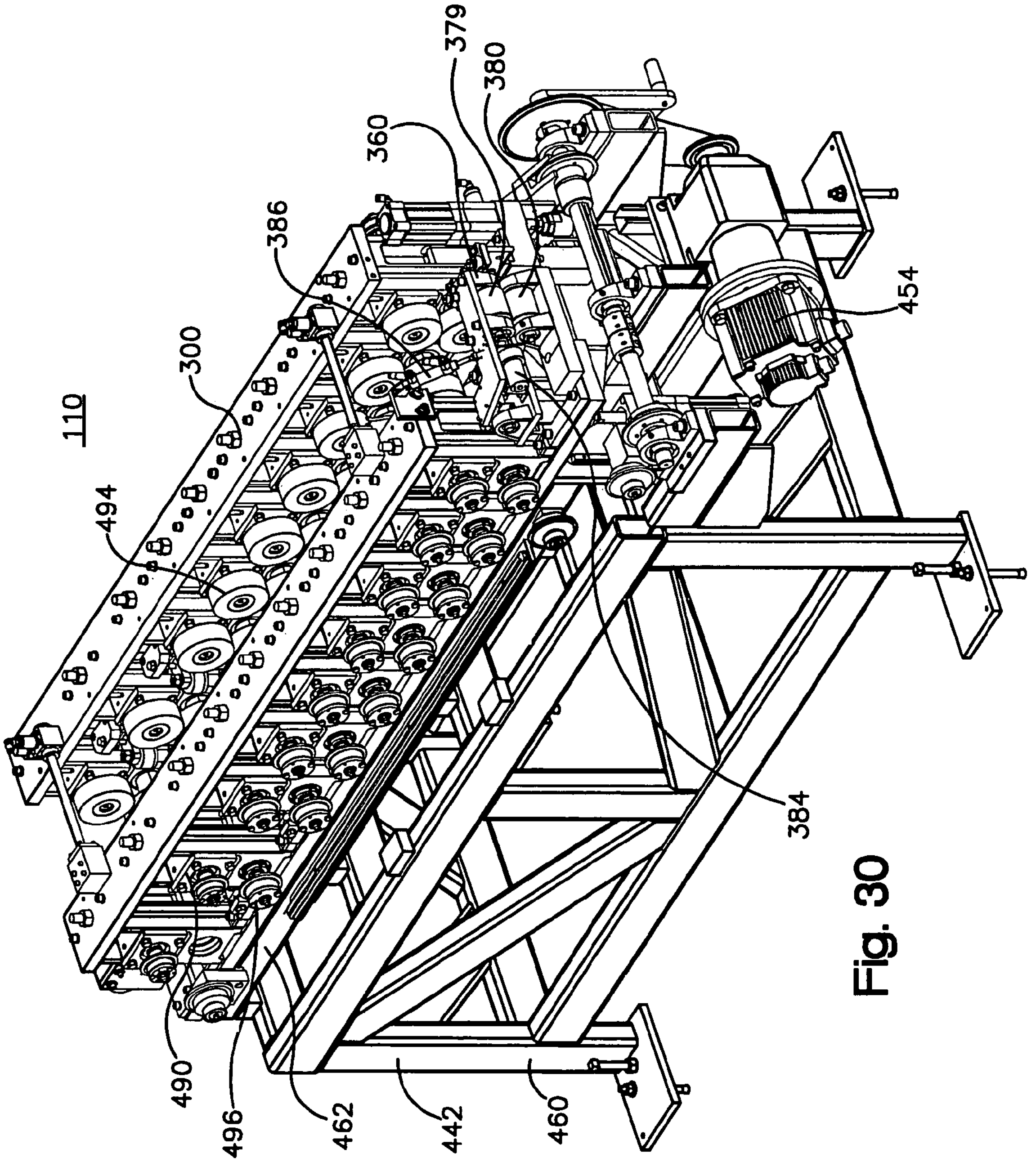
FIG. 30 is a perspective view of a roll forming station.
Figure 31:
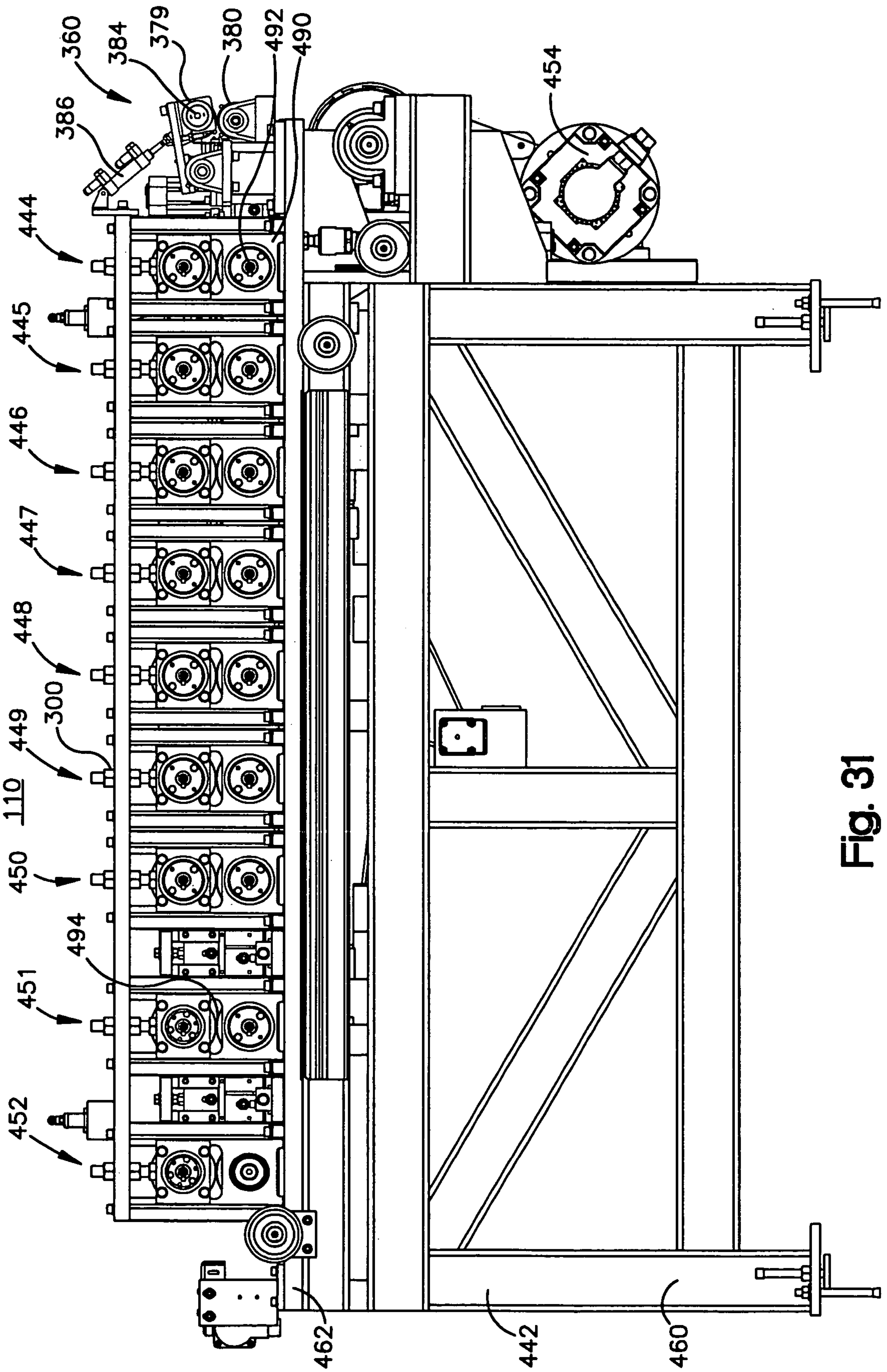
FIG. 31 is a side elevational view of a roll forming station.
Figure 32:
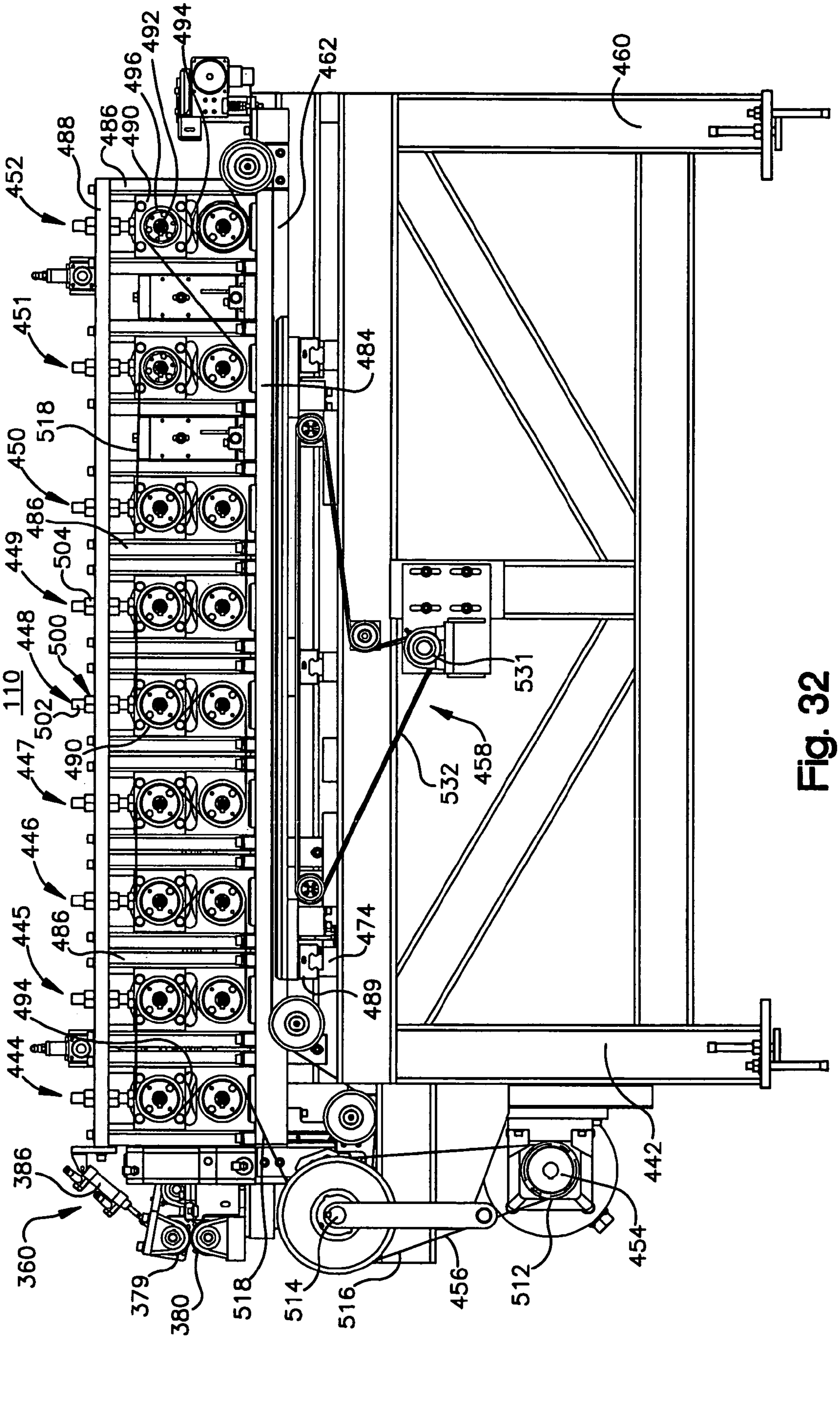
FIG. 32 is a side elevational view of a roll forming station.
Figure 32A:
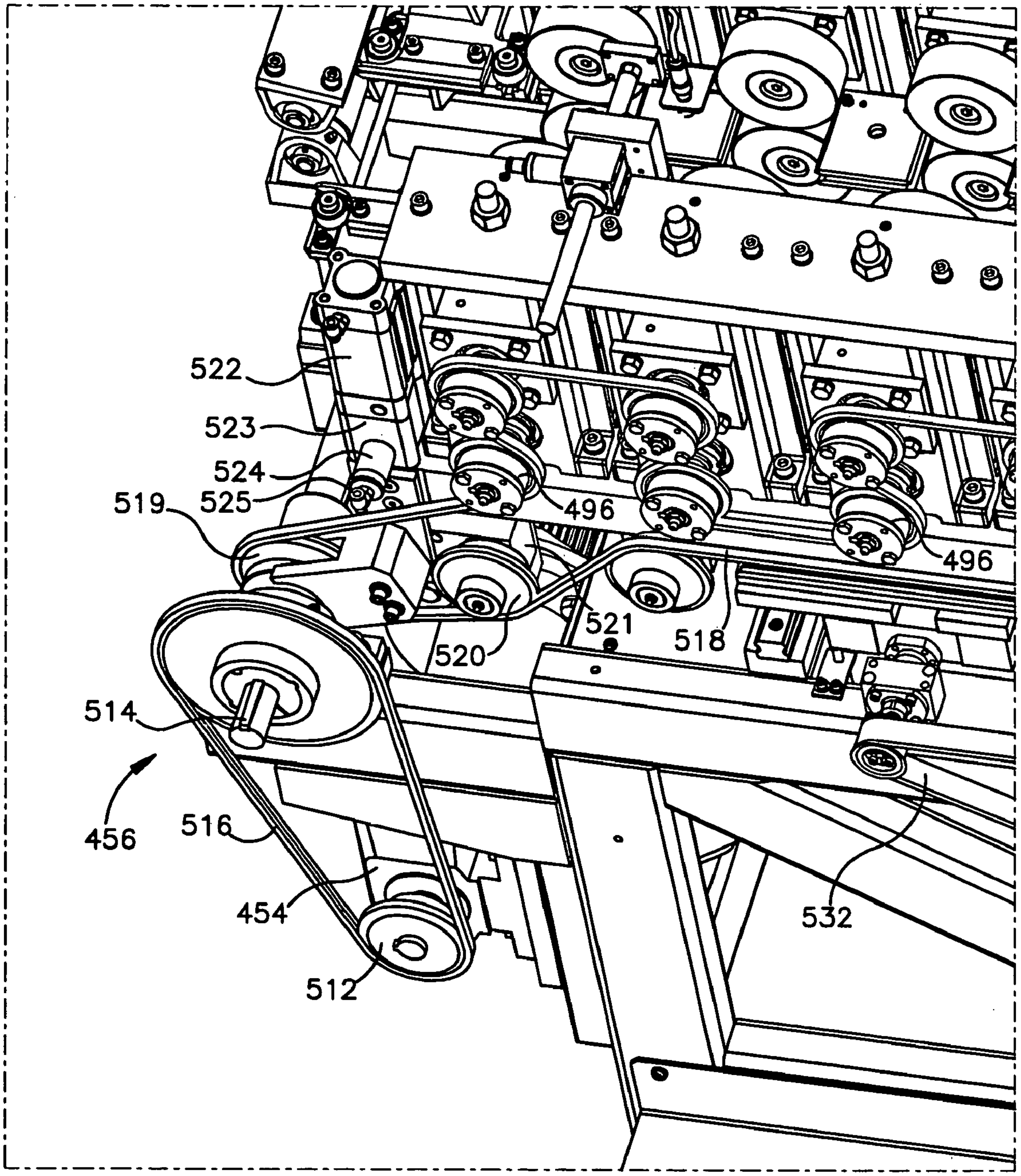
FIG. 32A is an enlarged perspective view of the FIG. 30 roll forming station depicting a chain tensioner.

Referring to FIGS. 30-32, the illustrated feed mechanism 360 comprises a pair of drive rollers 379, 380 positioned along the stock path of travel P at a processing station entrance 382. The pair of drive rollers 379, 380 are selectively moveable between a disengaged position where the drive rollers are spaced apart and an engaged position where the drive rollers engage a coil end portion positioned at the entrance of the roll forming station 110 by the transfer mechanism 105. The drive rollers 379, 380 selectively feed the sheet stock positioned at the entrance 382 into the processing station 110. In the illustrated embodiment, drive roller 379 is selectively driven by a motor 384 that is controlled by the controller 122. The drive roller 379 and the motor 384 are pivotally connected to the station 110. In the illustrated embodiment, the roller 380 is an idler roller that presses the sheet stock 125 against the roller 379 when the drive rollers are in the engaged position. An actuator 386 is connected to the station 110 and the drive roller 380. The actuator 386 is selectively controlled by the controller 122 to engage sheet stock 125 positioned at the entrance of the roll forming station 110 by the transfer mechanism. The motor 384 is controlled to feed the sheet stock 125 into the station 110. In the illustrated embodiment, a sensor is positioned along the path of travel P, near the stock feed mechanism. The sensor is used to verify that stock 125 is being fed by the stock feed mechanism 360.

The controller 122 is in communication with the stamping station 104, the gripping member actuator 372, the drive roller actuator 386, and the conveyor 366. When stock 125 that defines a series of units is paid out by the stamping station 104, the controller 122 pivots the gripping member **364*b* to the spaced apart, disengaged position and positions the gripping members 364*a*, 364*b* (check drawings) at the exit of the stamping station 104. This positions the stock material end portion 130 between the gripping members 364. The controller then moves the gripping member 364*b* to the engaged or gripping position to grip the end portion. The controller 122 moves the pair of drive rollers 379, 380 to the disengaged position and moves the gripping members 364 and the end portion to the roll forming station entrance 382 where the end portion 130 is disposed between the drive rollers. In one embodiment, the movement of the gripping members from the stamping station 104 to the roll forming station 110 is incremental, with stops that correspond to stops required to stamp the material in the stamping station. The controller 122 moves the pair of drive rollers 379, 380 to the engaged position to engage the end portion 130. The controller 122 rotates the drive rollers 379, 380 to feed the elongated sheet stock into the roll forming station. When the end of the stock that forms the series of spacer frame members is paid out of the stamping station 104**, it falls from the exit of the stamping station and is pulled into the roll forming station. In an alternate embodiment, the transfer mechanism captures the end and transfers it to the roll forming station.

The Forming Station 110

Figure 33:
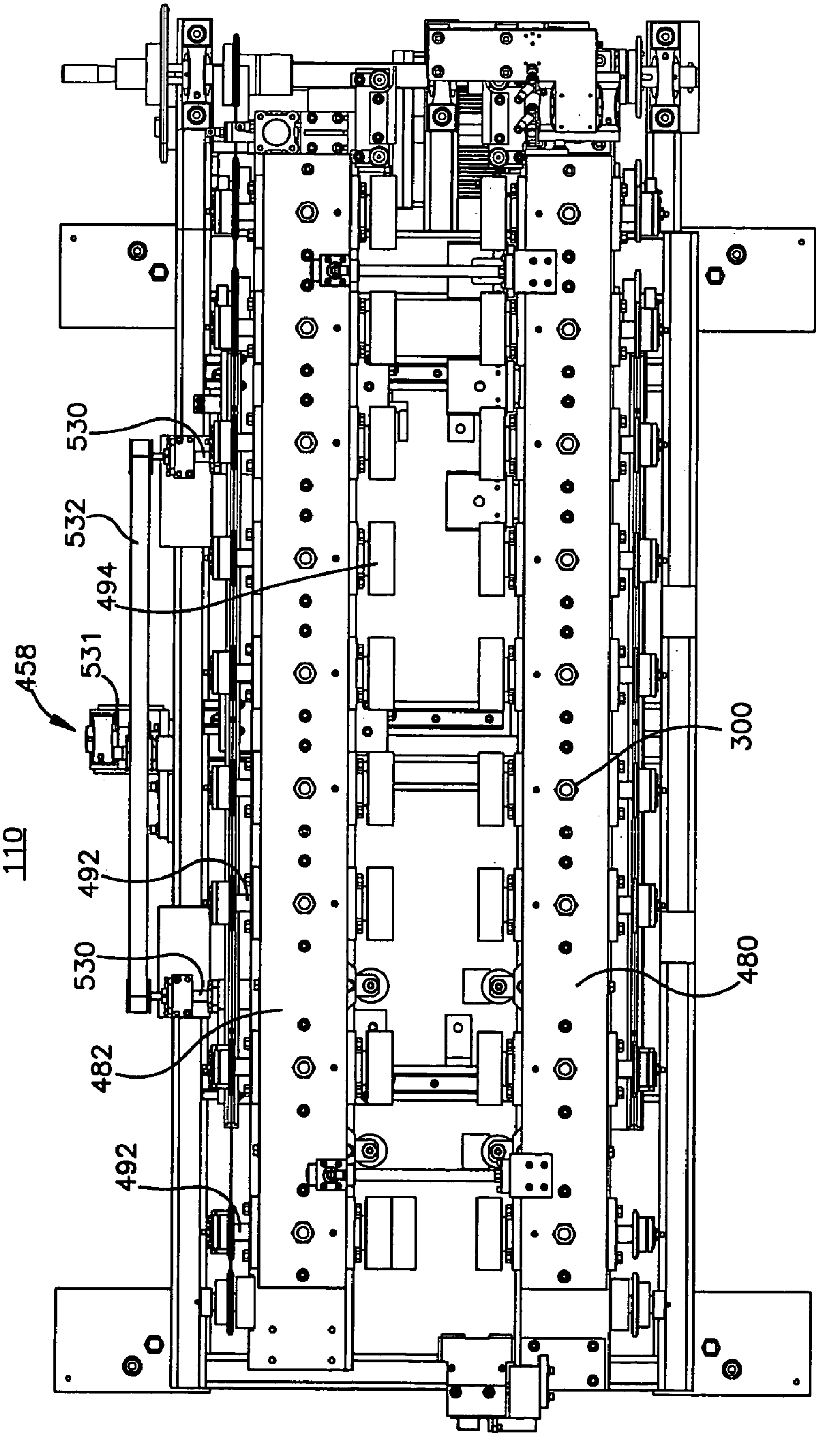
FIG. 33 is a top plan view of a roll forming station.
Figure 34:
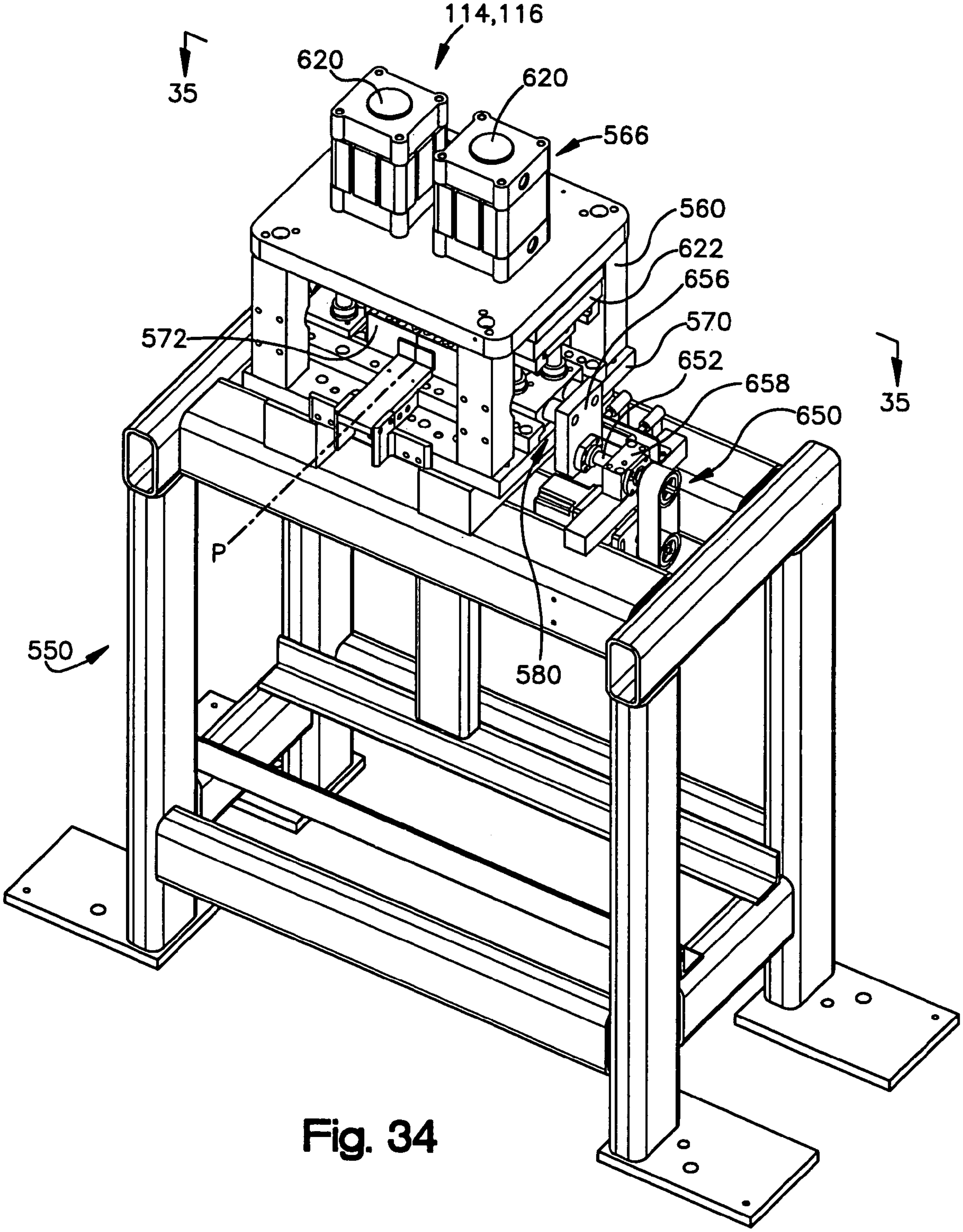
FIG. 34 is a perspective view of a swedging and cutoff station.
Figure 35:
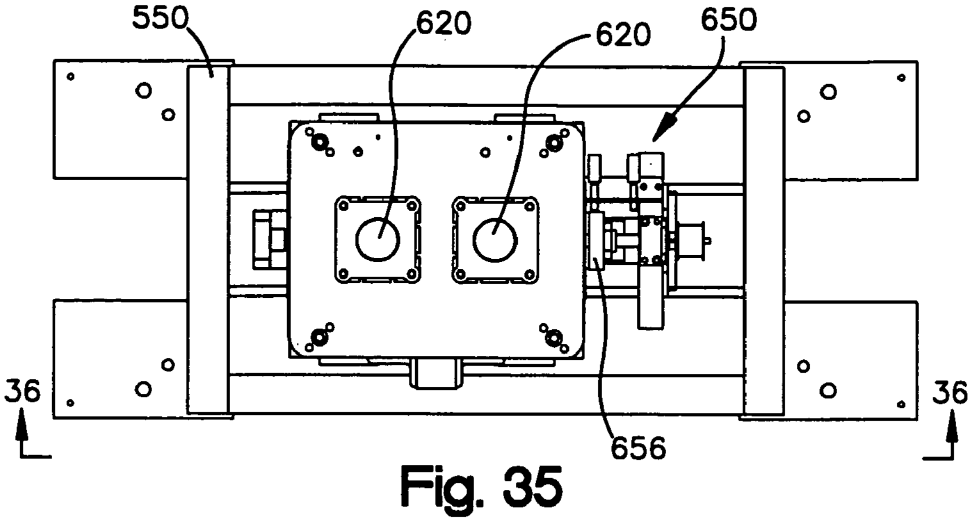
FIG. 35 is a view taken along lines 35-35 in FIG. 34.
Figure 37:
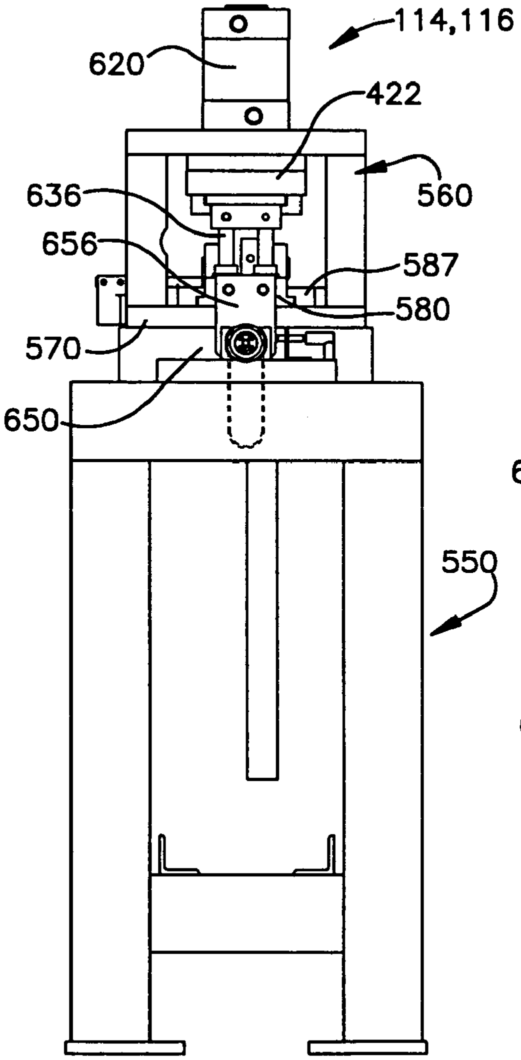
FIG. 37 is a view taken along lines 37-37 in FIG. 36.

Referring to FIGS. 31-33, the forming station 110 is preferably a rolling mill comprising a support frame structure 442, roll assemblies 444-452 carried by the frame structure, a roll assembly drive motor 454, a drive transmission 456 (FIG. 32) coupling the drive motor 454 to the roll assemblies, and an actuating system 458 (FIG. 32) for enabling the station 110 to roll form stock having different widths.

The support frame structure 442 comprises a base 460 fixed to the floor and a roll supporting frame assembly 462 adjustably mounted atop the base 460. The base 460 is positioned in line with the stock path of travel P immediately adjacent the transfer mechanism 105, such that a fixed stock side location of the stamping station is aligned with a fixed stock side location of the roll forming station. The roll supporting frame assembly 462 extends along opposite sides of the stock path of travel P.

Referring to FIG. 33, the roll supporting frame assembly 462 comprises a fixed roll support units 480 and a moveable roll support unit 482 respectively disposed on opposite sides of the path of travel P. The units 480, 482 are essentially mirror images, with the exception that unit 482 is moveable and unit 480 is fixed so only the unit 482 is described in detail with corresponding parts of the units being indicated by like reference characters. Components that allow unit 482 to move are not included in unit 480. Referring to FIG. 33, the top plate 482 comprises a lower support beam 484 extending the full length of the mill, a series of spaced apart vertical upwardly extending stanchions 486 fixed to the beam 484, one pair of vertically aligned mill rolls received between each successive pair of the stanchions 486, and an upper support bar 488 fixed to the upper ends of the stanchions.

Each mill roll pair extends between a respective pair of stanchions 486 so that the stanchions provide support against relative mill roll movement in the direction of extent of the path of travel P as well as securing the rolls together for assuring adequate engagement pressure between rolls and the stock passing through the roll nips. The support beam 484 carries three spaced apart linear bearing assemblies 489 on its lower side. Each linear bearing is aligned with and engages a respective trackway 474 so that the beam 484 may move laterally toward and away from the stock path of travel P on the trackways 474. In the illustrated embodiment, the opposite unit 480 is fixed.

Each roll assembly 444-452 is formed by two roll pairs aligned with each other on the path of stock travel to define a single "pass" of the rolling mill. That is to say, the rolls of each pair have parallel axes disposed in a common vertical plane and with the upper rolls of each pair and the lower rolls of each pair being coaxial. The rolls of each pair project laterally towards the path of stock travel from their respective support units 480, 482. The projecting roll pair ends are adjacent each other with each pair of rolls constructed to perform the same operation on opposite edges of the ribbon stock. The nip of each roll pair is spaced laterally away from the center line of the travel path. The roll pairs of each assembly are thus laterally separated along the path of travel.

Each roll comprises a bearing housing 490, a roll shaft 492 extending through a bearing in the housing 490, a stock forming roll 494 on the inwardly projecting end of the shaft and a drive pulley 496 on the opposite end of the shaft which projects laterally outwardly from the support unit. The housings 490 are captured between adjacent stanchions as described above.

The upper support bar 488 carries a nut and screw force adjuster combination 500 associated with each upper mill roll for adjustably changing the engagement pressure exerted on the stock at the roll nip. The adjuster 500 comprises a screw 502 threaded into the upper roll bearing housing 490 and lock nuts for locking the screw 502 in adjusted positions. The adjusting screw is thus rotated to positively adjust the upper roll position relative to the lower roll. The beam 484 fixedly supports the lower mill roll of each pair. The adjusters 490 enable the vertically adjustable mill rolls to be moved towards or away from the fixed mill rolls to increase or decrease the force with which the roll assemblies engage the stock passing between them.

The drive motor 454 is preferably an electric servomotor driven from the controller unit 122. As such the motor speed can be continuously varied through a wide range of speeds without appreciable torque variations.

Referring to FIG. 32, the transmission 456 couples the motor 454 to the roll assemblies 444-452 so that the roll assemblies are positively driven whenever the servomotor is operated. The transmission 456 comprises a motor output shaft and sprocket arrangement 512, a drive shaft 514 disposed laterally across the end of the rolling mill, a drive chain 516 coupling the motor shaft to the drive shaft, and drive chains 518 coupling the drive shaft 514 to the respective roll pairs on each opposite side of the rolling mill. The drive chains 518 are reeved around the drive shaft sprocket and around sprockets on each roll shaft 492 on each side of the machine.

Whenever the motor 454 is driven, the rolls of each roll assembly are positively driven in unison at precisely the same angular velocity. The roll sprockets of successive roll pairs are identical and there is no slip in the chains so that the angular velocity of each roll in the rolling mill is the same as that of each of the others. The slight difference in roll diameter provides for the differences in roll surface speed referred to above for tensioning the stock without distorting it.

The disclosed roll forming station 110 has an automatic chain tensioner for assuring adequate tension in the drive chain 518. In a prior art roll forming system the drive chain would require periodic chain tension adjustment with resultant down time of the system. The presently disclosed roll forming station includes a tensioning sprocket 520 rotatably supported by a movable mounting block 521. In accordance with a presently preferred system at the conclusion of each strip, the controller 122 activates a drive cylinder 522 that has a output shaft coupled to the mounting block 521. This drives the mounting block down thereby driving the sprocket 520 down and tensions the drive chain 518.

A preferred drive cylinder is air actuated and is commercially available as Festo part number KPE-16 or 178467. The air applied to the drive cylinder delivers a uniform tensioning force to the mounting block 521. Prior to this force being applied by a valving system coupled to the controller, the controller 122 releases a clamp 523 which frees the output shaft for movement. Once the sprocket 520 is properly tensioned, the controller applies air through coupling 525 to a brake 524 which clamps the shaft and maintains tension until a next subsequent chain tensioning is performed by the controller 122.

In the exemplary embodiment, the actuating system 458 is driven by the controller to automatically adapt the roll forming station 110 to the width of sheet stock to be presented to roll forming station 110. Referring to FIG. 32, the actuating system 458 shifts the moveable roll laterally towards and away from the fixed roll of each roll assembly so that the stock passing through the rolling mill can be formed into spacer frame members having different widths. Referring to FIG. 33, the actuating system 458 comprises a pair of threaded drivescrews 530, a motor 531 that is controlled by the controller 122, and a drive transmission 532 that couples the motor 531 to the drivescrews 530. The drivescrew is mounted in a bearing fixed to the rails 472. The support beam 484 on the moveable side is threaded onto the drivescrew thread so that when the drivescrew is rotated in one direction the moveable beam and its rolls are moved laterally toward the fixed rolls while drivescrew rotation in the opposite sense moves the moveable rolls away from the fixed rolls. The moveable beam 484 moves along the trackways 474 with the aid of the linear bearings 489 during its position adjustment.

The drive transmission 532 is preferably a timing belt reeved around sheaves on the drivescrews. The actuating system 458 is substantially like the actuating system 200 described above. Further details concerning the construction of the actuating system 458 can therefore be obtained from the foregoing disclosure of the system 200. Details of another suitable roll forming station that can be used in accordance with the present invention can be found in U.S. Pat. No. 5,361,476 to Leopold, which is incorporated herein by reference in its entirety.

Referring to FIGS. 23 and 24, an upper loop feed sensor 550 and a lower loop feed sensor 552 function to ensure that the stock advancing rates of the station 104 and the forming station 110 does not place undue stress on the stock 125. The loop feed sensors 550, 552 co-act with the controller 122 to control the stock feed through the stations 104 and 110. In one embodiment, the speed of the roll forming station 110 is increased if the lower loop feed sensor 552 senses that the caternary stock loop is below the lower stock feed sensor. This will reduce the caternary loop 362 (i.e. reduce the amount of stock between the stations). The controller 122 will stop the roll forming station 110 or reduce the speed of the roll forming station if the upper sensor 550 senses that the caternary stock loop 362 is above the upper sensor. This will increase the caternary loop 362 (i.e. increase the amount of stock between the stations).

The Forming Stations 114, 116

Referring to FIGS. 34-37, the forming stations 114, 116 are disposed together on a common supporting unit 550. The controller 122 controls the stations 114, 116 to subject the frame members to a swedging operation at the station 114 and a cut off operation at the station 116. The swedging operation produces the narrowed frame member tongue section which is just narrow enough to be telescoped into the opposite frame end when the spacer frame is being fabricated. The cut off operation is performed between the tip of each frame tongue section and the adjacent trailing end of the preceding frame member. The tongue and trailing end are joined by a short rectangular tang of the stock material which is sheared by the cut off operation.

The swedging station 114 comprises a supporting framework 560, first and second swedging units 562, 564 disposed along opposite sides of the stock path of travel P and an actuator system 566 for the swedging units. The framework 560 is mounted on top of the supporting unit 550 and is comprised of structural members welded together to form an actuator supporting superstructure above the path of stock travel P and a work station bed 570. The bed 570 extends beneath and supports the structural members of the superstructure.

The swedging units 562, 564 are essentially mirror images of each other, with the exception that unit 562 is laterally adjustable and unit 564 is fixed, and therefore only the moveable unit 562 is described in detail. Some parts of the laterally adjustable unit 562 may not be required on the fixed unit 564. The swedging unit 562 engages and deforms one frame member tongue side wall to reduce the span of the tongue. This enables the frame ends to be telescoped into engagement when the frame is being assembled. The unit 562 comprises a swedging body 572 stationed on the bed 570, an anvil assembly 574 carried by the body 572 and a swedging tool assembly 576 supported by the body 572 for coaction with the anvil assembly 574.

The swedging body 572 comprises a plate-like base 580 adjacent one lateral side of the frame member path of travel P, a swedge mount member fixed to the base 580 adjacent the path of travel, and an upstanding stop member which projects away from the base toward the actuator system for limiting the travel of the actuator system as the frame tongue is swedged.

The moveable base 580 is supported on the bed 570 by way of forming members (see FIG. 37) so the base position is adjustable laterally toward and away from the fixed base 580. The base 580 defines a frame guide portion 588 extending under the side of a frame member moving along the path of travel P through the swedging station. The guide portion 588 supports the frame member on the travel path during swedging. The base member position adjustment shifts the guide portion 588 to accommodate different width frame members. A corresponding fixed guide portion 588' is aligned with the fixed stock edge locations defined by the stamping unit 104 and the roll forming unit 110.

The swedge mount member is rigidly fixed to the base 580 and projects upwardly. The member supports the anvil assembly for vertical movement to and away from a frame member being swedged and supports the swedging tool assembly 576 for horizontal motion into and away from engagement with the frame member.

The anvil assembly 574 is positioned to support and engage the tongue side wall at the conclusion of the swedging operation to define the tongue side wall shape. The anvil assembly 574 comprises an elongated anvil member 590 and a pair of actuator rod assemblies 592 supported by the body 572 for transmitting movement from the actuator system 566 to the anvil member.

The anvil member 590 has an elongated blade-like projecting element 596 extending downwardly for engagement with the frame member. The lengths of the anvil member 590 and blade portion 596 correspond to the length of the frame member tongue wall so that the element 596 coextends with the tongue and for supporting the tongue wall throughout its length during swedging.

The actuator rod assemblies 592 force the blade portion 596 of the anvil member 590 into engagement with the frame member during swedging and withdraw the anvil member from the frame member when swedging is completed. The rod assemblies 592 are spaced apart with each projecting through a bore in the swedging member 572. The rod assemblies are identical and therefore only one is illustrated and described.

The swedging tool assembly 576 comprises an elongated tool body 610 extending through a horizontal guide opening in the swedge mount member, a hardened swedging nose element 612 fixed to the end of the body 610 adjacent the travel path P and an actuating cam element 614 adjacent the opposite end of the body 610.

The cam element 614 has a wedge-like face which is engaged by a complementary wedge face 615 of the actuator system to force the tool assembly to swedge the frame tongue. The actuating force serves to move the nose element 612 into engagement with the frame side wall.

The nose element 612 is constructed to match the length of the anvil blade-like element 596 so that the swedging procedure is completed with the nose element and the blade-like element confronting along their lengths with the frame side wall clenched between them. After swedging, the nose element 612 projects slightly from the swedge mount member to provide a lateral guide for frame members passing along the path P.

The actuator system comprises a pair of pneumatic rams 620 attached to the framework 560 above the cut off and swedging stations, an actuator platen 622 fixed to the rams for vertical reciprocating motion when the rams are operated, and actuating cam assemblies 624 supported by the platen for operating the swedging station.

The cam assembly 624 operates the swedging unit 562. The cam assembly 624 includes a camming member 634. The lower end of the camming member defines a wedge face 615 which coacts with the wedge-like face on the cam element 614. The downward travel of the camming member 634 is the same regardless of how wide the frame member in the swedging unit might be.

One of the sets of swedging and actuator parts are laterally fixed and the other set of swedging and actuator parts are movable laterally towards and away from the fixed set by an actuating system 650 to desired adjusted positions for working on stock of different widths. The system 650 firmly fixes the laterally adjustable parts at their laterally adjusted locations for further frame production. As noted, the laterally moveable parts are supported in ways extending transverse to the direction of extent of the travel path P. The actuating system 650 shifts the laterally moveable parts simultaneously along the respective ways between adjusted positions. In the exemplary embodiment, the actuating system 650 is driven by the controller. In the exemplary embodiment, the width of station 114 is automatically adjusted by the controller based on the width of formed spacer frame stock received from the roll forming station.

The preferred and illustrated actuating system 650, like the system 200 described above, provides extremely accurate information regarding placement relative to the stock path of travel P. The system 650 comprises a single threaded drivescrew 652 and a swedging unit drive member 656 driven by the drivescrew.

The drivescrew 652 is mounted in a bearing assembly 658 connected to the framework 60. The drivescrew 652 is threaded into the swedging unit drive member 656. When the drivescrew rotates in one direction the driving member 656 forces the moveable swedging units to shift laterally away from the fixed swedging units. Drivescrew rotation in the other direction shifts the assemblies toward the fixed swedging units. The threads on the drivescrew are precisely cut so that the extent of lateral movement is precisely related to the angular displacement of the drivescrew creating the movement. The moveable actuating cam assemblies are moved by the swedging unit assemblies via the guide rods 636 (FIG. 37) when the lateral positions are adjusted.

The angular position of the jackscrew is measured and used by the controller to control the width of the station 114. In the exemplary embodiment, the station width is automatically set by the controller based on the width of the elongated spacer frame 16 formed by the roll forming station to be provided to the station 114. In one embodiment a digital encoder (not illustrated) is associated with the jackscrew. In the illustrated embodiment, the fixed swedging and actuator parts are fixed such that the fixed reference of the station 114 is aligned with the fixed references of stations 104 and 110.

Figure 38:
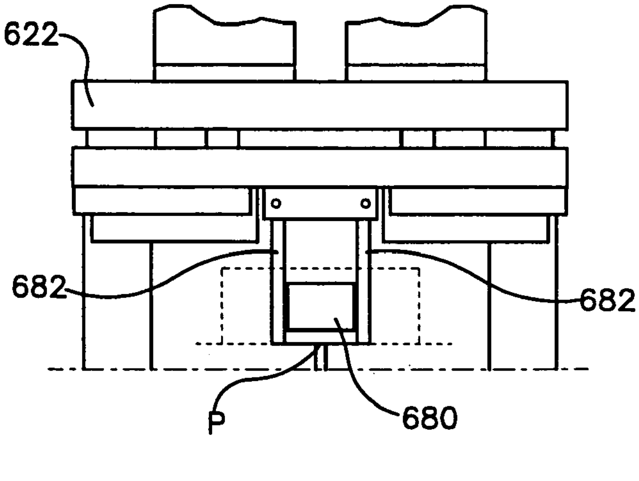
FIG. 38 is a side elevational view of a cutoff station.
Figure 36:
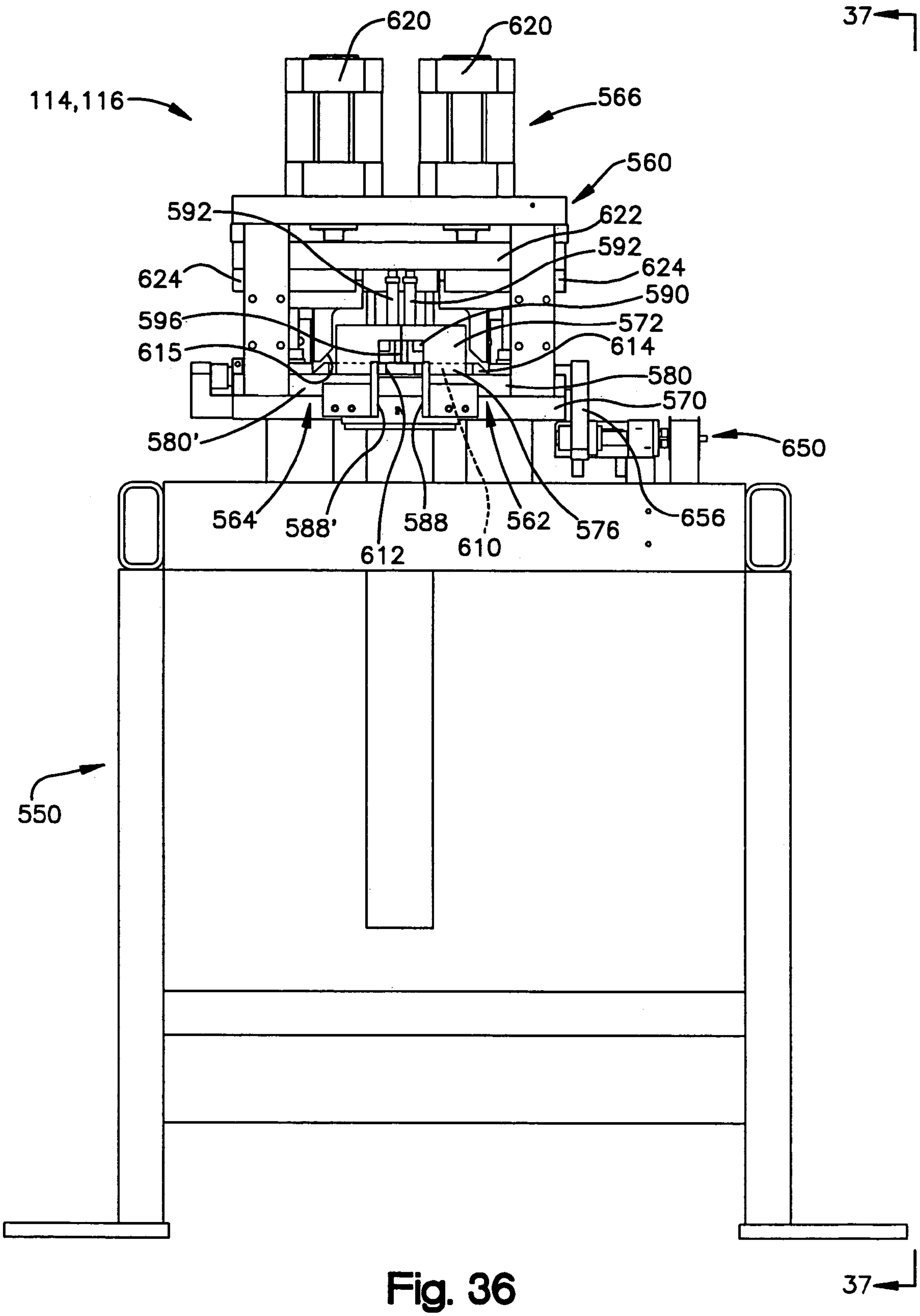
FIG. 36 is a view taken along lines 36-36 in FIG. 35.
Figure 36A:
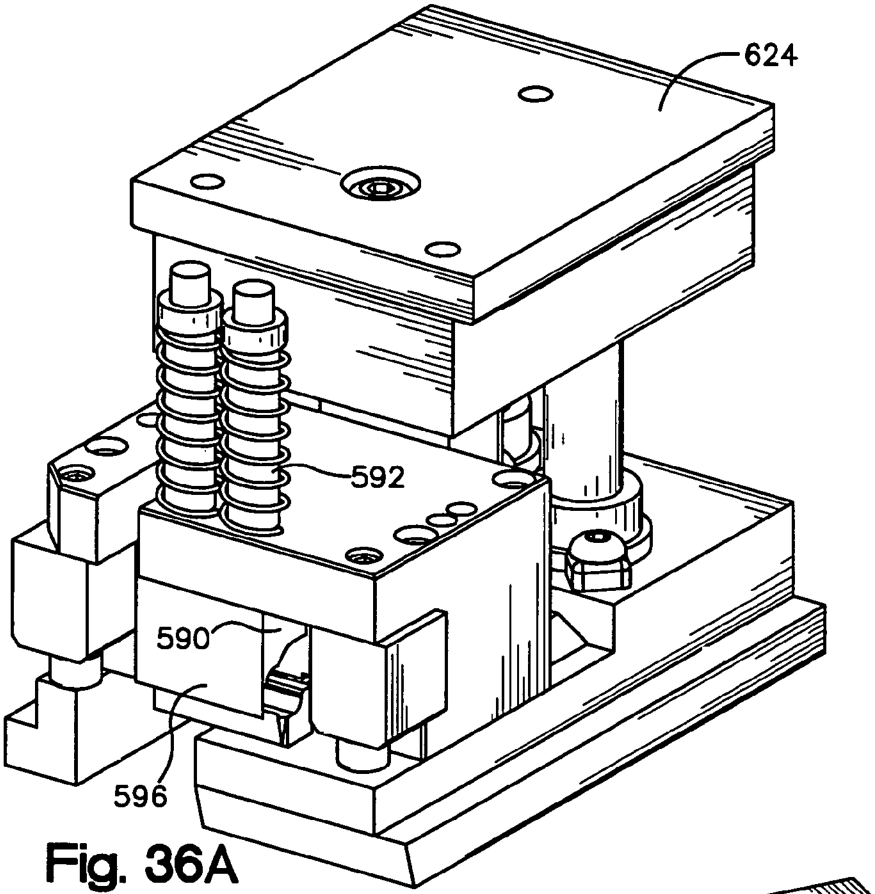
FIGS. 36A, 36B and 36C are enlarged perspective views of portions of the swedging station with parts removed for ease of illustration.
Figure 36B:
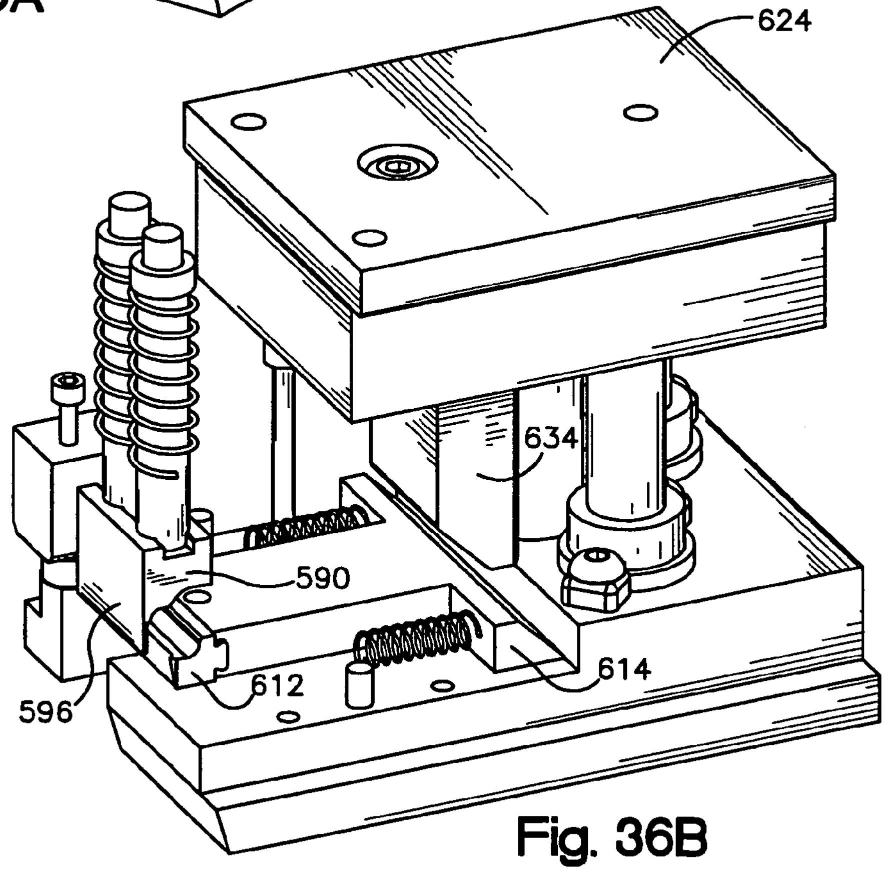
Figure 36C:
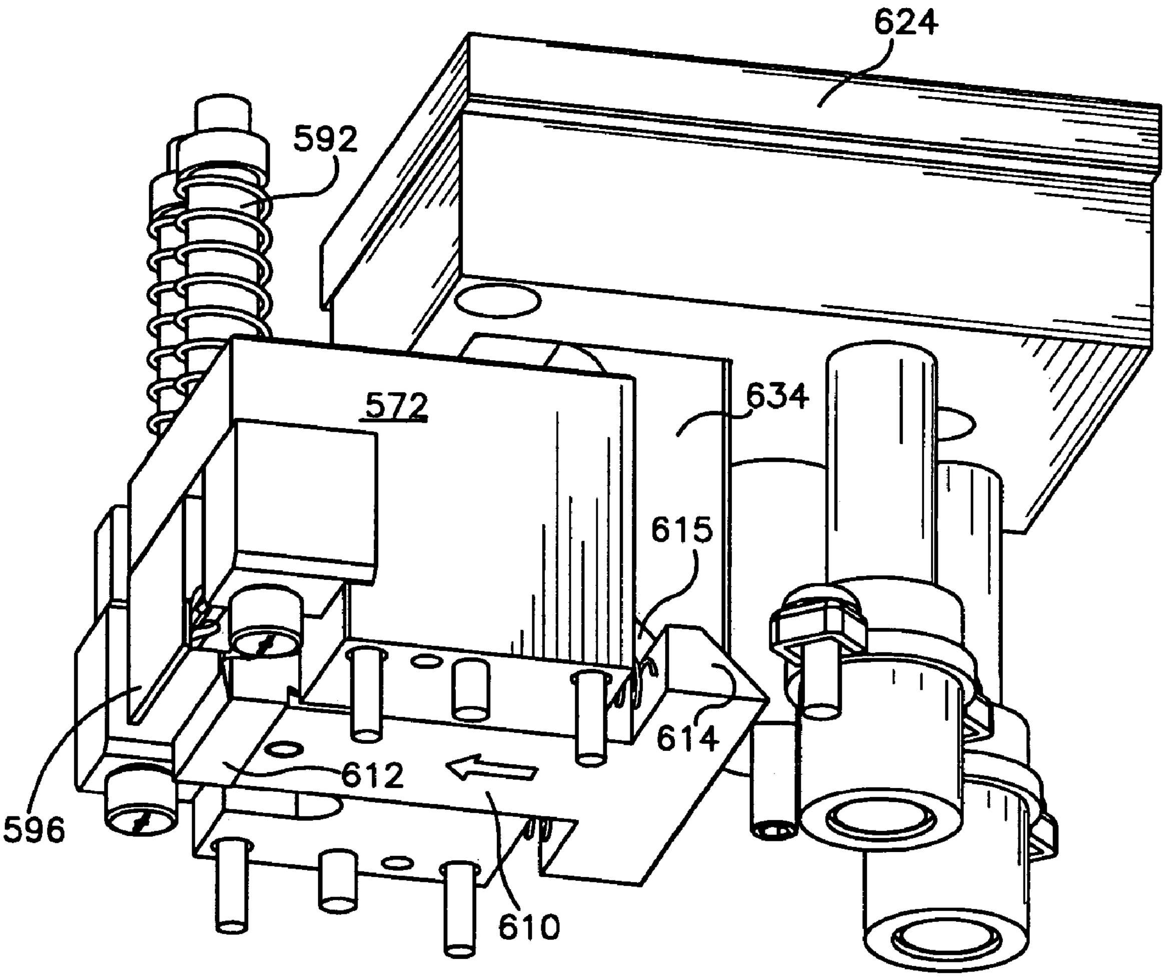
Figure 39:
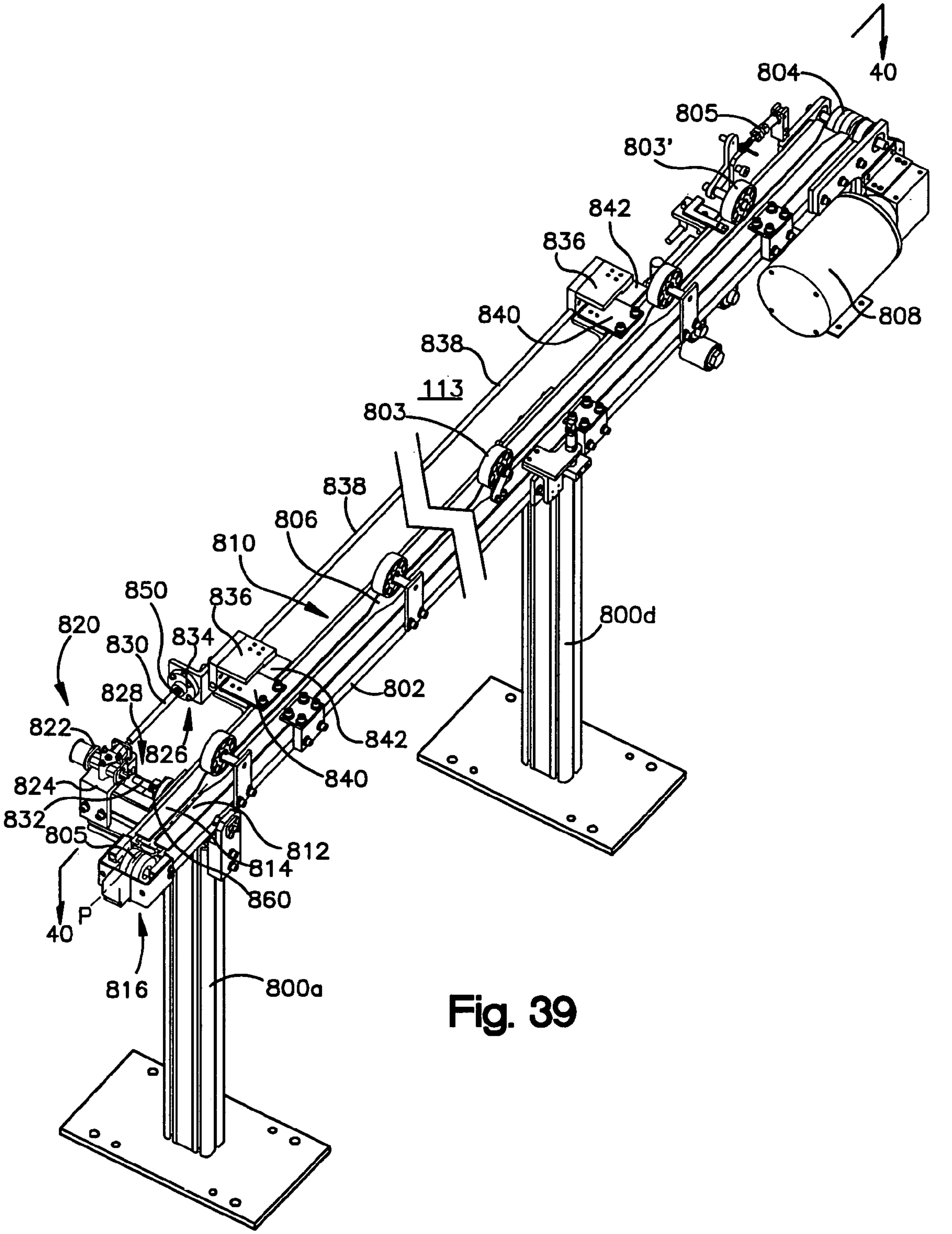
FIG. 39 is a partial perspective view of a conveyor.
Figure 40:
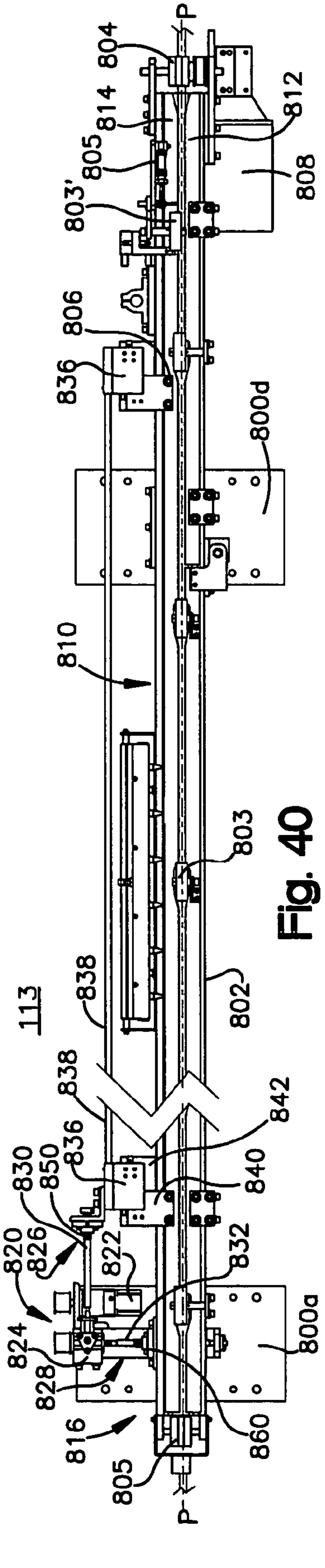
FIG. 40 is a partial top plan view of the conveyor shown in FIG. 39.
Figure 41:
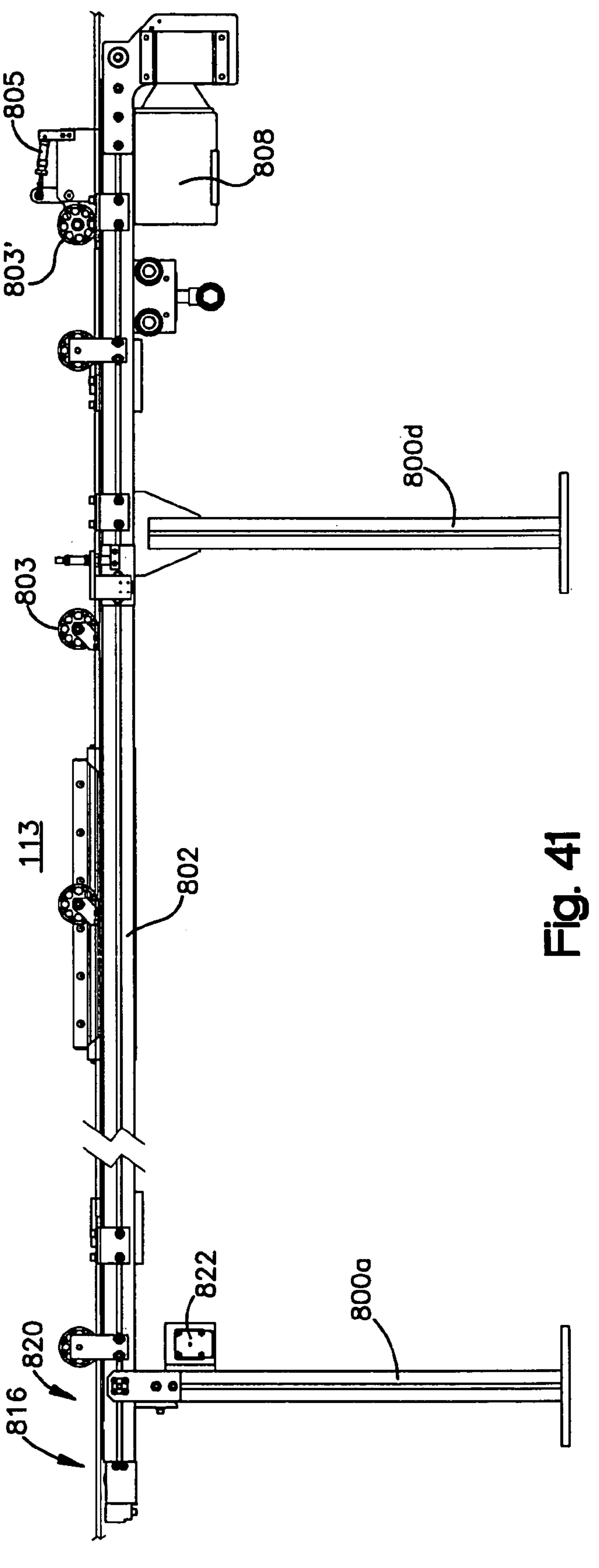
FIG. 41 is a partial side elevational view of the conveyor shown in FIG. 39.

Referring to FIG. 38, the cut-off unit 116 is located axially adjacent the swedging unit in the direction of frame member travel along the path P. The cut-off unit comprises an elongated cut-off blade 680 extending in a plane transverse to the direction of the travel path P and a pair of blade supporting rods 682 fixed to the platen 622 at their upper ends and fixed to the blade 680 at their lower ends. The blade 680 is laterally wider than the widest frame member passing through the unit and extends into vertically oriented slots formed in the swedge mount members 582 on opposite sides of the path P. The swedge mount member slots are sufficiently wide that they accommodate and guide the blade 680 regardless of the adjusted swedge mount member positions relative to the centerline of the path P.

The actuator system operates the swedging unit at the same time the cut-off unit is operated. Accordingly, when the tongue at the leading end of a frame member is being swedged the preceding frame member is cut-off from the stock and is free to move from the forming stations 114, 116 to the extrusion station 120. Additional details and embodiments of acceptable swedging and forming stations 114, 116 are disclosed in U.S. Pat. No. 5,361,476, which is incorporated herein by reference in its entirety.

In one embodiment the forming stations 114, 116 perform their operations without requiring that the stock moving along the travel path P be stopped or slowed down. This may be accomplished by reciprocating the bed 570 carrying the stations 114, 116 relative to the supporting unit 550 in the direction of the path of travel so that the swedging and cut-off operations are performed on the stock moving along the path. Details of one acceptable reciprocating mechanism are disclosed in U.S. Pat. No. 5,361,476 to Leopold, which is incorporated herein by reference in its entirety.

Conveyor 113

The conveyor 113 transports the formed and separated elongated spacer frames 16 from stations 114, 116 to stations 119, 120 where desiccant 22 and adhesive 18 are applied. The illustrated conveyor 113 includes vertical supports 800*a*, 800*b*, 800*c*, 800*d*, an elongated support 802 that extends along the path of travel, rollers 804, 805, a belt 806 disposed around the elongated support and rollers, a motor 808, and a guide 810. The vertical supports 800 position the elongated support 802 along the path of travel P. The motor 808 drives roller 804 to drive the belt 806. The motor 808 is controlled by the controller 122. The belt 806 delivers the elongated spacer frame from stations 114, 116 to stations 119, 120. The guide 810 keeps the elongated spacer frames on the path of travel P. The guide 810 is adjustable to accommodate spacer frame members of varying widths.

In the illustrated embodiment, the guide 808 includes a fixed guide member 812 and a laterally adjustable guide member 814. The fixed guide member 808 is aligned with the fixed reference of station 114. In one embodiment, a pair of conveyor guides of stations 119, 120 are symmetrically adjustable with respect to the center of the path of travel P. In the illustrated embodiment, the end 816 of the conveyor 113 is automatically positioned to align the center of the path of travel P defined by the fixed guide member 812 and adjustable guide member 814 with the symmetrically adjustable conveyor guides of stations 119, 120. In the illustrated embodiment, an adjustment mechanism 820 adjusts both the position of the moveable guide member 814 and the position of the end 816 of the conveyor. Use of a single adjustment mechanism assures that the movement of the moveable guide member 814 is coupled to the movement of the end 816. It should be readily apparent that separate mechanisms could be used to position the moveable guide member 814 and the end 816.

The mechanism 820 includes a motor 822, a transmission 824, a guide member drive 826, and a conveyor end drive 828. The motor 822 is controlled by the controller. The transmission 824 is coupled to the motor 822. The transmission 824 includes first and second output shafts 830, 832. The first output shaft 830 is coupled to the guide member drive 826. The guide member drive 826 includes a coupling 834, cam mechanisms 836, and linkages 838. Each cam mechanism 836 includes a first member 840 that is secured to the adjustable guide member 814 and a second member 842 that is secured to the elongated support 802. The cam members 840, 842 are coupled together such that the cam member 840 moves away from the fixed guide member 812 when force in one direction along the path of travel is applied to the cam mechanism 836 and the cam member 840 moves toward the fixed guide member 812 when force in the opposite direction along the path of travel is applied to the cam mechanism 836. For example, the cam mechanism may be configured such that movement of 0.250 inches of the cam member 840 in a direction along the path of travel results in movement of 0.250 inches of the cam member 840 away from the fixed guide member 812. Each cam mechanism 836 is connected to the adjacent cam mechanism. The coupling 834 is fixed to the first cam mechanism 836 that is adjacent to the transmission. The first output shaft 830 includes threads 850 that are threaded into threads in the coupling 834. Rotation of the shaft by the motor 822 applies force to the cam mechanism in the direction of the path of travel, which causes the cam members 840 and the attached guide member to move toward or away from the fixed guide member. The motor 122 is controlled by the controller to control the spacing between the fixed guide member 812 and the moveable guide member 814.

Figure 42:
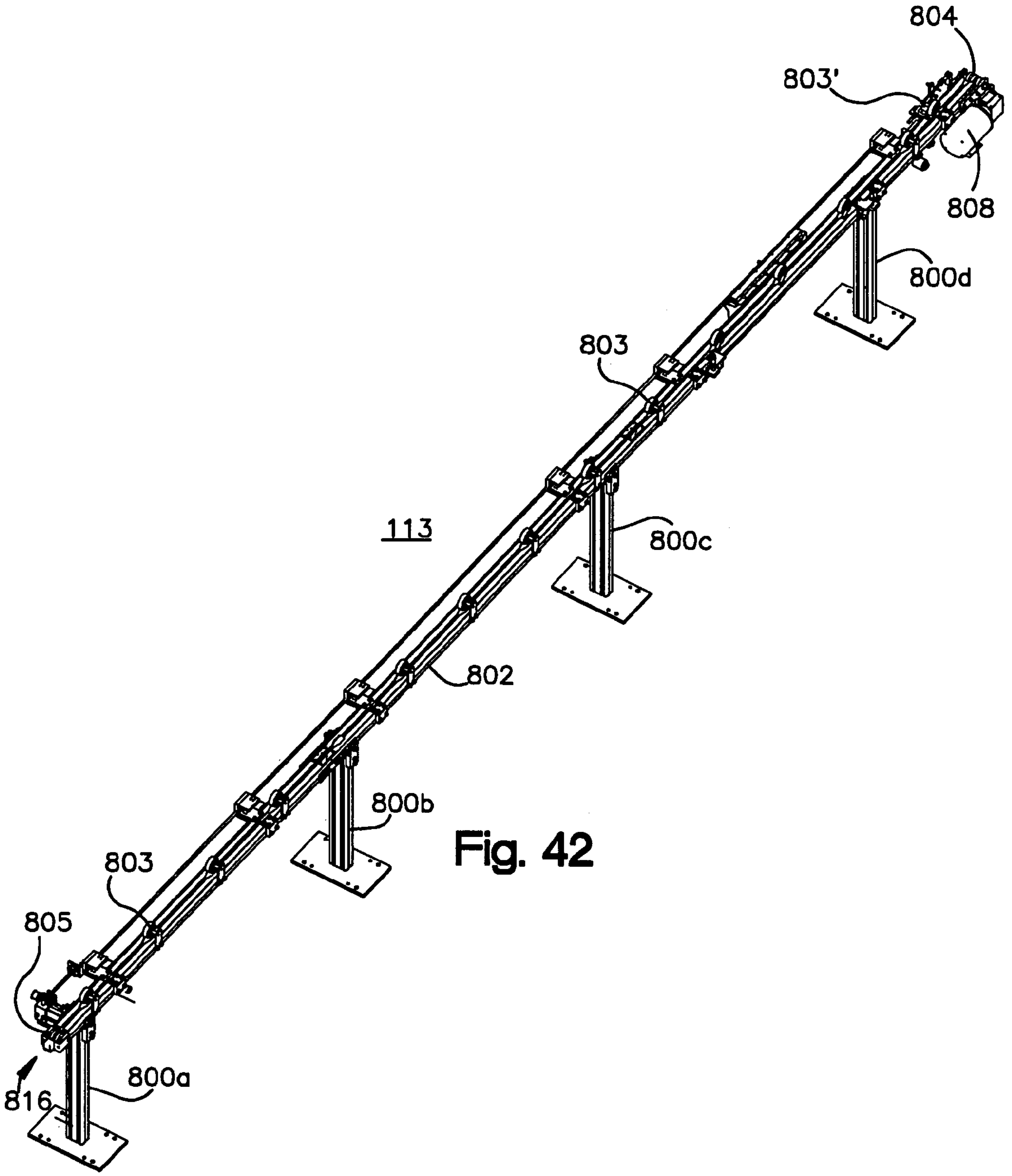
FIG. 42 is a perspective view of a conveyor.

The vertical support 800*a* is coupled to the elongated support 802 by the conveyor end drive 828 of the adjustment mechanism 820. The conveyor end drive 828 adjusts the lateral position of the elongated support 802 with respect to the vertical support to align the centerline of the conveyor 113 with the centerline of the stations 119, 120. The second output shaft 832 is coupled to the conveyor end drive 828. The conveyor end drive 828 comprises a coupling 860 secured to the elongated support 802. Threads on the output shaft 832 engage threads in the coupling 860. Rotation of the shaft by the motor 822 adjusts the lateral position of the elongated support 802 with respect to the vertical support. Referring to FIG. 42, the elongated support 802 is connected to vertical supports 800*b*, 800*c* such that the elongated support is laterally moveable with respect to the vertical supports 800*b*, 800*c*. The elongated support 802 is fixed to vertical support 800*d*. When the conveyor end drive moves the conveyor end, the elongated support 802 moves with respect to the vertical supports 800*b*, 800*c*. The movement at the elongated support 802 is minimal and is accounted for by flexing of the elongated support. The vertical support 800*d* acts as a pivot point. The centerline of the conveyor 113 is substantially maintained in alignment with the centerline of the station 114 and the centerline of the stations 119, 120 when widths are adjusted. The motor 122 is controlled by the controller to automatically align the conveyor.

In the illustrated embodiment, a series of wheels 803 are attached to the conveyor 113 above the belt. The wheels 803 help to maintain the elongated spacer frame members 16 against the conveyor belt. The wheel 803' that is adjacent to the cutoff station 116 is coupled to a force application actuator 805 that is controlled by the controller. The actuator 805 selectively urges the wheel 803' toward the conveyor belt. This causes the wheel 803' to apply pressure to the elongated spacer member that is exiting stations 110, 114, 116. In effect, the actuator 805 and wheel 803' clamp the spacer frame against the conveyor belt. This allows the conveyor belt to pull the elongated spacer frame 16 out of the stations 110, 114, 116.

Scrap Removal Apparatus 111

In the illustrated embodiment, a scrap piece 294 is stamped at the stamping station 104, roll formed at station 110, and separated from the first elongated spacer at the station 116 each time a new or different stock coil is initially fed into the station 104. This prevents the first elongated unit in the series of elongated units from being scrapped. In one embodiment, the scrap piece 294 is automatically removed from the conveyor 113 before it reaches the desiccant and adhesive application station 120.

The scrap removal apparatus 111 automatically removes the leading scrap piece 294 from the conveyor 113. The scrap removal apparatus includes a path of travel altering mechanism 870 and a translating mechanism 872. The path of travel altering mechanism 870 is positioned along the path of travel P. The path of travel altering mechanism 870 selectively facilitates movement of the scrap piece off the path of travel. The translating mechanism 872 is in communication with the path of travel altering mechanism 870 for moving the scrap piece off of the path of travel. The controller 122 is in communication with the path of travel altering mechanism and the translating mechanism. The controller actuates the path of travel altering mechanism when a scrap elongated window component stock is detected and actuates the translating mechanism 872 to move the scrap elongated window component off the path of travel.

Figure 43:
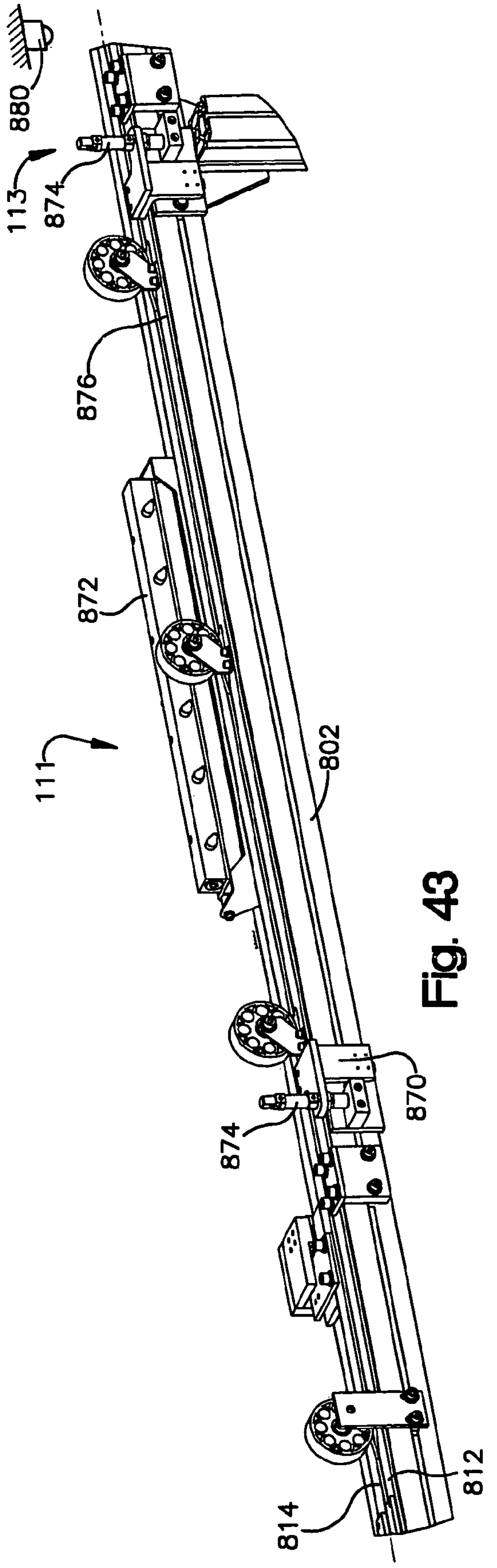
FIG. 43 is a partial perspective view of a conveyor showing a scrap removal apparatus.
Figure 44:
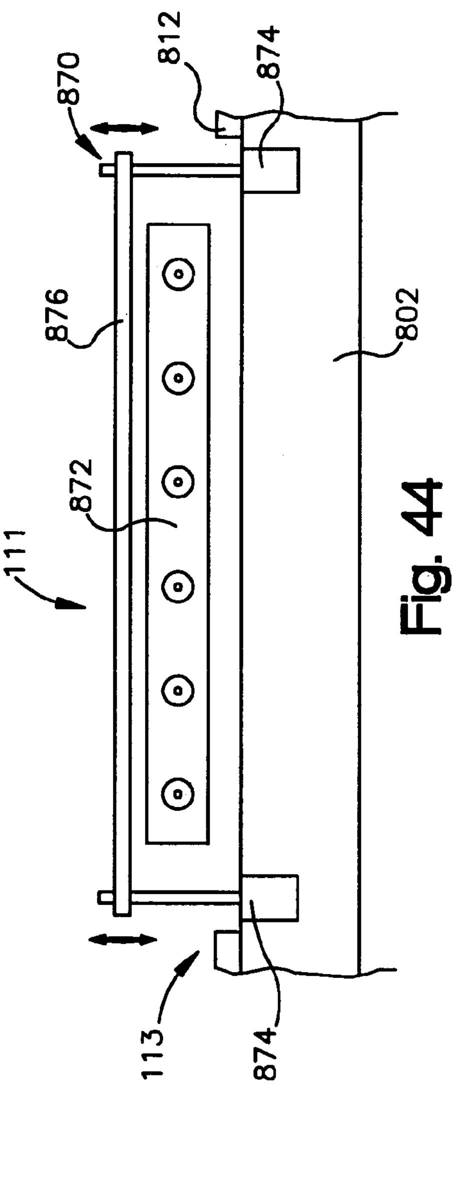
FIG. 44 is a partial side elevational view of a conveyor showing a scrap removal apparatus.

In the embodiment illustrated by FIGS. 43 and 44, the path of travel altering mechanism 870 includes a guide actuator 874 and a moveable guide portion 876. In the illustrated embodiment, the moveable guide portion 876 is a segment of the fixed guide member 812. One guide actuator 874 is coupled to each end of the moveable guide portion 876. Each guide actuator 874 is also coupled to the elongated conveyor support 802. The actuators 874 are coupled to a source of fluid pressure that is controlled by the controller 122. The controller controls the guide actuators 874 to selectively move the moveable guide portion 876 to a raised position (shown in FIG. 44). In the raised position, the guide portion 876 is far enough above the conveyor belt that the scrap segment 294 can be moved off of the conveyor.

In the embodiment illustrated by FIGS. 43 and 44, the translating mechanism 872 is a blower. The blower is coupled to a source of fluid pressure that is controlled by the controller 122. The controller controls the blower to selectively move the scrap piece past the moveable guide portion 876 in the raised position and off of the conveyor 113. In the illustrated embodiment, a sensor 880 is coupled to the controller 122 for detecting the scrap piece 294 on the conveyor. The speed of the conveyor 113 is input to the controller by the conveyor 113. The controller uses the speed of the conveyor 113 and input from the sensor 880 to determine the time when the scrap piece will pass the moveable guide portion 876. The controller 122 then moves the guide portion to the raised position accordingly, and actuates the blower when the scrap piece is at the moveable guide portion to discharge the scrap piece.

Figure 45:
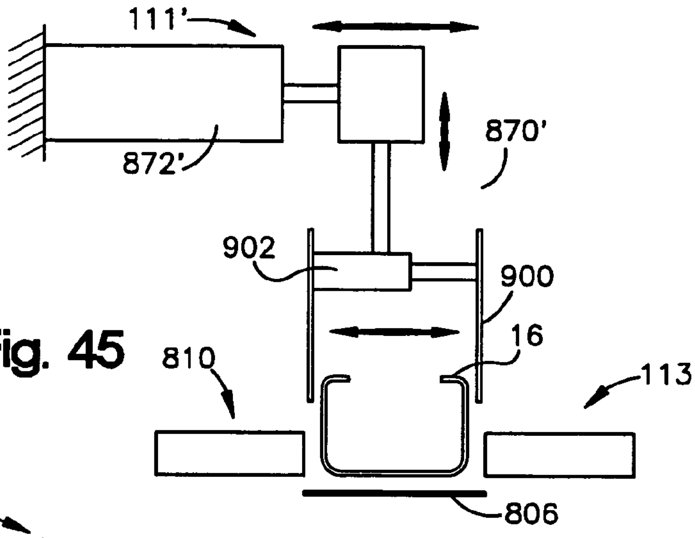
FIG. 45 is a schematic representation of a scrap removal apparatus.
Figure 46:
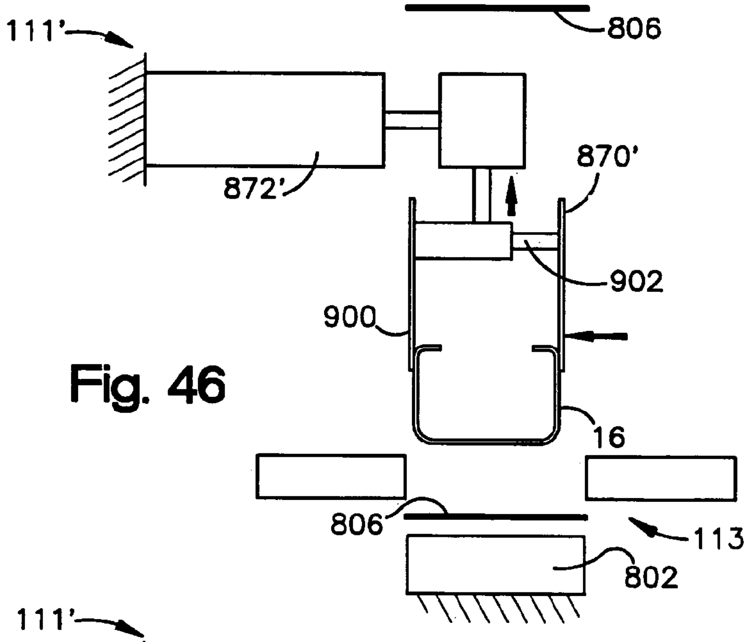
FIG. 46 is a schematic representation of a scrap removal apparatus.
Figure 47:
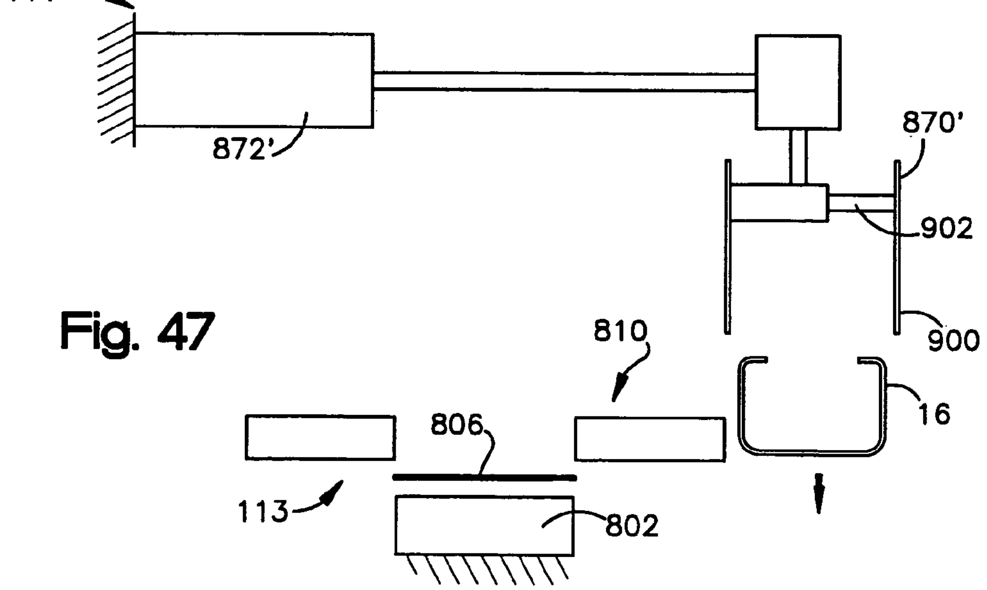
FIG. 47 is a schematic representation of a scrap removal apparatus.

It should be readily apparent to those skilled in the art that the path of travel altering mechanism and the translating mechanism could take a variety of different forms without departing from the spirit and scope of the claims. In the example of FIGS. 45-47, the path of travel altering mechanism 870' is in the form of a pair of capturing members 900 coupled to a capturing mechanism actuator 902. The capturing mechanism actuator is controlled by the controller 122 to selectively moving the pair of capturing members 900 between a spaced apart position (FIG. 45) and a scrap engagement position (FIG. 46). The translating mechanism 872' is coupled to the capturing mechanism for moving the capturing mechanism from a capturing position to a discharge position. Referring to FIGS. 45 and 46, the controller 122 is in communication with the capturing member actuator 902, and the translating mechanism 872'. Referring to FIGS. 46 and 47, the controller moves the capturing members between a spaced apart position and a capturing position based on a sensed position of a scrap piece 294 to capture the scrap piece and stop its movement along the path of travel. The controller 122 drives the translating mechanism 872' to move the capturing members to the discharge position and drives the capturing actuator 902 to move the capturing members to the spaced apart position to discharge the scrap piece.

Figure 48:
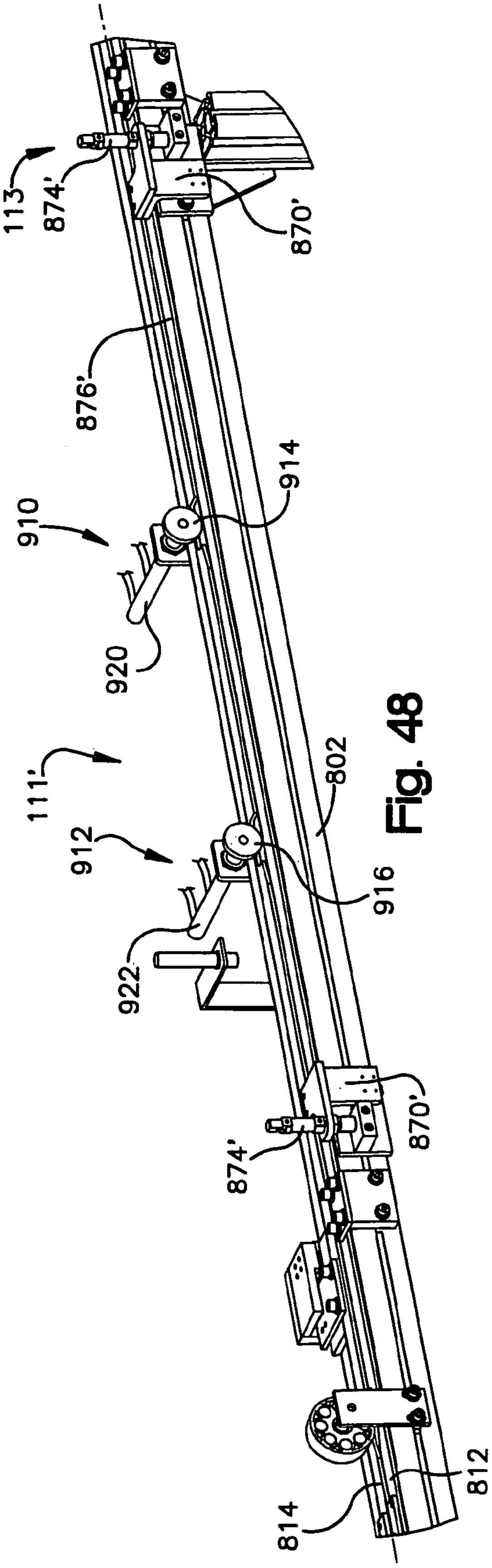
FIG. 48 is a partial perspective view of a conveyor showing an alternate scrap removal apparatus.
Figure 49:
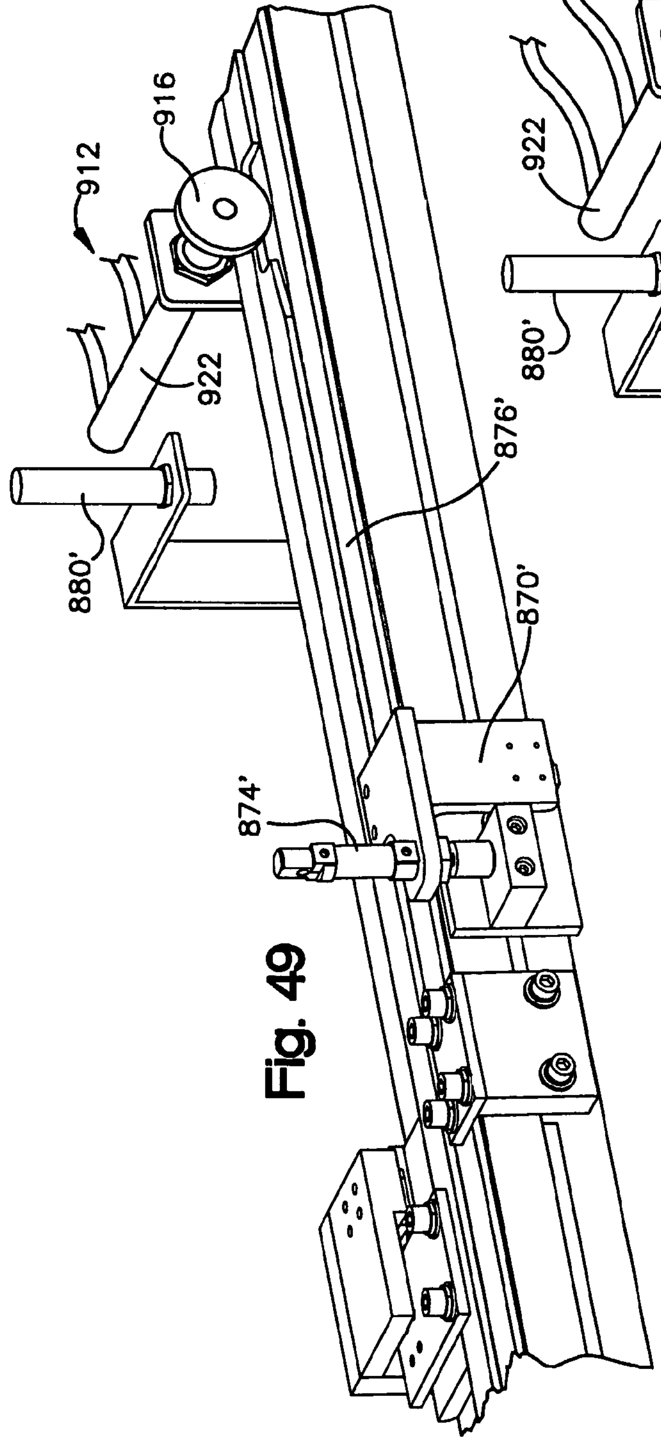
FIG. 49 is an enlarged perspective view of the alternate scrap removal apparatus of FIG. 48.

FIG. 48 illustrates an alternate scrap removal system 111'. In the embodiment illustrated by FIGS. 48-50, the translating mechanism includes two pushers 910, 912. The pushers 910, 912 have generally round contact surfaces 914, 916 facing the path of travel of the elongated window component. Two actuators 920, 922 coupled to the controller 122 simultaneously move their respective pusher outwardly away from the position shown in FIG. 48. FIG. 49 illustrates one pusher 912 in greater detail. In FIG. 49 the pusher 912 has its contact surface retracted away from the path of travel of elongated window components as they move along the conveyor 113. In the position shown in FIG. 50 the controller 122 has caused the actuator 922 to extend the pusher's round contact surface 916 through the path of movement followed by the scrap. Simultaneously, the controller 122 causes the other pusher 910 to engage the scrap material. Each of the two actuators 920, 922 is an air actuated and coupled to a source of fluid pressure that is controlled by the controller 122. The controller controls the two pushers to selectively move the scrap piece beneath the moveable guide portion 876' which is raised from the position shown in FIGS. 48 and 49 to a raised position (FIG. 50) spaced above the path of travel of the scrap piece on the conveyor 113. In the illustrated embodiment, a sensor 880 is coupled to the controller 122 for detecting the scrap piece 294 on the conveyor. The speed of the conveyor 113 is input to the controller by the conveyor 113. The controller uses the speed of the conveyor 113 and input from the sensor 880 to determine a time when the scrap piece will pass the moveable guide portion 876'.

Figure 50:
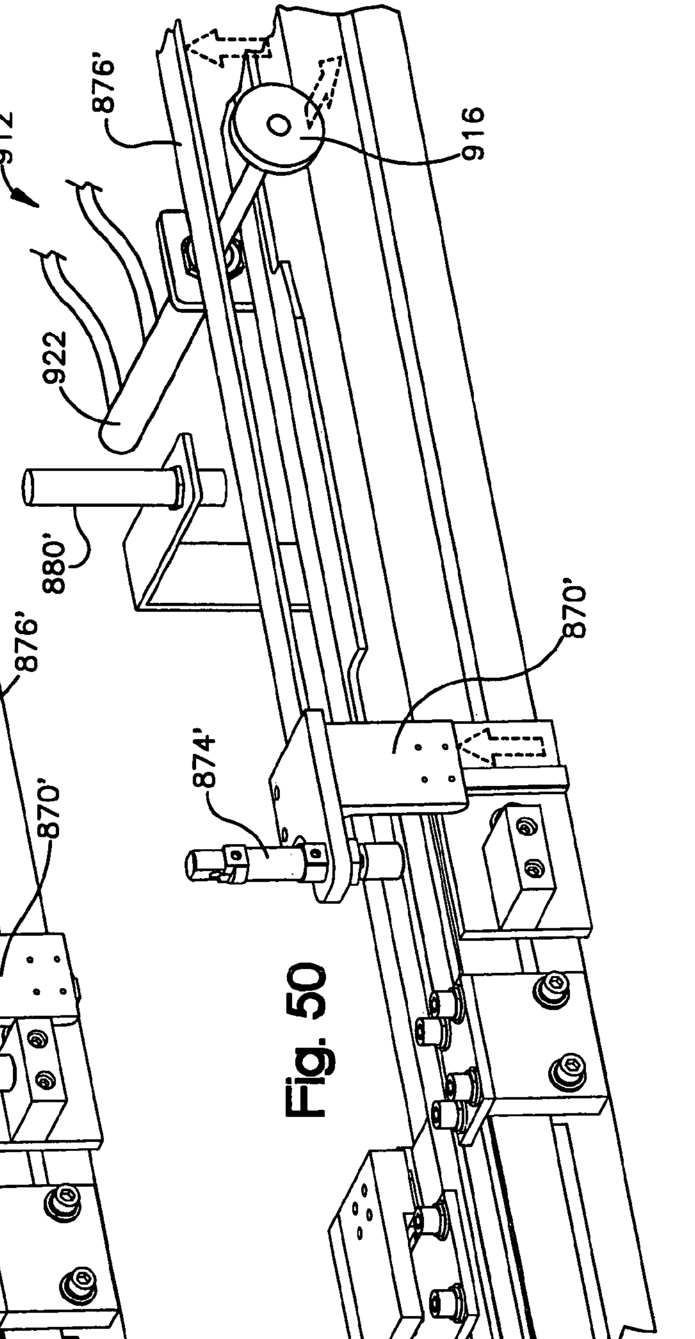
FIG. 50 is an enlarged perspective view of the alternate scrap removal apparatus of FIG. 48 with a pusher mechanism actuated for removing scrap from the conveyor.

The controller 122 activates two pneumatically controlled cylinders 874' spaced on either side of the pushers 910, 912 to move the guide portion 876' to the raised position shown in FIG. 50 and actuates the two pushers 910, 912 when the scrap piece reaches an appropriate position to discharge the scrap piece 294 to the side into a collecting container (not shown).

Dessicant Station 119

The desiccant application station 119 is controlled by the controller 122 for dispensing of a desiccant 22 into an interior region of an elongated window spacer 16. The system automatically selects an appropriate desiccant dispensing nozzle and/or automatically determines an appropriate distance D between the desiccant dispensing nozzle and the elongated spacer frame member 16 based on a property of the spacer frame member 16, such as a width W of the spacer frame member. The station 119 applies desiccant 22 to the interior region of the elongated window spacer 16. The desiccant 22 applied to the interior region of the elongated window spacer 16 captures any moisture that is trapped within an assembled insulating glass unit. Details of one acceptable desiccant application station 119 are disclosed in U.S. patent application Ser. No. 10/922,745, filed on Aug. 20, 2004 and assigned to the assignee of the present application. U.S. patent application Ser. No. 10/922,745 is incorporated herein by reference in its entirety.

Sealant/Adhesive Station 120

The extrusion station 120 receives cut off frame members from the conveyor 113 and feeds them endwise to a sealant applying nozzle location where sealant is applied with the frame member in its unfolded "linear" condition. After the sealant is applied the frame member is folded to its finished rectangular configuration, the ends telescoped and the assembly completed as described.

Figure 2:
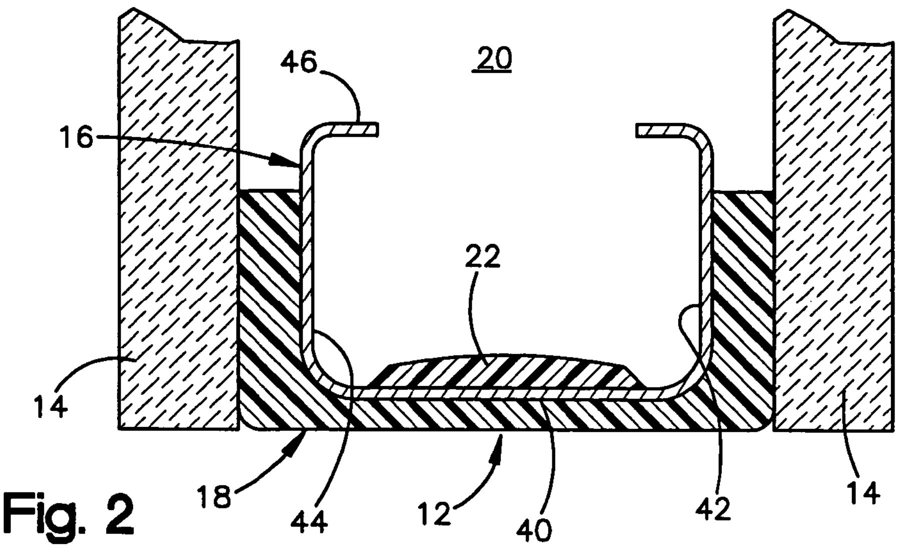
FIG. 2 is a cross sectional view seen approximately from the plane indicated by the line 2-2 of FIG. 1.

The controller 122 controls the sealant station 120 to dispense of an adhesive 18 Referring to FIG. 2, the station 120 applies adhesive 18 to glass abutting walls 42, 44 and an outer wall 40 of the elongated window spacer 16. The adhesive 18 on the glass abutting walls facilitates attachment of glass lites 14 of an assembled insulated glass unit. The adhesive on the outer wall 40 strengthens the elongated window spacer 16 and allows for attachment of external structure. The station 120 includes an adhesive metering and dispensing assembly, an adhesive bulk supply, and a conveyor 32. The pressurized adhesive bulk supply supplies adhesive under pressure to the adhesive metering and dispensing assembly. Details of one acceptable sealant application station 120 are disclosed in U.S. Pat. No. 6,630,029 to Briese et al., which is incorporated herein by reference in its entirety.

The frame members 16 proceed to the sealant applying nozzles where the sealant body 18 is applied. Afterward, the frame member is bent to its final rectangular shape and fabrication of the spacer assembly is completed. It should be appreciated that operating control of the production line is closely monitored and exercised by the controller unit 122. In this regard, it is noted that the controller unit 122 is capable of directing a production run of randomly different length frame members (in which a relatively long frame member can be followed immediately by a relatively short frame member) by controlling the speed of operation of the various forming stations and the ribbon stock accumulations. The controller unit 122 is also capable of directing a production run of randomly different width frame members by controlling the width of the various forming stations and the coil that is indexed to the uncoiling position. The ability to quickly and automatically change spacer frame widths greatly adds to the versatility of the line. The automatic changing of width allows spacers for insulating glass units that need to be remade to be easily inserted into the production sequence of the line 100 without significant time delays in production.

In one embodiment, the controller 122 causes the supply station to begin to change the stock size provided at the uncoiling position shortly after the desired amount of stock is paid out, even though one or more downstream processing stations are still processing this stock. Similarly, the controller causes each processing station to change to the next width as soon as the operations being performed on the current stock are completed, even though other downstream stations are still performing operations on the current stock. This reduces the time required to change widths.

In one method of changing elongated window component widths, a sheet stock coil with a first width is automatically indexed to the uncoiling position. The sheet stock having the first width is provided to one or more downstream processing station(s). The sheet stock having the first width is processed at the downstream processing station(s). The sheet stock having the first width is severed. A sheet stock coil with a second width is automatically indexed to the uncoiling position while the sheet stock having the first width is being processed by the downstream processing station. Processing of the sheet stock having the first width is completed at the downstream processing station. The downstream processing station is automatically adjusted for processing of the sheet stock having the second width. The sheet stock having the second width is then provided to the downstream processing station where the sheet stock having the second width is processed.

In one method of changing elongated window component widths, sheet stock having a first width is provided to a first processing station where it is processed. Sheet stock having the first width is provided from the first processing station to the second processing station where it is processed. The first processing station processing station is automatically adjusted by the controller for processing of the sheet stock having a second width while the sheet stock having the first width is being processed by the second processing station. The second processing station completes processing of the sheet stock having the first width and is then automatically adjusted for processing of the sheet stock having the second width.

In the illustrated embodiment, a sheet stock coil with a first width is automatically indexed to the uncoiling position. The sheet stock having the first width is provided to the stamping station 104. The stamping station 104 performs spacer defining stamping operations on the stock. The transfer mechanism 105 provides the stock from the stamping station to the roll forming station 110. The roll forming station 110 roll-forms the sheet stock to form elongated window component stock. The elongated window component stock is provided from the roll forming station to the swaging and cutoff stations 114, 116 where the elongated window component stock is swaged and severed to form individual elongated window components. The elongated window components are provided from the swaging and cutoff stations 114, 116 to the dispensing stations 114, 116. The dispensing stations apply desiccant and sealant to the elongated window component. When the stamping station finishes performing its operations on the stock having the first width to define a series of spacers having the first width, the controller causes the stamping station to sever the stock having the first width. The stock driving mechanism 242 drives the leading end of the stock having the first width out of the stamping station 104. The stock feed mechanism 240 reverses to pull the sheet stock out of the stamping station 104 and positions it in the clamping mechanism 212 for threading into the stamping station at a later time. Once the sheet stock having the first width is removed from the stamping station 104, the controller drives the stock supply to index a sheet stock having a second width to the uncoiling position, even though the downstream stations 110, 114, 116, 119, 120 may still be processing the stock having the first width. The sheet stock having the second width is provided into the stamping station 104. The stamping station 104 performs spacer defining stamping operations on the sheet stock having the second width, even though the downstream stations 110, 114, 116, 119, 120 may still be processing the stock having the first width. When the stock having the first width is driven out of the roll forming station 110, the controller drives the roll forming station to accept the stock having the second width and/or begin processing the stock having the second width, even though the downstream stations 114, 116, 119, 120 may still be processing the stock having the first width. When the stock having the first width is pulled out of the stamping and severing stations 114, 116, the controller drives the stamping and severing stations 114, 116 to accept the stock having the second width and/or begin processing the stock having the second width, even though the downstream stations 119, 120 may still be processing the stock having the first width. When the stock having the first width leaves the conveyor 113, the controller drives the conveyor 113 to accept the stock having the second width, even though the downstream stations 119, 120 may still be processing the stock having the first width. When the stock having the first width leaves the dispensing stations 119, 120, the controller drives the dispensing stations to accommodate stock having the second width.

Although the present invention has been described with a degree of particularity, it is the intent that the invention include all modifications and alterations falling within the spirit or scope of the appended claims.

The invention claimed is:

1. A method of making multiple elongated spacer frame members for supporting spaced apart glass panes in a window or door that prevents a first spacer frame member in a series of spacer frame members from being scrapped, comprising:

a) providing a supply of thin relatively narrow sheet metal stock;

b) feeding the stock endwise to a stamping station;

c) passing the stock through the stamping station that stamps the stock to define a scrap length of stock followed by multiple connected spacer frame defining lengths of stock;

d) feeding the scrap length of stock and the connected spacer frame defining lengths of stock to a roll forming station;

e) forming the scrap length of stock and a connected first spacer frame defining length of stock into a rigid linearly extending generally channel shaped scrap element having opposite side walls and a base wall connected to a rigid linearly extending generally channel shaped first spacer frame element having opposite side walls for supporting spaced apart glass panes and a base wall; and f) severing a connection between the scrap element and the first spacer frame element and discarding the scrap element.

2. The method of claim 1 further comprising applying sealant material to external surfaces of the first and subsequent spacer frame elements.

3. The method of claim 1 further comprising bending the first spacer frame element into a polygonal shape and telescoping ends of the first spacer frame element together.

4. The method of claim 1 wherein the scrap element is substantially shorter than the first spacer frame element.

5. The method of claim 1 wherein the scrap element is less than half as long as the first spacer frame element.

* * * * *